US012647811B2

(12) United States Patent
Edge et al.

(10) Patent No.: US 12,647,811 B2
(45) Date of Patent: Jun. 2, 2026

(54) SYSTEMS AND METHODS FOR REPORTING A GENERALIZED UNAVAILABILITY PERIOD FOR ACCESS TO A WIRELESS NETWORK

(71) Applicant: QUALCOMM Incorporated, San Diego, CA (US)

(72) Inventors: Stephen William Edge, Escondido, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 484 days.

(21) Appl. No.: 18/312,461

(22) Filed: May 4, 2023

(65) Prior Publication Data

US 2023/0362704 A1 Nov. 9, 2023

Related U.S. Application Data

(60) Provisional application No. 63/494,764, filed on Apr. 6, 2023, provisional application No. 63/484,187, filed
(Continued)

(51) Int. Cl.
*H04B 7/185* (2006.01)
*H04W 24/10* (2009.01)
(Continued)

(52) U.S. Cl.
CPC .................................. *H04W 24/10* (2013.01)

(58) Field of Classification Search
CPC ..... H04W 24/10; H04W 48/00; H04W 60/04; H04W 8/02; H04W 8/24; H04W 24/02;
(Continued)

(56) References Cited

U.S. PATENT DOCUMENTS 10,506,415 B1 * 12/2019 Artuso ..................... H04W 4/14
11,252,647 B2 * 2/2022 Chun ..................... H04W 12/08
(Continued)

FOREIGN PATENT DOCUMENTS

CN 111615848 A 9/2020
EP 3686860 A1 7/2020

OTHER PUBLICATIONS

ZTE Corporation, et al., "Support of Discontinuous Coverage in IoT NTN", 3GPP TSG-RAN WG2 Meeting #115 electronic, R2-2107765, 3rd Generation Partnership Project, Mobile Competence Centre, 650, Route Des Lucioles, F-06921 Sophia-Antipolis Cedex, France, vol. RAN WG2, No. electronic, Aug. 9, 2021—(Year: 2021).*
(Continued)

*Primary Examiner* — Edan Orgad
*Assistant Examiner* — Vanneilian Lalchinthang
(74) *Attorney, Agent, or Firm* — QUALCOMM Incorporated

(57) ABSTRACT

A user equipment (UE) may send a reporting capability to a network entity of a wireless network to indicate that the UE can report generalized unavailability periods to the wireless network for a plurality of different events, where the generalized unavailability periods comprise periods of time during which the UE does not have wireless communication access to the wireless network. The UE may later determine an upcoming unavailability period due to one or more of the plurality of events. The UE may then send an unavailability period report to the network entity prior to the unavailability period and indicative of the unavailability period. The UE may include in the report a start time, end time, duration
(Continued)

and/or event for the unavailability period. The UE may later indicate to the network entity when the unavailability report has ended or has been cancelled or modified.

26 Claims, 19 Drawing Sheets

Related U.S. Application Data on Feb. 9, 2023, provisional application No. 63/370,925, filed on Aug. 9, 2022, provisional application No. 63/338,884, filed on May 5, 2022.

(51) Int. Cl.
*H04W 48/16* (2009.01)
*H04W 88/14* (2009.01)

(58) Field of Classification Search
CPC ....... H04W 48/16; H04W 76/25; H04W 8/08; H04B 7/18513; H04B 7/18526; H04B 7/185; H04B 7/18539; H04B 7/19; H04B 7/195
USPC ........................................................ 370/252
See application file for complete search history.

(56) References Cited

U.S. PATENT DOCUMENTS

| | | | | |
|---|---|---|---|---|
| 2019/0110241 | A1* | 4/2019 | Jain | H04W 4/70 |
| 2019/0274088 | A1* | 9/2019 | Jain | H04L 1/1887 |
| 2020/0396000 | A1* | 12/2020 | Ryu | H04W 76/25 |
| 2022/0060250 | A1* | 2/2022 | Xu | H04W 60/00 |
| 2022/0094546 | A1* | 3/2022 | Ying | H04L 9/30 |
| 2023/0308199 | A1* | 9/2023 | Svennebring | H04B 17/3913 |
| 2023/0362640 | A1 | 11/2023 | Edge | |

OTHER PUBLICATIONS

Nokia., et al., "Discussion on Remaining Aspects of Discontinuous Coverage in IoT NTN", 3GPP TSG-RAN WG2 Meeting #116bis Electronic, R2-2201009, 3rd Generation Partnership Project, Mobile Competence Centre, 650, Route Des Lucioles, F-06921 Sophia-Antipolis Cedex, France vol. RAN WG2, No. Electronic, (Year: 2022).*

Cotanis I., et al., "Aspects Related to Geo Localization Based on Mobiles' Measurements in WCDMA Wireless Networks", Computing, Networking and Communications (ICNC), 2012 International Conference on, IEEE, Jan. 30, 2012, pp. 902-906, XP032130810.

International Search Report and Written Opinion—PCT/US2023/021225—ISA/EPO—Sep. 11, 2023.

Lenovo., et al., "Satellite Assistance Information and Exchange for Discontinuity Prediction in IoT NTN", 3GPP TSG-RAN WG2 Meeting #117 electronic, R2-2202589, 3rd Generation Partnership Project, Mobile Competence Centre, 650, Route Des Lucioles, F-06921 Sophia-Antipolis Cedex France vol. RAN WG2, No. electronic, Feb. 21, 2022-Mar. 3, 2022, Feb. 14, 2022, 4 Pages, XP052110522, The whole document.

Nokia., et al., "Discussion on Remaining Aspects of Discontinuous Coverage in IoT NTN", 3GPP TSG-RAN WG2 Meeting #116bis Electronic, R2-2201009, 3rd Generation Partnership Project, Mobile Competence Centre, 650, Route Des Lucioles, F-06921 Sophia-Antipolis Cedex, France vol. RAN WG2, No. Electronic, Jan. 17, 2022-Jan. 25, 2022, Jan. 11, 2022, 8 Pages, XP052094122.

ZTE Corporation, et al., "Support of Discontinuous Coverage in IoT NTN", 3GPP TSG-RAN WG2 Meeting #115 electronic, R2-2107765, 3rd Generation Partnership Project, Mobile Competence Centre, 650, Route Des Lucioles, F-06921 Sophia-Antipolis Cedex, France, vol. RAN WG2, No. electronic, Aug. 9, 2021-Aug. 27, 2021, Aug. 6, 2021, XP052034381, 4 pages, Section 2, The whole document.

* cited by examiner

405

Country A

B1

B3

B2

B5

B4

B6

Country C

Country B 102, 202 or 302

400

● Grid point location has satellite coverage
○ Grid point location does not have satellite coverage Grid Point Coverage at time T1        Grid Point Coverage at time T2

750

20-400 kms 20-400 kms

1 : coverage available
0 : coverage not available

782

780

1400 ⟍

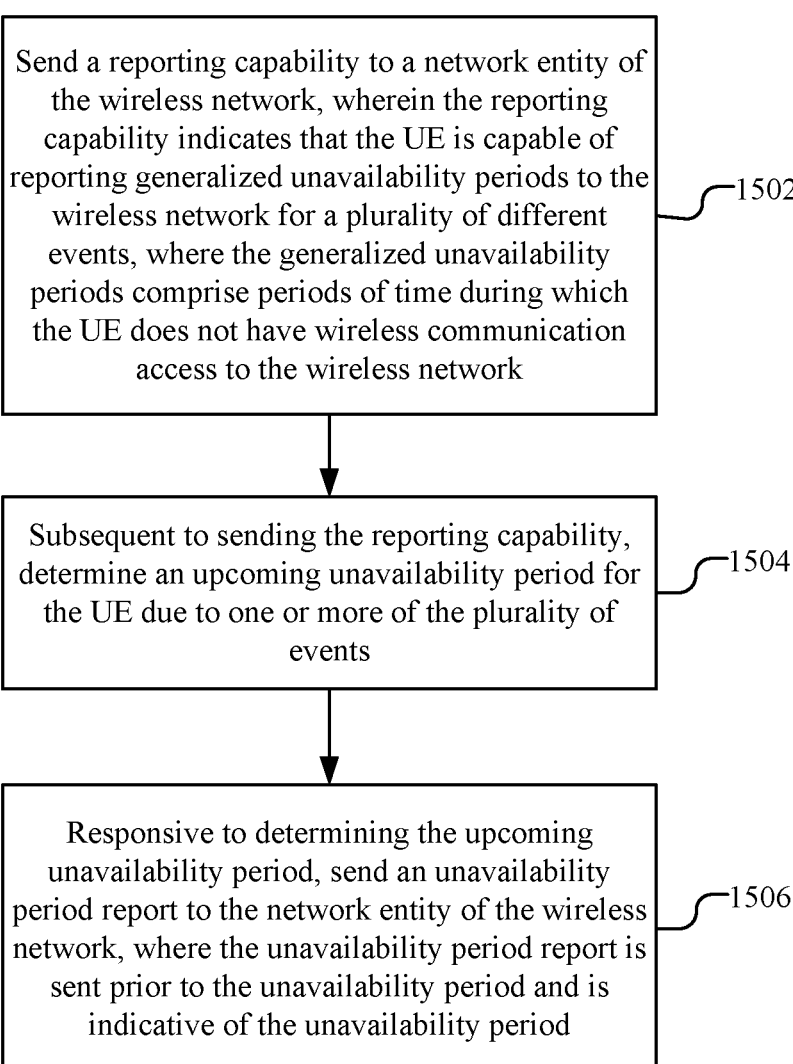

1500

Send a reporting capability to a network entity of the wireless network, wherein the reporting capability indicates that the UE is capable of reporting generalized unavailability periods to the wireless network for a plurality of different events, where the generalized unavailability periods comprise periods of time during which the UE does not have wireless communication access to the wireless network          1502

Subsequent to sending the reporting capability, determine an upcoming unavailability period for the UE due to one or more of the plurality of events          1504

Responsive to determining the upcoming unavailability period, send an unavailability period report to the network entity of the wireless network, where the unavailability period report is sent prior to the unavailability period and is indicative of the unavailability period          1506

FIG. 15

1600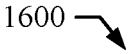

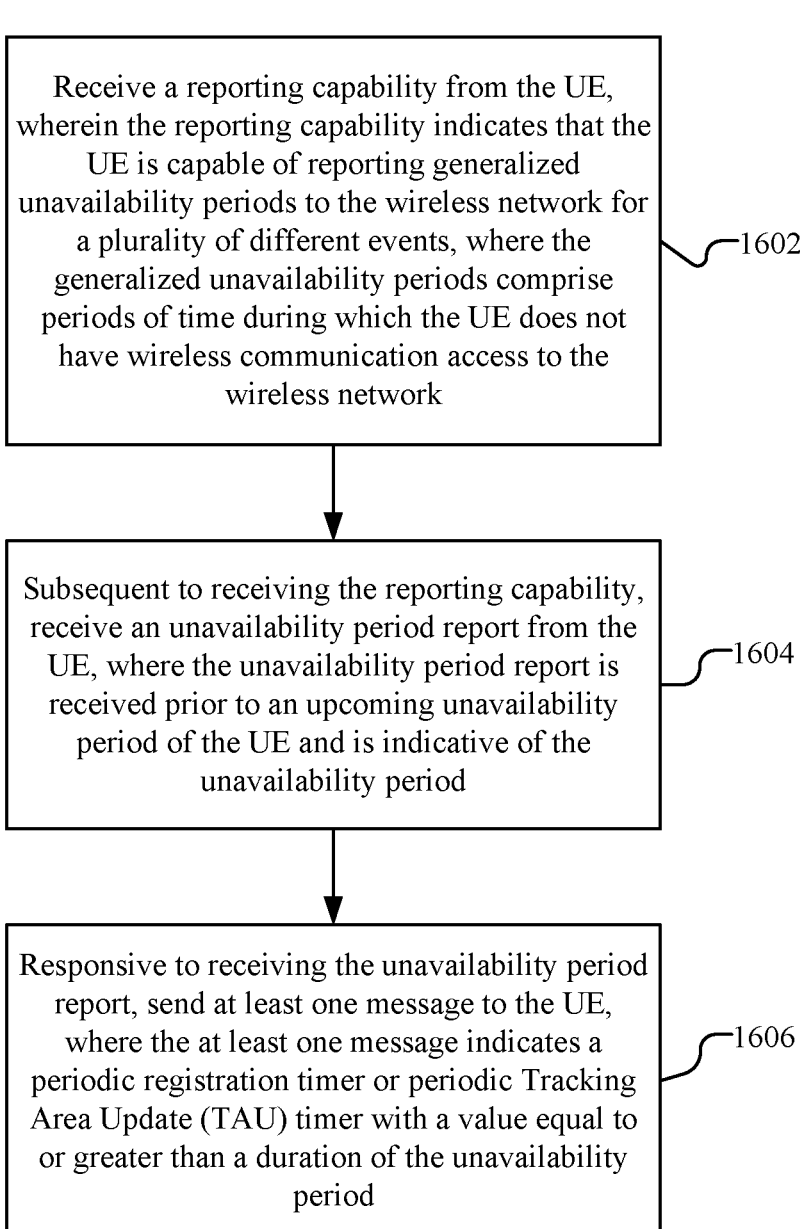

Receive a reporting capability from the UE, wherein the reporting capability indicates that the UE is capable of reporting generalized unavailability periods to the wireless network for a plurality of different events, where the generalized unavailability periods comprise periods of time during which the UE does not have wireless communication access to the wireless network — 1602

Subsequent to receiving the reporting capability, receive an unavailability period report from the UE, where the unavailability period report is received prior to an upcoming unavailability period of the UE and is indicative of the unavailability period — 1604

Responsive to receiving the unavailability period report, send at least one message to the UE, where the at least one message indicates a periodic registration timer or periodic Tracking Area Update (TAU) timer with a value equal to or greater than a duration of the unavailability period — 1606

FIG. 16

SYSTEMS AND METHODS FOR REPORTING A GENERALIZED UNAVAILABILITY PERIOD FOR ACCESS TO A WIRELESS NETWORK

RELATED APPLICATIONS

This application claims the benefit of U.S. Provisional Application No. 63/338,884, filed May 5, 2022, entitled "PROVISION OF NON-TERRESTRIAL NETWORK COVERAGE INFORMATION", U.S. Provisional Application No. 63/370,925, filed Aug. 9, 2022, entitled "PROVISION OF NON-TERRESTRIAL NETWORK COVERAGE INFORMATION", U.S. Provisional Application No. 63/484,187, filed Feb. 9, 2023, entitled "PROVISION OF NON-TERRESTRIAL NETWORK COVERAGE INFORMATION", and U.S. Provisional Application No. 63/494,764, filed Apr. 6, 2023, entitled "PROVISION OF NON-TERRESTRIAL NETWORK COVERAGE INFORMATION", all of which are assigned to the assignee hereof and incorporated herein by reference in their entirety.

FIELD OF TECHNOLOGY

The following relates to wireless communication, including support of coverage gaps for satellite access to a wireless network.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth-generation (4G) systems such as Long-Term Evolution (LTE) systems, LTE-Advanced (LTE-A) systems, or LTE-A Pro systems, and fifth-generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Access to a wireless network may be provided using communication satellites that may support 5G NR, 4G LTE, a future 6G access or other types of radio access technology (RAT) radio interfaces to UEs. In such cases, communication satellites may not always be visible to a UE, resulting in a coverage gap (also referred to as "discontinuous satellite coverage" or as an "unavailability period") whenever no communication satellites are visible or whenever visible communication satellites are not able to or not allowed to provide wireless coverage to the UE. In addition to coverage gaps, other types of events also can result in a period of unavailability during which a UE does not have access to a serving wireless network. These events can include UE-based events such as a reboot or software upgrade of the UE.

An unavailability period resulting from one of these types of events may not be known to a serving wireless network in advance.

SUMMARY

An example method performed by a user equipment (UE) for indicating a generalized unavailability period to a wireless network, according to this disclosure, may comprise sending a reporting capability to a network entity of the wireless network, wherein the reporting capability indicates that the UE is capable of reporting generalized unavailability periods to the wireless network for a plurality of different events, wherein the generalized unavailability periods comprise periods of time during which the UE does not have wireless communication access to the wireless network. The method also may comprise, subsequent to sending the reporting capability, determining an upcoming unavailability period for the UE due to one or more of the plurality of events. The method also may comprise, responsive to determining the upcoming unavailability period, sending an unavailability period report to the network entity of the wireless network, wherein the unavailability period report is sent prior to the unavailability period and is indicative of the unavailability period.

An example method performed by a network entity of a wireless network for enabling an indication of a generalized unavailability period of a user equipment (UE) to the wireless network, according to this disclosure, may comprise receiving a reporting capability from the UE, wherein the reporting capability indicates that the UE is capable of reporting generalized unavailability periods to the wireless network for a plurality of different events, wherein the generalized unavailability periods comprise periods of time during which the UE does not have wireless communication access to the wireless network. The method also may comprise, subsequent to receiving the reporting capability, receiving an unavailability period report from the UE, wherein the unavailability period report is received prior to an upcoming unavailability period of the UE and is indicative of the unavailability period. The method also may comprise, responsive to receiving the unavailability period report, sending at least one message to the UE, wherein the at least one message indicates a periodic registration timer or periodic Tracking Area Update (TAU) timer with a value equal to or greater than a duration of the unavailability period.

An example user equipment (UE) capable of indicating a generalized unavailability period to a wireless network, according to this disclosure, may comprise one or more transceivers, one or more memories, one or more processors communicatively coupled with the one or more transceivers and the one or more memories, wherein the one or more processors are configured to send a reporting capability via the one or more transceivers to a network entity of the wireless network, wherein the reporting capability indicates that the UE is capable of reporting generalized unavailability periods to the wireless network for a plurality of different events, wherein the generalized unavailability periods comprise periods of time during which the UE does not have wireless communication access to the wireless network. The one or more processors further may be configured to, subsequent to sending the reporting capability, determine an upcoming unavailability period for the UE due to one or more of the plurality of events. The one or more processors further may be configured to, responsive to determining the upcoming unavailability period, send an unavailability period report via the one or more transceivers to the network entity of the wireless network, wherein the unavailability period report is sent prior to the unavailability period and is indicative of the unavailability period.

An example network entity for a wireless network for enabling an indication of a generalized unavailability period of a user equipment (UE) to the wireless network, according to this disclosure, may comprise one or more transceivers, one or more memories, one or more processors communicatively coupled with the one or more transceivers and the one or more memories, wherein the one or more processors are configured to receive a reporting capability via the one or more transceivers from the UE, wherein the reporting capability indicates that the UE is capable of reporting generalized unavailability periods to the wireless network for a plurality of different events, wherein the generalized unavailability periods comprise periods of time during which the UE does not have wireless communication access to the wireless network. The one or more processors further may be configured to, subsequent to receiving the reporting capability, receive an unavailability period report from the UE, wherein the unavailability period report is received prior to an upcoming unavailability period of the UE and is indicative of the unavailability period. The one or more processors further may be configured to, responsive to receiving the unavailability period report, send at least one message via the one or more transceivers to the UE, wherein the at least one message indicates a periodic registration timer or periodic Tracking Area Update (TAU) timer with a value equal to or greater than a duration of the unavailability period. This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 15 is a flowchart illustrating a method for indicating a generalized unavailability period to a wireless network, in accordance with aspects of the present disclosure.

FIG. 16 is a flowchart illustrating a method for enabling the indication of a generalized unavailability period of UE to a wireless network in accordance with aspects of the present disclosure.

Figure 1:
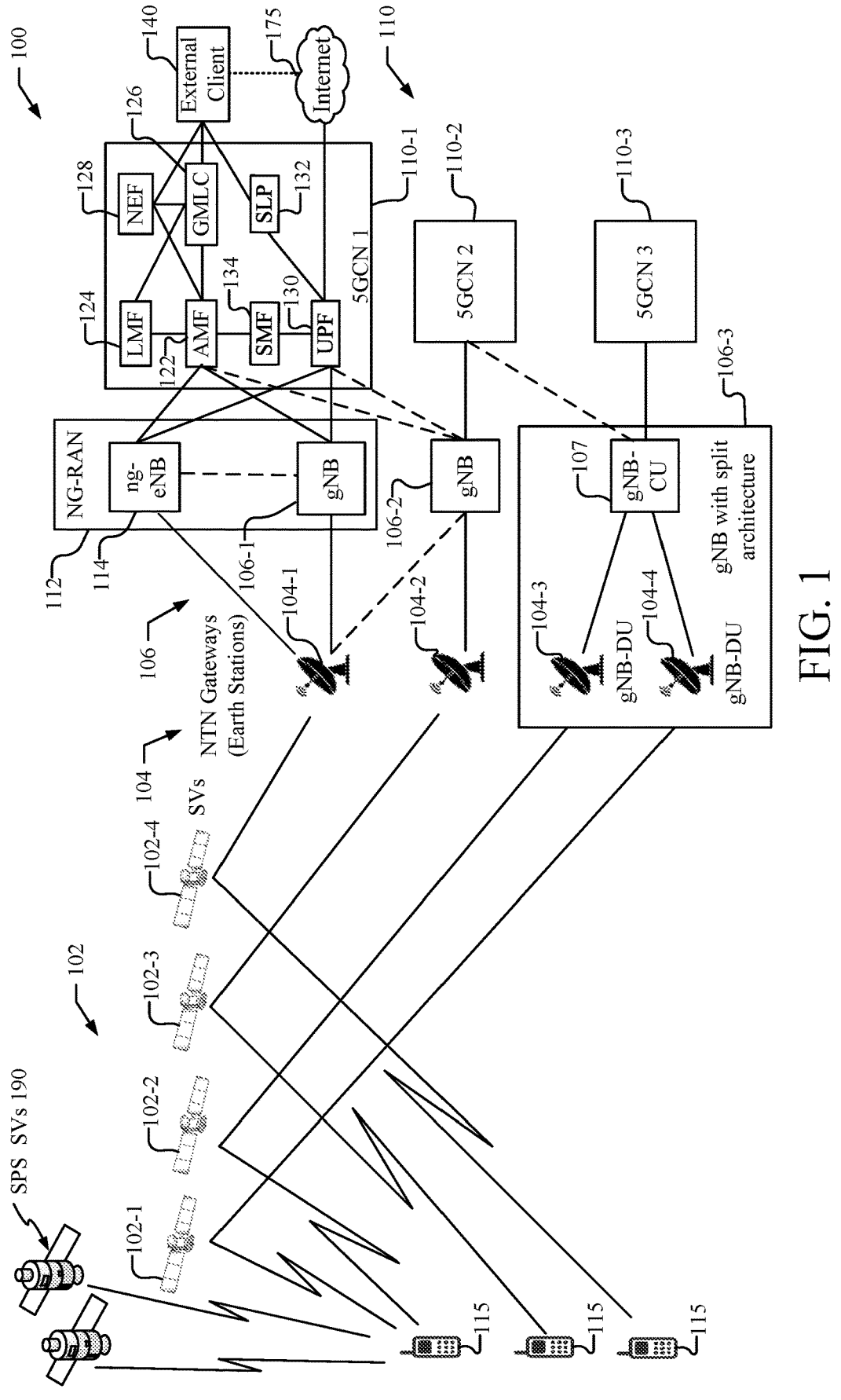
FIG. 1 illustrates an example diagram of a communication system with a network architecture having transparent space vehicles (SVs) that is capable of supporting satellite access to a wireless network.

Like reference symbols in the various drawings indicate like elements, in accordance with certain example implementations. In addition, multiple instances of an element may be indicated by following a first number for the element with a letter or a hyphen and a second number. For example, multiple instances of an element 102 may be indicated as 102-1, 102-2, 102-3 etc. When referring to such an element using only the first number, any instance of the element is to be understood (e.g. element 102 in the previous example would refer to elements 102-1, 102-2, 102-3).

DETAILED DESCRIPTION

Wireless communications may be performed between a user equipment (UE) and satellite(s) in some deployment scenarios to enable the UE to access a wireless network via the satellite(s). For example, satellite(s) may be deployed such that the UE is within a coverage area of a satellite to support such communications. However, during initial deployment and/or in some coverage areas, the UE may be located outside of a satellite coverage area, which may disrupt such satellite-based communications. For example, due to orbital motion of satellites, a UE may traverse coverage area(s) and non-coverage area(s) of the satellite(s), which may impact various operations of the UE, such as cell search, mobile originating services, mobile terminating services power-saving modes, and the like. Accordingly, improvements in support for coverage area(s) and non-coverage area(s) of the satellite(s) by a UE may be desirable to improve UE operation with satellite-based communications. Similarly, a wireless communication network may benefit from improved support for coverage area(s) and non-coverage area(s) of the satellite(s) which may enable more efficient use of network resources and better communication service to UEs. To support coverage area(s) and non-coverage area(s), the coverage information can be provided to a UE to enable the UE to know when there will be coverage at a particular location for one or more RATs for Non-Terrestrial Networks (NTNs) and possibly Terrestrial Networks (TNs). The type of coverage information needs to be defined as does a method of conveying the coverage information to a UE. The coverage information can indicate when satellite coverage will be available to UEs at different locations and at different times and may be referred to as "coverage data", "satellite coverage data", "coverage information", "satellite coverage information", "satellite coverage availability information" (SCAI), a "coverage map", or by other names.

Satellites, also referred to as space vehicles (SVs) or communication satellites, may be used in communication systems, for example, using gateways (also referred to as Earth stations or ground stations) and one or more satellites to relay communication signals between the gateways and one or more UEs. A UE, for example, may access a satellite (instead of a terrestrial base station) which may be connected to an Earth station (ES), which is also referred to as a ground station or Non-Terrestrial Network (NTN) Gateway. The Earth station in turn would connect to an element in a 5G (or 4G or future 6G) Network such as a modified base station (without a terrestrial antenna) or a network node in a 5G Core Network (5GCN) or 4G or future 6G core network. This element would in turn provide access to other elements in the 5G (or 4G or future 6G) Network and ultimately to entities external to the 5G (or 4G or future 6G) Network such as Internet web servers and other user devices.

A rationale for 5G (or other cellular network) satellite access for UEs may include ubiquitous outdoor coverage for both users and Mobile Network Operators (MNOs). For example, in many countries, including the United States, unavailable or poor cellular coverage is a common problem. Moreover, cellular access is not always possible even when there is normally good cellular coverage. For example, cellular access may be hampered due to congestion, physical obstacles, a local cellular outage caused by weather (e.g., a hurricane or tornado), or a local power outage. Satellite access to cellular networks could provide a new independent access potentially available everywhere outdoors. Current satellite capable phones for low Earth orbit (LEO) SVs may be of similar size to a cellular smartphone and, thus, mobile NR support with satellite capable phones need not produce a significant increase in the size of phones. Moreover, satellite capable smartphones may help drive handset sales, and may add revenue for carriers. Potential users, for example, may include anyone with limited or no cellular access, anyone wanting a backup to a lack of cellular access, and anyone involved in public safety or who otherwise needs (nearly) 100% reliable mobile communication. Additionally, some users may desire an improved or more reliable E911 service, e.g., for a medical emergency or vehicle trouble in remote areas. Additional user cases can include providing wireless communication access to UEs located outdoors and associated with automated or Internet of Things (IOT) devices such as a UEs enabling communication with and possibly control of unmanned Aerial Vehicles (UAVs), driverless vehicles, automated machinery used in farming, forestry or mining, smart meters, and monitoring devices (e.g., for monitoring of weather, traffic, crowds, hazardous conditions).

The use of 5G satellite access may provide other benefits. For example, 5G satellite access may reduce Mobile Network Operator (MNO) infrastructure cost. For example, an MNO may use satellite access to reduce the number of terrestrial base stations that need to be deployed, such as NR NodeBs, also referred to as gNBs, and backhaul deployment in sparsely populated areas. Further, 5G satellite access may be used to overcome internet blockage, e.g., in certain countries. Additionally, 5G satellite access may provide diversification to Space Vehicle Operators (SVOs). For example, 5G NR satellite access could provide another revenue stream to SVOs who might otherwise only provide fixed Internet access.

As a point of terminology, wireless cells supported by satellites (or SVs) are referred to herein as "satellite cells", as "radio cells", as "NTN cells" or simply as "cells" when there is prior context information that a "cell" is a "satellite cell". Satellite cells would be distinct from wireless cells supported by terrestrial base stations and access points which are referred to herein as terrestrial cells or terrestrial network (TN) cells.

It is noted that the terms space vehicle (S V), communication satellite and satellite can be synonymous and are accordingly used here interchangeably. In some cases, an SV (or satellite) can be a navigation SV (or satellite) such as an SV for GPS, Galileo, GLONASS or Beidou. An SV which functions as a navigation SV but possibly not as a communication SV is labelled and referred to explicitly herein to avoid confusion with a communication SV that may not support navigation.

Various aspects of this disclosure relate generally to a UE reporting (e.g. signaling) one or more upcoming periods of time during which the UE does not have wireless communication access to a wireless network. This reporting may apply not only to satellite coverage gaps, but more generally to other types of event that can cause the UE to lose access to a wireless network, such as a software update or reboot of the UE. These periods of time during which the UE does not have wireless communication access for any of a variety of reasons are referred to herein as "generalized unavailability periods." Enabling the UE to report generalized unavailability periods, in the manner described herein, can allow the UE and network to prepare for the upcoming unavailability. According to some embodiments, a common reporting procedure may be used for each type or each cause of unavailability, thereby reducing impacts compared to using a different reporting procedure for each different type, or each different cause, of unavailability. After the unavailability period starts, the network may buffer incoming data for the UE and avoid paging the UE. When the unavailability period ends, the UE may send another report to the network (e.g., a registration update or tracking area update) indicating the UE is now available. The network can then resume paging the UE when needed and can send any buffered data to the UE.

Particular aspects of the subject matter described in this disclosure can be implemented to realize one or more of the following potential advantages. In some examples, by reporting generalized unavailability periods, the UE and network can prepare for the unavailability period, performing tasks before and/or after the unavailability period. This may help mitigate the impact of the unavailability period, e.g. by improving the functionality and performance of the UE and network and/or helping ensure efficiency within the wireless network and by the UE.

Aspects of the disclosure are initially described in the context of communications systems, including wireless communications systems. Aspects of the disclosure are further illustrated by and described with reference to apparatus diagrams, system diagrams, and flowcharts that relate to support of reporting generalized unavailability periods.

FIG. 1 illustrates an example of a communication system 100 that may be capable of supporting satellite access using 5G NR or some other wireless access type such as CDMA, 4G or future 6G, according to some examples. FIG. 1 illustrates a network architecture with transparent SVs. A transparent SV may implement frequency conversion and a radio frequency (RF) amplifier in both uplink (UL) and downlink (DL) directions and may correspond to an analog RF repeater. A transparent SV, for example, may receive UL signals from all served UEs and may redirect the combined signals DL to an earth station without demodulating or decoding the signals. Similarly, a transparent SV may receive an UL signal from an earth station and redirect the signal DL to served UEs without demodulating or decoding the signal. However, the SV may frequency convert received signals and may amplify and/or filter received signals before transmitting the signals.

The communication system 100 comprises a number of UEs 115, a number of SVs 102 (e.g., SV 102-1, 102-2, 102-3, and 102-4), a number of Non-Terrestrial Network (NTN) gateways 104-1 to 104-4 (collectively referred to herein as NTN gateways 104) (and sometimes referred to herein simply as gateways 104, earth stations 104, or ground stations 104), a number of satellite NodeBs (gNBs) 106-1 to 106-3 (collectively referred to herein as gNBs 106) capable of communication with UEs 115 via SVs 102 and that are part of a Next Generation (NG) Radio Access Network (RAN) (NG-RAN) 112.

It is noted that the term "gNB" (or "gNodeB") traditionally refers to an NR NodeB base station used for terrestrial access with an NR radio interface. The same term (gNB) may also be used to refer to a base station supporting satellite access with an NR radio interface. The two variants of gNB (satellite and terrestrial) may support many of the same functions, protocols and interfaces, but are also distinct in other ways. To distinguish gNBs supporting terrestrial access from gNBs supporting satellite access, different labels are used herein. A gNB could also support both terrestrial and satellite NR access, though, for simplification, this is not further discussed here.

The communication system 100 is illustrated as further including components of a number of Fifth Generation (5G) networks including 5G Core Networks (5GCNs) 110-1 to 110-3 (collectively referred to herein as 5GCNs 110). The 5GCNs 110 may be public land mobile networks (PLMN) that may be located in the same or in different countries. FIG. 1 illustrates various components within 5GCN1 110-1 that may operate with the NG-RAN 112. It should be understood that 5GCN2 110-2 and 5GCN3 110-3 may include identical, similar or different components and associated NG-RANs, which are not illustrated in FIG. 1 in order to avoid unnecessary obfuscation. A 5G network may also be referred to as an NR network; NG-RAN 112 may be referred to as a 5G RAN or as an NR RAN; and 5GCN 110 may be referred to as an NG Core network (NGC). The communication system 100 may further utilize information from navigation space vehicles (SVs) 190 for a Satellite Positioning System (SPS) including Global Navigation Satellite Systems (GNSS) like Global Positioning System (GPS), GLObal NAvigation Satellite System (GLONASS), Galileo or Beidou or some other local or regional SPS, such as Indian Regional Navigation Satellite System (IRNSS), European Geostationary Navigation Overlay Service (EGNOS), or Wide Area Augmentation System (WAAS), all of which are sometimes referred to herein as GNSS. It is noted that SVs 190 act as navigation SVs and are separate and distinct from SVs 102, which act as communication SVs. However, it is not precluded that some of SVs 190 may also act as some of SVs 102 and/or that some of SVs 102 may also act as some of SVs 190. In some implementations, for example, the SVs 102 may be used for both communication and positioning. Additional components of the communication system 100 are described below. The communication system 100 may include additional or alternative components.

Permitted connections in the communication system 100 having the network architecture with transparent SVs illustrated in FIG. 1, allow a gNB 106 to access multiple Earth stations 104 and/or multiple SVs 102. A gNB 106, e.g., illustrated by gNB 106-2, may also be shared by multiple PLMNs (5GCNs 110), which may all be in the same country or possibly in different countries, and an NTN Gateway 104, e.g., illustrated by NTN Gateway 104-1, may be shared by more than one gNB 106.

It should be noted that FIG. 1 provides only a generalized illustration of various components, any or all of which may be utilized as appropriate, and each of which may be duplicated or omitted, as necessary. Specifically, although only three UEs 115 are illustrated, it will be understood that many UEs (e.g., hundreds, thousands, millions, etc.) may utilize the communication system 100. Similarly, the communication system 100 may include a larger (or smaller) number of SVs 190, SVs 102, earth stations 104, gNBs 106, NG-RAN 112, ng-eNBs 114, 5GCNs 110, external clients 140, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, 4G LTE, etc.

The UE 115 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 115 may correspond to a cellphone, smartphone, laptop, tablet, PDA, tracking device, navigation device, Internet of Things (JOT) device, or some other portable or moveable device. Typically, though not necessarily, the UE 115 may support wireless communication using one or more Radio Access Technologies (RATs) such as using GSM, CDMA, Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 112 and 5GCN 110), etc. The UE 115 may also support wireless communication using a Wireless Local Area Network (WLAN) which may connect to other networks (e.g., the Internet) using a Digital Subscriber Line (DSL) or packet cable for example. The UE 115 further supports wireless communications using space vehicles, such as SVs 102. The use of one or more of these RATs may allow the UE 115 to communicate with an external client 140 (e.g. via a User Plane Function (UPF) 130 or possibly via a Gateway Mobile Location Center (GMLC) 126).

The UE 115 may include a single entity or may include multiple entities such as in a personal area network where a user may employ audio, video and/or data I/O devices and/or body sensors and a separate wireline or wireless modem.

The UE 115 may support position determination, e.g., using signals and information from space vehicles 190 in an SPS, such as GPS, GLONASS, Galileo or Beidou or some other local or regional SPS such as IRNSS, EGNOS or WAAS, all of which may be generally referred to herein as GNSS. Position measurements using SPS are based on measurements of propagation delay times of SPS signals broadcast from a number of orbiting satellites to an SPS receiver in the UE 115. Once the SPS receiver has measured the signal propagation delays for each satellite, the range to each satellite can be determined and precise navigation information including 3-dimensional position, velocity and time of day of the SPS receiver can then be determined using the measured ranges and the known locations of the satellites. Positioning methods that may be supported using SVs 190 may include Assisted GNSS (A-GNSS), Real Time Kinematic (RTK), Precise Point Positioning (PPP) and Differential GNSS (DGNSS). Information and signals from SVs 102 may also be used to support positioning. The UE 115 may further support positioning using terrestrial positioning methods, such as Downlink (DL) Time Difference of Arrival (DL-TDOA), Enhanced Cell ID (ECID), Round Trip signal propagation Time (RTT), multi-cell RTT, angle of arrival (AOA), angle of departure (AOD), time of arrival (TOA), receive-time transmission-time difference (RxTx) and/or other positioning methods.

An estimate of a location of the UE 115 may be referred to as a geodetic location, location, location estimate, location fix, fix, position, position estimate or position fix, and may be geodetic, thus providing location coordinates for the UE 115 (e.g., latitude and longitude) which may or may not include an altitude/elevation component (e.g., height above sea level, height above or depth below ground level, floor level or basement level). Alternatively, a location of the UE 115 may be expressed as a civic location (e.g., as a postal address or the designation of some point or small area in a building such as a particular room or floor). A location of the UE 115 may also be expressed as an area or volume (defined either geodetically or in civic form) within which the UE 115 is expected to be located with some probability or confidence level (e.g., 67%, 95%, etc.) A location of the UE 115 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g., for latitude, longitude and altitude above or below mean sea level).

The UEs 115 are configured to communicate with 5GCNs 110 via the SVs 102, earth stations 104, and gNBs 106. As illustrated by NG-RAN 112, the NG-RANs associated with the 5GCNs 110 may include one or more gNBs 106. The NG-RAN 112 may further include a number of terrestrial gNBs (not shown in FIG. 1), that are not capable of communication with UEs via SVs 102. Pairs of terrestrial and/or satellite base stations, e.g., a terrestrial gNB and gNB 106-1 in NG-RAN 112, may be connected to one another using terrestrial links—e.g., directly or indirectly via other terrestrial gNBs or gNBs 106 and communicate using an Xn interface. Access to the 5G network is provided to UEs 115 via wireless communication between each UE 115 and a serving gNB 106, via an SV 102 and an NTN Gateway 104. The gNBs 106 may provide wireless communications access to the 5GCN 110 on behalf of each UE 115 using 5G NR. 5G NR radio access may also be referred to as NR radio access or as 5G radio access and may be as defined by the Third Generation Partnership Project (3GPP).

Base stations (BSs) in the NG-RAN 112 shown in FIG. 1 may also or instead include a next-generation evolved Node B 114, also referred to as an ng-eNB 114. An ng-eNB 114 may be connected to one or more gNBs 106 and/or terrestrial gNBs in NG-RAN 112—e.g., directly or indirectly via other gNBs 106, terrestrial gNBs and/or other ng-eNBs 114. An ng-eNB 114 may provide LTE wireless access and/or evolved LTE (eLTE) wireless access to a UE 115. An ng-eNB 114 may be connected to an NTN gateway 104 and support satellite wireless access for UEs 115 (e.g., IOT UEs) using enhanced Machine Type Communication (eMTC), also referred to as LTE-M, or Narrowband IOT (NB-IOT). EMTC and NB-IOT are variants of LTE in which lower bandwidth is provided to, and supported by, UEs 115 and which enable support of UEs 115 with low resource capability (e.g., lower processing and memory availability) and limited power availability (e.g., a UE 115 with a battery which should provide power to the UE 115 for 2 to 10 years before being replaced or recharged). NB-IOT and eMTC may be preferred to NR for support of IOT UEs with very limited resources and power availability.

The term "satellite NodeB" is used herein to refer to a gNB (e.g., gNB 106) or ng-eNB (e.g., ng-eNB 114) that provides satellite wireless access, e.g., as exemplified in FIG. 1. A satellite Node B may be regenerative, as described later for FIGS. 2 and 3, and/or may in some embodiments correspond to an evolved Node B (eNB) that provides satellite wireless access (e.g., using LTE, eMTC or NB-IOT) to a core network that is an EPC. A satellite NodeB may be referred to by other names or terms such as an sNB or a "satellite node" or "satellite access node." Satellite NodeBs corresponding to gNBs 106 are not the same as terrestrial gNBs, but may be based on a terrestrial gNB with additional capability. For example, a gNB 106 may terminate the radio interface and associated radio interface protocols to UEs 115 and may transmit DL signals to UEs 115 and receive UL signals from UEs 115 via SVs 102 and earth stations 104. A gNB 106 may also support signaling connections and voice and data bearers to UEs 115 and may support handover of UEs 115 between different satellite cells for the same SV 102, between different SVs 102 and/or between different gNBs 106. In some systems, a gNB 106 may be referred to as a gNB or as an enhanced gNB. The gNBs 106 may be configured to manage moving satellite beams (for LEO SVs) and associated mobility of UEs 115. The gNBs 106 may assist in the handover (or transfer) of SVs 102 between different Earth stations 104, different gNBs 106, and between different countries. The gNBs 106 may hide or obscure specific aspects of connected SVs 102 from the 5GCN 110, e.g., by interfacing to a 5GCN 110 in the same way as, or in a similar way to, a terrestrial gNB, and may avoid a 5GCN 110 from having to maintain configuration information for SVs 102 or perform mobility management related to SVs 102. The gNBs 106 may further assist in sharing of SVs 102 over multiple countries. The gNBs 106 may communicate with one or more earth stations 104, e.g., as illustrated by gNB 106-2 communicating with earth stations 104-2 and 104-1. The gNBs 106 may be separate from earth stations 104, e.g., as illustrated by gNBs 106-1 and 106-2, and earth stations 104-1 and 104-2. The gNBs 106 may include or may be combined with one or more earth stations 104, e.g., using a split architecture. For example, gNB 106-3 is illustrated with a split architecture, with a gNB central unit (gNB-CU) 107 and the earth stations 104-3 and 104-4 acting as Distributed Units (DUs). A gNB 106 may typically be fixed on the ground with transparent SV operation. In one implementation, one gNB 106 may be physically combined with, or physically connected to, one NTN Gateway 104 to reduce overall complexity and cost.

Satellite NodeBs corresponding to ng-eNBs 114 are not the same as terrestrial ng-eNBs but may be based on a terrestrial ng-eNB with additional capability. The differences between ng-eNBs 114 and terrestrial ng-eNBs and the additional satellite-related functions, capabilities, and uses of an ng-eNB 114 may be similar to that described above for gNBs 106.

The Earth stations 104 may be shared by more than one gNB 106 and/or more than one ng-eNB 114 and may communicate with UE 115 via the SVs 102. An NTN Gateway 104 may be dedicated to just one SVO and to one associated constellation of SVs 102 and hence may be owned and managed by the SVO. While earth stations 104 may be included within an ng-eNB 114 or gNB 106, e.g., as a gNB-DU within gNB 106-3, this may only occur when the same SVO or the same MNO owns both the ng-eNB 114 or gNB 106 and the included earth stations 104. Earth stations 104 may communicate with SVs 102 using control and user plane protocols that may be proprietary to an SVO. The control and user plane protocols between earth stations 104 and SVs 102 may: (i) establish and release NTN Gateway 104 to SV 102 communication links, including authentication and ciphering; (ii) update SV software and firmware; (iii) perform SV Operations and Maintenance (O&M); (iv) control satellite beams (e.g., direction, power, on/off status) and mapping between satellite beams and earth station UL and DL payload; and (v) assist with handoff of an SV 102 or satellite cell to another NTN Gateway 104.

As noted, while FIG. 1 depicts nodes configured to communicate according to 5G NR and LTE communication protocols for an NG-RAN 112, nodes configured to communicate according to other communication protocols may be used, such as, for example, an LTE protocol (e.g., supporting UE 115 satellite access using eMTC or NB-IOT) for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 115, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 112 and the EPC corresponds to 5GCN 110 in FIG. 1. In such a case, satellite NodeBs may comprise eNBs in an E-UTRAN connecting to NTN gateways 104 and to an EPC. The methods and techniques described herein for support of satellite acquisition assistance may be applicable to such other networks.

The gNBs 106, ng-eNB 114 and terrestrial gNBs may communicate with an Access and Mobility Management Function (AMF) 122 in a 5GCN 110, which, for positioning functionality, may communicate with a Location Management Function (LMF) 124. For example, the gNBs 106 and ng-eNB 114 may provide an N2 interface to the AMF 122. An N2 interface between a gNB 106 or ng-eNB 114 and a 5GCN 110 may be the same as an N2 interface supported between a terrestrial gNB or terrestrial ng-eNB and a 5GCN 110 for terrestrial NR or terrestrial LTE access by a UE 115 and may use the Next Generation Application Protocol (NGAP) defined in 3GPP Technical Specification (TS) 38.413 between a gNB 106 or ng-eNB 114 and the AMF 122. The AMF 122 may support mobility of the UE 115, including satellite cell change and handover, and may participate in supporting a signaling connection to the UE 115 and possibly data and voice bearers for the UE 115. The LMF 124 may support positioning of the UE 115 when UE accesses the NG-RAN 112 and may support position procedures/methods such as A-GNSS, DL-TDOA, RTK, PPP, DGNSS, ECID, AOA, AOD, multi-cell RTT and/or other positioning procedures including positioning procedures based on communication signals from one or more SVs 102. The LMF 124 may also process location services requests for the UE 115, e.g., received from the AMF 122 or from a Gateway Mobile Location Center (GMLC) 126. The LMF 124 may be connected to AMF 122 and/or to GMLC 126. In some embodiments, a node/system that implements the LMF 124 may additionally or alternatively implement other types of location-support modules, such as an Enhanced Serving Mobile Location Center (E-SMLC). It is noted that in some embodiments, at least part of the positioning functionality (including derivation of a UE 115's location) may be performed at the UE 115 (e.g., using signal measurements obtained by UE 115 for signals transmitted by SVs 102, SVs 190, terrestrial gNBs and assistance data provided to the UE 115, e.g., by LMF 124).

The GMLC 126 may support a location request for the UE 115 received from an external client 140 and may forward such a location request to the AMF 122 for forwarding by the AMF 122 to the LMF 124 or may forward the location request directly to the LMF 124. A location response from the LMF 124 (e.g., containing a location estimate for the UE 115) may be similarly returned to the GMLC 126 either directly or via the AMF 122, and the GMLC 126 may then return the location response (e.g., containing the location estimate) to the external client 140. The GMLC 126 is shown connected to both the AMF 122 and LMF 124 in FIG. 2 though only one of these connections may be supported by 5GCN 110 in some implementations.

A Network Exposure Function (NEF) 128 may be included in 5GCN 110, e.g., connected to the GMLC 126 and the AMF 122. In some implementations, the NEF 128 may be connected to communicate directly with the external client 140. The NEF 128 may support secure exposure of capabilities and events concerning 5GCN 110 and UE 115 to an external client 140 and may enable the secure provision of information from external client 140 to 5GCN 110.

A User Plane Function (UPF) 130 may support voice and data bearers for UE 115 and may enable UE 115 voice and data access to other networks such as the Internet 175. The UPF 130 may be connected to gNBs 106 and ng-eNBs 114. UPF 130 functions may include: external Protocol Data Unit (PDU) session point of interconnect to a Data Network, packet (e.g., IP) routing and forwarding, packet inspection and user plane part of policy rule enforcement, Quality of Service (QoS) handling for user plane, downlink packet buffering and downlink data notification triggering. UPF 130 may be connected to a Secure User Plane Location (SUPL) Location Platform (SLP) 132 to enable support of positioning of UE 115 using SUPL. SLP 132 may be further connected to or accessible from external client 140.

As illustrated, a Session Management Function (SMF) 134 connects to the AMF 122 and the UPF 130. The SMF 134 may have the capability to control both a local and a central UPF within a PDU session. SMF 134 may manage the establishment, modification and release of PDU sessions for UE 115, perform IP address allocation and management for UE 115, act as a Dynamic Host Configuration Protocol (DHCP) server for UE 115, and select and control a UPF 130 on behalf of UE 115.

The external client 140 may be connected to the 5GCN 110 via the GMLC 126 and/or the SLP 132, and/or NEF 128. The external client 140 may optionally be connected to the 5GCN 110 and/or to a location server, which may be, e.g., an SLP, that is external to 5GCN 110, via the Internet 175. The external client 140 may be connected to the UPF 130 directly (not shown in FIG. 1) or through the Internet 175. The external client 140 may be a server, a web server, or a user device, such as a personal computer, a UE, etc.

As noted, while the communication system 100 is described in relation to 5G technology, the communication system 100 may be implemented to support other communication technologies, such as GSM, WCDMA, LTE, etc., that are used for supporting and interacting with mobile devices such as the UE 115 (e.g., to implement voice, data, positioning, and other functionalities). In some such embodiments, the 5GCN 110 may be configured to control different air interfaces. For example, in some embodiments, 5GCN 110 may be connected to a WLAN, either directly or using a Non-3GPP InterWorking Function (N3IWF, not shown FIG. 1) in the 5GCN 110. For example, the WLAN may support IEEE 802.11 WiFi access for UE 115 and may comprise one or more WiFi APs. Here, the N3IWF may connect to the WLAN and to other elements in the 5GCN 110 such as AMF 122.

Support of transparent SVs 102 with the network architecture shown in FIG. 1 may impact the communication system as follows. The 5GCN 110 may treat a satellite RAT as a new type of terrestrial RAT with longer delay, reduced bandwidth and higher error rate. Consequently, while there may be some impact to PDU session establishment and mobility management (MM) and connection management (CM) procedures, impacts to an AMF 122 (or LMF 124) may be small—e.g., such as providing pre-configured data for fixed tracking areas (TAs) and cells to a UE 115 during Registration. There may be no impact to the SVs 102. The SVs 102 may be shared with other services (e.g., satellite TV, fixed Internet access) with 5G NR mobile access for UEs 115 added in a transparent manner. This may enable legacy SVs 102 to be used and may avoid the need to deploy a new type of SV 102. Further, the gNBs 106 and ng-eNBs 114 may be fixed and may be configured to support one country and one or more PLMNs in that country. The gNBs 106 and ng-eNBs 114 may need to assist assignment and transfer of SVs 102 and satellite cells between gNBs 106 or ng-eNBs 114 and earth stations 104 and support handover of UEs 115 between satellite cells, SVs 102, other gNBs 106 and/or other ng-eNBs 114. Thus, the gNB 106 may differ from a terrestrial gNB and the ng-eNB 114 may differ from a terrestrial ng-eNB. Additionally, a coverage area of a gNB 106 or ng-eNB 114 may be much larger than the coverage area of a terrestrial gNB or terrestrial ng-eNB.

In some implementations, the satellite beam coverage of an SV 102 may be large, e.g., up to or greater than 1000 kilometers (km) across, and may provide access to more than one country. An NTN Gateway 104 may be shared by multiple gNBs 106 and/or by multiple ng-eNBs 114 (e.g., NTN Gateway 104-1 may be shared by gNBs 106-1 and 106-2 and by ng-eNB 114), and a gNB 106 and/or ng-eNB 114 may be shared by multiple core networks in separate PLMNs located in the same country or in different countries (e.g., gNB 106-2 may be shared by 5GCN1 110-1 and 5GCN2 110-1, which may be in different PLMNs in the same country or in different countries).

To simplify later referencing to a satellite NodeB supporting transparent SV wireless access, any later reference herein to a gNB 106 can also be considered to refer, as an alternative, to an ng-eNB 114 or to a satellite NodeB that comprises an eNB accessing an EPC.

Figure 2:
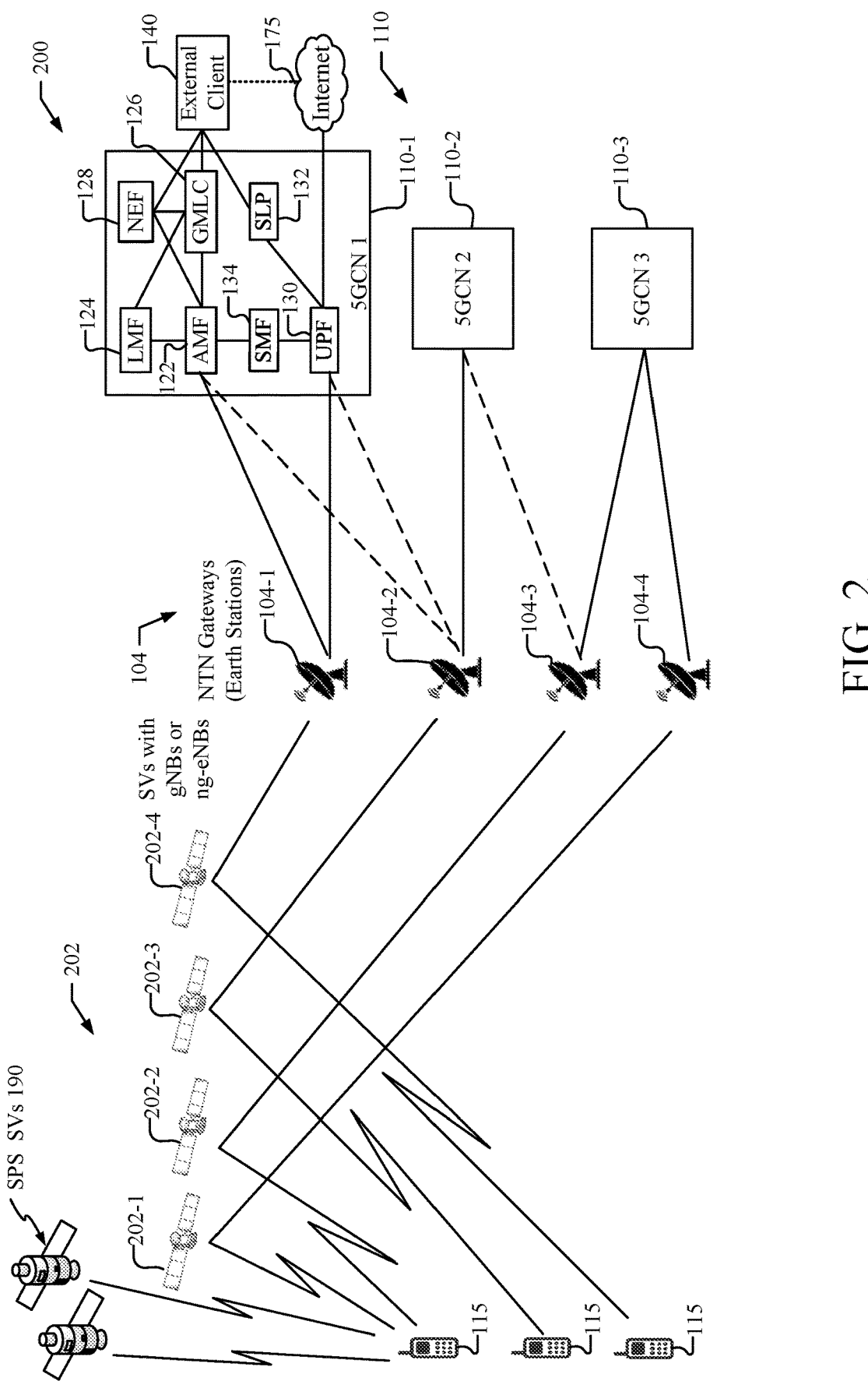
FIG. 2 illustrates an example diagram of a communication system with a network architecture having regenerative SVs that is capable of supporting satellite access to a wireless network.

FIG. 2 illustrates an example of a communication system 200 that may be capable of supporting satellite access using 5G NR or some other wireless access type such as CDMA, 4G or future 6G, according to an embodiment. Communication system 200 may implement aspects of communication system 100.

The network architecture shown in FIG. 2 is similar to that shown in FIG. 1, like designated elements being similar or the same. FIG. 2, however, illustrates a network architecture with regenerative SVs 202-1, 202-2, 202-3, and 202-4 (collectively SVs 202), as opposed to transparent SVs 102 shown in FIG. 1. A regenerative SV 202, unlike a transparent SV 102, includes an on-board satellite NodeB, referred to as a gNB 202, which may include the functional capability of a gNB 106, and is sometimes referred to herein as an SV/gNB 202. The NG-RAN 112 is illustrated as including the SV/gNBs 202. Reference to a gNB 202 is used herein when referring to SV/gNB 202 functions related to communication with UEs 115 and 5GCNs 110, whereas reference to an SV 202 is used when referring to SV/gNB 202 functions related to communication with earth stations 104 and with UEs 115 at a physical radio frequency level. However, there may be no precise delimitation of an SV 202 versus a gNB 202.

An onboard gNB 202 may perform some or all of the same functions as a gNB 106 as described previously. For example, a gNB 202 may terminate the radio interface and associated radio interface protocols to UEs 115 and may transmit DL signals to UEs 115 and receive UL signals from UEs 115, which may include encoding and modulation of transmitted signals and demodulation and decoding of received signals. A gNB 202 may also support signaling connections and voice and data bearers to UEs 115 and may support handover of UEs 115 between different satellite cells for the same gNB 202 and between different gNBs 202. The gNBs 202 may assist in the handover (or transfer) of SVs 202 between different Earth stations 104, different 5GCNs 110, and between different countries. The gNBs 202 may hide or obscure specific aspects of SVs 202 from the 5GCN 110, e.g., by interfacing to a 5GCN 110 in the same way as, or in a similar way to, a terrestrial gNB. The gNBs 202 may further assist in sharing of SVs 202 over multiple countries. The gNBs 202 may communicate with one or more earth stations 104 and with one or more 5GCNs 110 via the earth stations 104. In some implementations, gNBs 202 may communicate directly with other gNBs 202 using Inter-Satellite Links (ISLs) (not shown in FIG. 2), which may support an Xn interface between any pair of gNBs 202.

With LEO SVs, an SV/gNB 202 may need to manage moving satellite cells with coverage in different countries at different times. Earth stations 104 may be connected directly to the 5GCN 110, as illustrated. For example, as illustrated, NTN Gateway 104-1 may be connected to AMF 122 and UPF 130 of 5GCN1 110-1, while NTN Gateway 104-2 may be similarly connected to 5GCN2 110-2, and earth stations 104-3 and 104-4 are connected to 5GCN3 110-3. Earth stations 104 may be shared by multiple 5GCNs 110, for example, if Earth stations 104 are limited. For example, in some implementations (illustrated with dotted lines), NTN Gateway 104-2 may be connected to both 5GCN1 110-1 and 5GCN2 110-2, and NTN Gateway 104-3 may be connected to both 5GCN2 110-2 and 5GCN3 110-3. The 5GCN 110 may need to be aware of SV 202 coverage areas in order to page UEs 115 and to manage handover. Thus, as can be seen, the network architecture with regenerative SVs may have more impact and complexity with respect to both gNBs 202 and 5GCNs 110 than the network architecture with transparent SVs 102 shown in FIG. 1.

Support of regenerative SVs with the network architecture shown in FIG. 2 may impact the communication system 200 as follows. The 5GCN 110 may be impacted if fixed TAs and cells are not supported, since core components of mobility management and regulatory services, which are typically based on fixed cells and fixed TAs for terrestrial PLMNs, might have to be replaced by a new system (e.g., based on UE 115 location). If fixed TAs and fixed cells are supported, a 5GCN 110 (e.g., the AMF 122) may need to map any fixed TA to one or more SVs 202 with current radio coverage of the TA when performing paging of a UE 115 that is located in this TA. This could require configuration in the 5GCN 110 of long-term orbital data for SVs 202 (e.g., obtained from an SVO for SVs 202) and could add significant new impact to a 5GCN 110.

Legacy SVs might need a substantial software (SW) update to support gNB 202 functions, which may not be feasible. An SV 202 would also need to fully support all UEs 115 accessing the SV 202, which could be problematic with a legacy SV due to limited processing and storage capability. Hence, an SV 202 would probably need to comprise new hardware (HW) and SW rather than being based on a SW upgrade to an existing SV. A new SV/gNB 202 may need to support regulatory and other requirements for multiple countries. A GEO SV 202 coverage area would typically include several or many countries, whereas a LEO or medium earth orbit (MEO) SV 202 would typically orbit over many countries. Support of fixed tracking areas (TAs) and fixed cells may then require that a SV/gNB 202 be configured with fixed TAs and fixed cells for an entire worldwide coverage area. Alternatively, AMFs 122 (or LMFs 124) in individual 5GCNs 110 could support fixed TAs and fixed cells for the associated PLMN to reduce SV/gNB 202 complexity and at the expense of more 5GCN 110 complexity. Additionally, SV/gNB 202 to SV/gNB 202 ISLs would typically change dynamically as relative SV/gNB 202 positions change, making Xn related procedures more complex.

For support of satellite access using LTE, NB-IOT or eMTC, a regenerative SV 202 can include an on-board satellite NodeB which may include the functional capability of either an ng-eNB 114 or an eNB instead of the functional capability of a gNB 106 that supports NR access. The functions of the SV 202 and the on-board satellite NodeB and the impacts to a 5GCN 110 can then be the same as, or similar to, those described above for an SV 202 with an on board satellite NodeB that corresponds to a gNB 106 supporting NR access, but with the difference that any reference to a gNB 202 would then refer to an ng-eNB or an eNB, and any reference to a 5GCN 110 or 5GCN 110 entity (e.g., an AMF 122 or UPF 130) would then refer, respectively, to an EPC or a corresponding EPC entity (e.g., a Mobility Management Entity (MME) or a Serving Gateway (SGW) plus Packet Data Gateway (PDG)) for a gNB 202 that corresponds to an eNB. Accordingly, reference to a gNB 202, an SV/gNB 202 or an SV 202 herein can be considered to allow for the case where the satellite NodeB component of the SV 202 supports the functionality of an ng-eNB 114 or an eNB.

Figure 3:
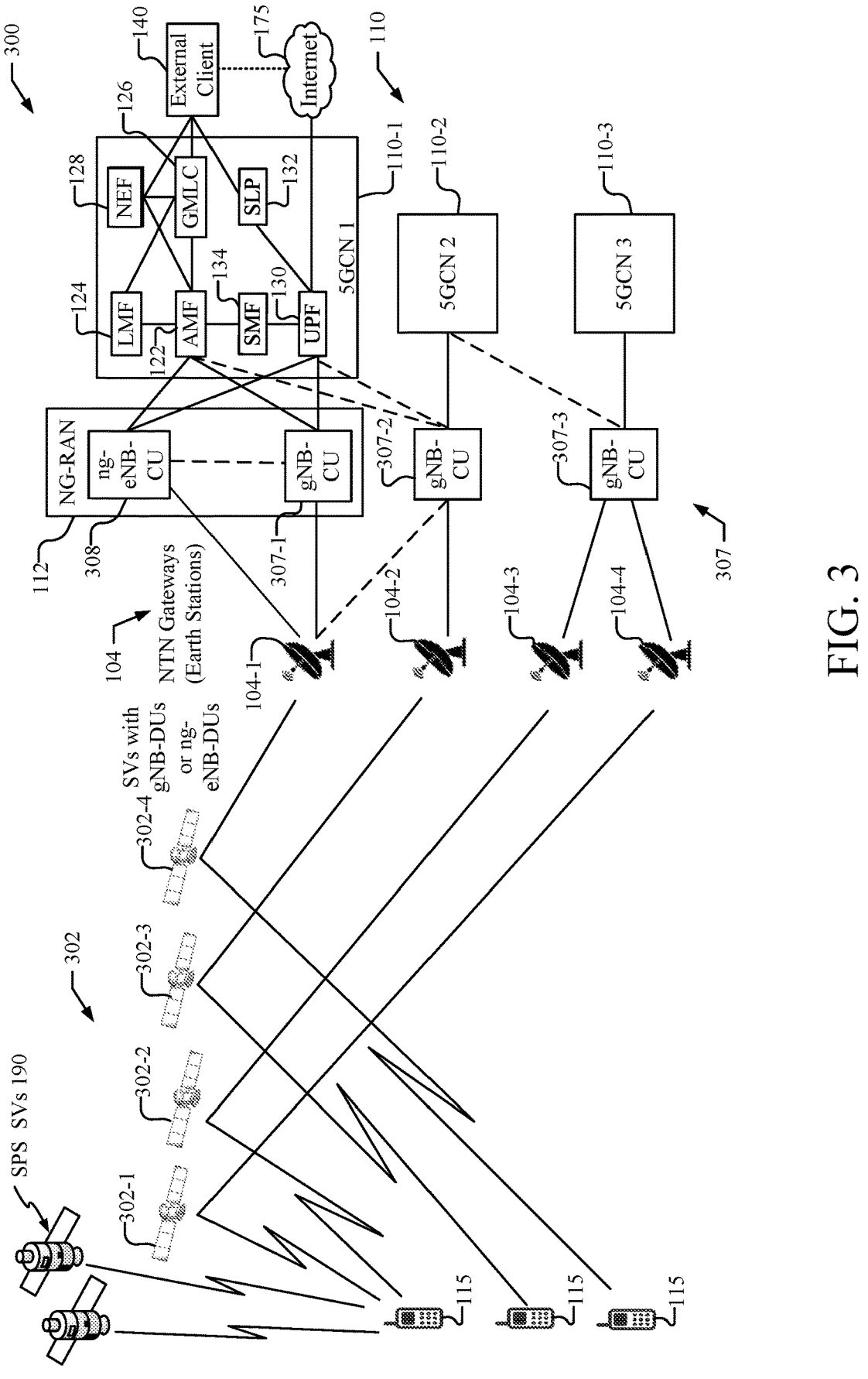
FIG. 3 illustrates an example diagram of a communication system with a network architecture having regenerative SVs and a split satellite Node B (gNB) architecture that is capable of supporting satellite access to a wireless network.

FIG. 3 illustrates an example of a diagram of a communication system 300 that may be capable of supporting satellite access using 5G NR or some other wireless access type such as CDMA, 4G or future 6G, according to an embodiment. Communication system 300 may implement aspects of communication systems 100 and/or 200.

The network architecture shown in FIG. 3 is similar to that shown in FIGS. 1 and 2, like designated elements being similar or the same. FIG. 3, however, illustrates a network architecture with regenerative SVs 302-1, 302-2, 302-3, and 302-4 (collectively referred to as SVs 302), as opposed to transparent SVs 102 shown in FIG. 1, and with a split architecture for the satellite NodeBs. The satellite NodeBs, referred to as gNBs 307 (e.g., gNB 307-1, 307-2, and 307-3), include a central unit and may sometimes be referred as gNB-CU 307, and a regenerative SV 302, unlike a transparent SV 102, includes an on-board gNB Distributed Unit (gNB-DU) 302, and is sometimes referred to herein as an SV/gNB-DU 302. Reference to a gNB-DU 302 is used herein when referring to SV/gNB 302 functions related to communication with UEs 115 and gNB-CUs 307, whereas reference to an SV 302 is used when referring to SV/gNB-DU 302 functions related to communication with earth stations 104 and with UEs 115 at a physical radio frequency level. However, there may be no precise delimitation of an SV 302 versus a gNB-DU 302.

Each gNB-DU 302 communicates with one ground based gNB-CU 307 via one or more earth stations 104. One gNB-CU 307 together with the one or more gNB-DUs 302 which are in communication with the gNB-CU 307 performs functions, and may use internal communication protocols, which are similar to or the same as a gNB with a split architecture as described in 3GPP TS 38.401. Here a gNB-DU 302 corresponds to and performs functions similar to or the same as a gNB Distributed Unit (gNB-DU) defined in TS 38.401, while a gNB-CU 307 corresponds to and performs functions similar to or the same as a gNB Central Unit (gNB-CU) defined in TS 38.401. For example, a gNB-DU 302 and a gNB-CU 307 may communicate with one another using an F1 Application Protocol (F1AP) as defined in 3GPP TS 38.473 and together may perform some or all of the same functions as a gNB 106 or gNB 202 as described previously. To simplify references to different types of gNB is the description below, a gNB-DU 302 may sometimes be referred to a gNB 302 (without the "DU" label), and a gNB-CU 307 may sometimes be referred to a gNB 307 (without the "CU" label).

A gNB-DU 302 may terminate the radio interface and associated lower-level radio interface protocols to UEs 115 and may transmit DL signals to UEs 115 and receive UL signals from UEs 115, which may include encoding and modulation of transmitted signals and demodulation and decoding of received signals. A gNB-DU 302 may support and terminate Radio Link Control (RLC), Medium Access Control (MAC), and Physical (PHY) protocol layers for the NR RF interface to UEs 115, as defined in 3GPP TSs 38.201, 38.202, 38.211, 38.212, 38.213, 38.214, 38.215, 38.321 and 38.322. The operation of a gNB-DU 302 is partly controlled by the associated gNB-CU 307. One gNB-DU 302 may support one or more NR satellite cells for UEs 115. A gNB-CU 307 may support and terminate a Radio Resource Control (RRC) protocol, Packet Data Convergence Protocol (PDCP), and Service Data Protocol (SDAP) for the NR RF interface to UEs 115, as defined in 3GPP TSs 38.331, 38.323, and 37.324, respectively. A gNB-CU 307 may also be split into separate control plane (gNB-CU-CP) and user plane (gNB-CU-UP) portions, where a gNB-CU-CP communicates with one or more AMFs 122 in one more 5GCNs 110 using the NGAP protocol and where a gNB-CU-UP communicates with one or more UPFs 130 in one more 5GCNs 110 using a General Packet Radio System (GPRS) tunneling protocol (GTP) user plane protocol (GTP-U) as defined in 3GPP TS 29.281. A gNB-DU 302 and gNB-CU 307 may communicate over an F1 interface to (a) support control plane signaling for a UE 115 using IP, Stream Control Transmission Protocol (SCTP), and F1 Application Protocol (FLAP) protocols, and (b) to support user plane data transfer for a UE using IP, User Datagram Protocol (UDP), PDCP, SDAP, GTP-U and NR User Plane Protocol (NRUPP) protocols.

A gNB-CU 307 may communicate with one or more other gNB-CUs 307 and/or with one more other terrestrial gNBs using terrestrial links to support an Xn interface between any pair of gNB-CUs 307 and/or between any gNB-CU 307 and any terrestrial gNB.

A gNB-DU 302 together with a gNB-CU 307 may: (i) support signaling connections and voice and data bearers to UEs 115; (ii) support handover of UEs 115 between different satellite cells for the same gNB-DU 302 and between different gNB-DUs 302; and (iii) assist in the handover (or transfer) of SVs 302 between different Earth stations 104, different 5GCNs 110, and between different countries. A gNB-CU 307 may hide or obscure specific aspects of SVs 302 from a 5GCN 110, e.g., by interfacing to a 5GCN 110 in the same way or in a similar way to a terrestrial gNB. The gNB-CUs 307 may further assist in sharing of SVs 302 over multiple countries.

In communication system 300, the gNB-DUs 302 that communicate with and are accessible from any gNB-CU 307 will change over time with LEO SVs 302. With the split gNB architecture, a 5GCN 110 may connect to fixed gNB-CUs 307 which do not change over time and which may reduce difficulty with paging of a UE 115. For example, a 5GCN 110 may not need to know which SV/gNB-DUs 302 are needed for paging a UE 115. The network architecture with regenerative SVs 302 with a split gNB architecture may thereby reduce 5GCN 110 impact at the expense of additional impact to a gNB-CU 307.

Support of regenerative SVs 302 with a split gNB architecture as shown in FIG. 3 may impact the communication system 300 as follows. The impact to 5GCN 110 may be limited as for transparent SVs 102 discussed above. For example, the 5GCN 110 may treat a satellite RAT in communication system 300 as a new type of terrestrial RAT with longer delay, reduced bandwidth, and higher error rate. The impact on SV/gNB-DUs 302 may be less than the impact on SV/gNBs 202 (with non-split architecture), as discussed above in reference to FIG. 2. The SV/gNB-DU 302 may need to manage changing association with different (fixed) gNB-CUs 307. Further, an SV/gNB-DU 302 may need to manage satellite beams and satellite cells. The gNB-CU 307 impacts may be similar to gNB 106 impacts for a network architecture with transparent SVs 102, as discussed above, except for impacts to support satellite cells and satellite beams which may impact gNB-DUs 302 but not a gNB-CU 307.

For support of satellite access using LTE, NB-IOT or eMTC, regenerative SVs 302 with a split architecture for the satellite NodeBs could also be used. However, unlike the split architecture for a terrestrial gNB that supports 5G NR, no split architecture may be defined for a terrestrial ng-eNB or a terrestrial eNB. However, a split architecture may be possible, in principle, using CUs and DUs that perform analogous functions to gNB-CUs and gNB-DUs for either a terrestrial ng-eNB or a terrestrial eNB. In that case, a gNB-CU 307 shown in FIG. 3 could be replaced by either a CU for an ng-eNB 114, shown as ng-eNB-CU 308 in FIG. 3, or a CU for an eNB (not shown in FIG. 3), and a gNB-DU 302 in an SV 302 could be replaced by a DU for an ng-eNB 114 or an eNB. In this case, a reference to a gNB-DU 302 herein could refer to a DU for an ng-eNB 114 or eNB, a reference to a gNB 307 or a gNB-CU 307 herein could refer to an ng-eNB-CU 308 or a CU for an eNB, and a reference to an SV 302 could refer to an SV with onboard functionality for a DU for an ng-eNB 114 or eNB.

There are several SVOs currently operating and several additional SVOs that are preparing to begin operations that may be capable of supporting satellite access using 5G NR or some other wireless access type such as CDMA. Various SVOs may employ different numbers of LEO SVs and Earth gateways and may use different technologies. For example, currently operating SVOs include SVOs using transparent ("bent pipe") LEO SVs with CDMA, and regenerative LEO SVs capable of ISL. New SVOs have been recently announced with plans for large constellations of LEO SVs to support fixed Internet access. These various SVOs are widely known to the industry.

While supporting satellite access to a wireless network, an SV 102/202/302 may transmit satellite beams (also referred to as "radio beams" or just as "beams") over multiple countries. For example, a beam transmitted by an SV 102/202/302 may overlap two or more countries. Sharing a beam over two or more countries, however, may raise complications. For example, if a beam is shared by two or more countries, earth stations 104 and gNBs 106/202/302/307 in one country may need to support UE 115 access from other countries. Sharing a beam over multiple countries may raise security issues for privacy for both data and voice. Further, sharing an SV beam over multiple countries may raise regulatory conflicts. For example, regulatory services including Wireless Emergency Alerts (WEA), Lawful Interception (LI), and emergency services (EM) calls in a first country could need support from gNBs 106/202/307 and earth stations 104 in a second country that shares the same SV beam.

One solution to complications raised by beam sharing amongst multiple countries would be to assign one beam to one country. A possible exception to the assignment of one beam to one country may be made for small nearby countries. The assignment of a beam to a single country additionally implies assigning each satellite cell to one country.

Figure 4:
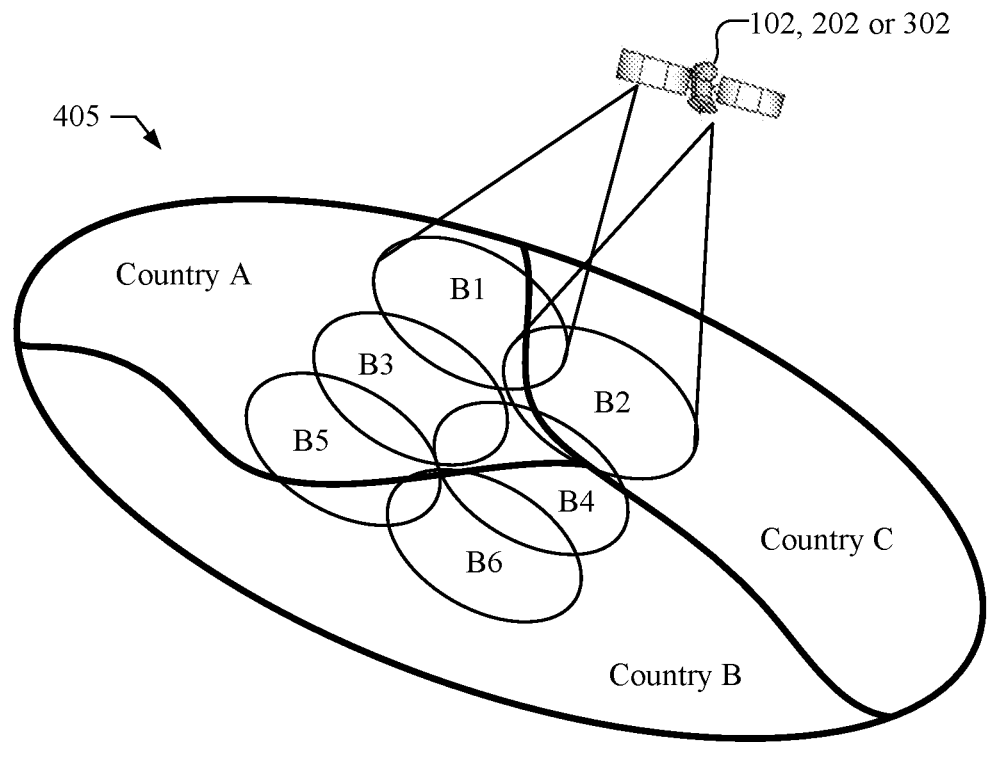
FIG. 4 illustrates an example of an SV generating multiple beams over an area that includes multiple countries.
Figure 4:
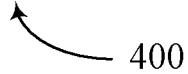

FIG. 4 illustrates an example of a communication system 400 that, by way of example, illustrates an SV 102, 202, 302 generating multiple beams identified as beams B1, B2, B3, B4, B5, and B6 over an area 405 that includes portions of multiple countries, e.g., country A, country B, and country C. Communication system 400 may implement aspects of communication systems 100, 200, and/or 300. With the assignment of each beam to just one country, beams B1, B3, B5 are assigned to country A, beams B4 and B6 are assigned to country B, and beam B2 is assigned to country C.

In one implementation, an individual beam may be assigned to a single country by controlling or steering the beam. While a Non-Geostationary Earth Orbiting (NGEO) SV has a moving coverage area, a relative beam direction may be moved via a controllable antenna array to stay. or mostly stay, within one country, which is sometimes referred to as a "steerable beam". For example, beam coverage may move slowly within one country and then hop to a new country, e.g., after an SV 102, 202, 302 has transferred to a new NTN Gateway 104 or new gNB 106 or 307.

In another implementation, a satellite cell and satellite beam may be allowed to support access by different UEs 115 in two or more countries at the same time. For example, beam B1 may support access from UEs 115 in countries A and C, and beams B4 and B5 may support access from UEs 115 in countries A and B. In such cases, it may be important for the support of regulatory services if a gNB 106/202/307 and/or an AMF 122 can determine the country in which a UE 115 is located.

Figure 5:
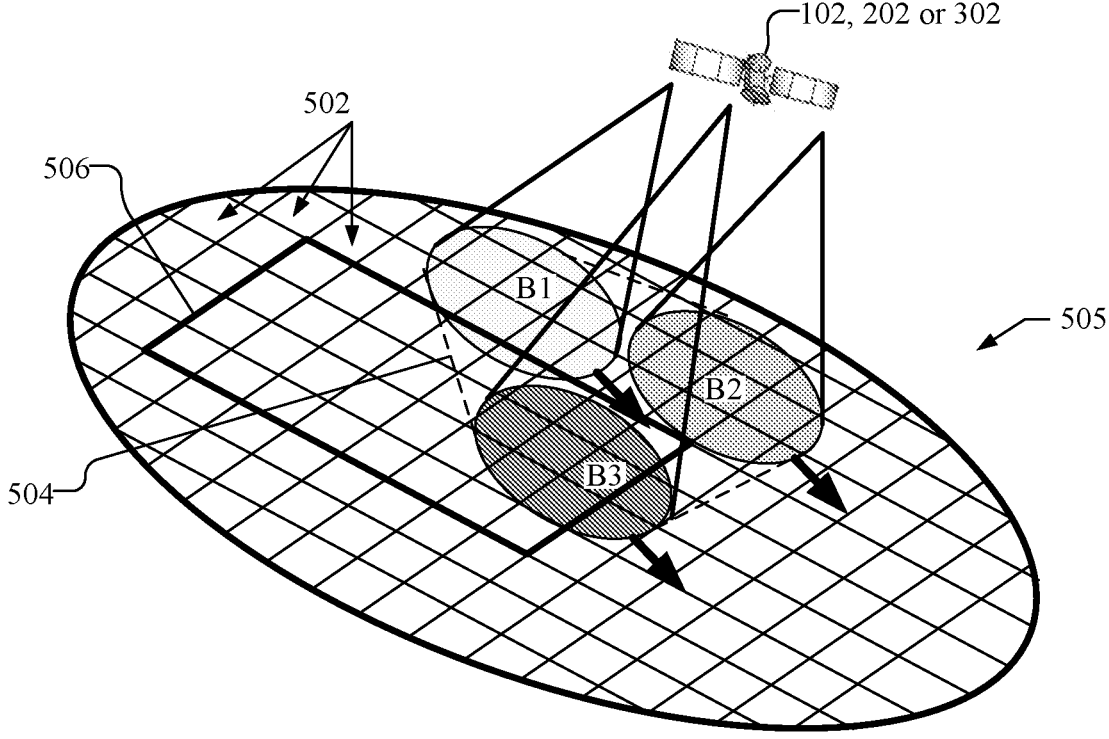
FIG. 5 illustrates an example of satellite cells produced by an SV over an area that includes a number of fixed cells.

FIG. 5 illustrates an example of a communication system 500 that includes satellite cells produced by an SV 102, 202, 302 over an area 505 that includes a number of Earth fixed cells 502. Communication system 500 may implement aspects of communication systems 100, 200, 300, and/or 400. A satellite cell may comprise a single beam or multiple beams, e.g., all beams in a satellite cell may use the same frequency or a satellite cell may comprise one beam for each frequency in a set of different frequencies. For example, beams B1, B2 and B3 may support three separate satellite cells (one beam per satellite cell) or may collectively support a single satellite cell (e.g., satellite cell 504 shown with dotted lines). Preferably, a satellite cell covers a contiguous area.

Satellite beams and satellite cells produced by an SV 102, 202, 302 may not align with cells used by terrestrial wireless networks, e.g., 5GCN 110 terrestrial cells or LTE terrestrial cells. For example, in an urban area, a satellite beam or satellite cell produced by an SV 102, 202, 302 may overlap with many 5GCN fixed terrestrial cells. When supporting satellite access to a wireless network, information regarding satellite beams and satellite cells produced by an SV 102, 202, 302 may be hidden from (e.g., not configured in or provided to) a 5GCN 110.

As illustrated in FIG. 5, an area 505 may include a number of Earth fixed cells 502, as well as fixed tracking areas (TAs) such as TA 506. Fixed cells are not "real cells," e.g., as used for terrestrial NR and LTE access, and may be referred to as "virtual cells" or "geographic cells." A fixed cell, such as fixed cells 502, has a fixed geographic coverage area, which may be defined by a PLMN operator. For example, the coverage area of a fixed cell or a fixed TA may comprise the interior of a circle, ellipse, or polygon. The coverage area is fixed relative to the surface of the Earth and does not change with time, unlike the coverage area of a satellite cell which typically changes with time for a LEO or MEO SV. A fixed cell 502 may be treated by a 5GCN 110 the same as a real cell that supports terrestrial NR access. Groups of fixed cells 502 may define a fixed TA 506, which may be treated by a 5GCN the same as TAs that are defined for terrestrial NR access. Fixed cells and fixed TAs used for 5G satellite wireless access may be used by a 5GCN 110 to support mobility management and regulatory services for UEs 115 with minimal new impact.

With regenerative SVs 202 with a non-split architecture as in communication systems 200, each satellite cell may remain with the same SV 202 and may have a moving coverage area supporting different 5GCNs 110 at different times.

With transparent SVs 102 and regenerative SVs 302 for a split architecture as in communication system 300, each satellite cell may be assigned to and controlled by one gNB 106 or 307 on behalf of one or more PLMNs in one country.

For a GEO SV 102/302, the assignment to a gNB 106/307 may be permanent or temporary. For example, the assignment may change on a daily basis to allow for peak traffic occurrence at different times in different parts of the SV 102/302 radio footprint and/or may change over a longer period to accommodate changing regional traffic demands. For a non-geostationary (NGEO) SV 102/302, the assignment might last for a short time, e.g., only 5-15 minutes. A non-permanent satellite cell may then be transferred to a new gNB 106/307 as necessary (e.g. when access to the NGEO SV 102/302 is transferred to the new gNB 106/307). Each gNB 106/307, for example, may have a fixed geographic coverage area, e.g., comprising a plurality of fixed cells 502 and fixed tracking areas (TAs). A satellite cell for a first NGEO SV 102/302 may be transferred from a first gNB 106/307 to a second gNB 106/307 when (or after) moving into the fixed coverage area of the second gNB 106/307. Prior to this transfer, UEs 115 accessing the satellite cell in a connected state may be moved to a new satellite cell for the first gNB 106/307 or could be handed off to the second gNB 106/307 as part of transferring the satellite cell. An SV 102/302 may be accessed from only one gNB 106/307 or from multiple gNBs 106/307, possibly in different countries. In one implementation, an SV 102/302 may be assigned to multiple gNBs 106/307 by partitioning satellite cells produced by the SV 102/302 among the different gNBs 106/307. Satellite cells may then be transferred to new gNBs 106/307 (and to new countries) as the SV 102/302 moves or as traffic demands change. Such an implementation would be a form of a soft handoff in which SV 102/302 transfer from one gNB 106/307 to another gNB 106/307 occurs in increments of satellite cells and not all at once.

Figure 6:
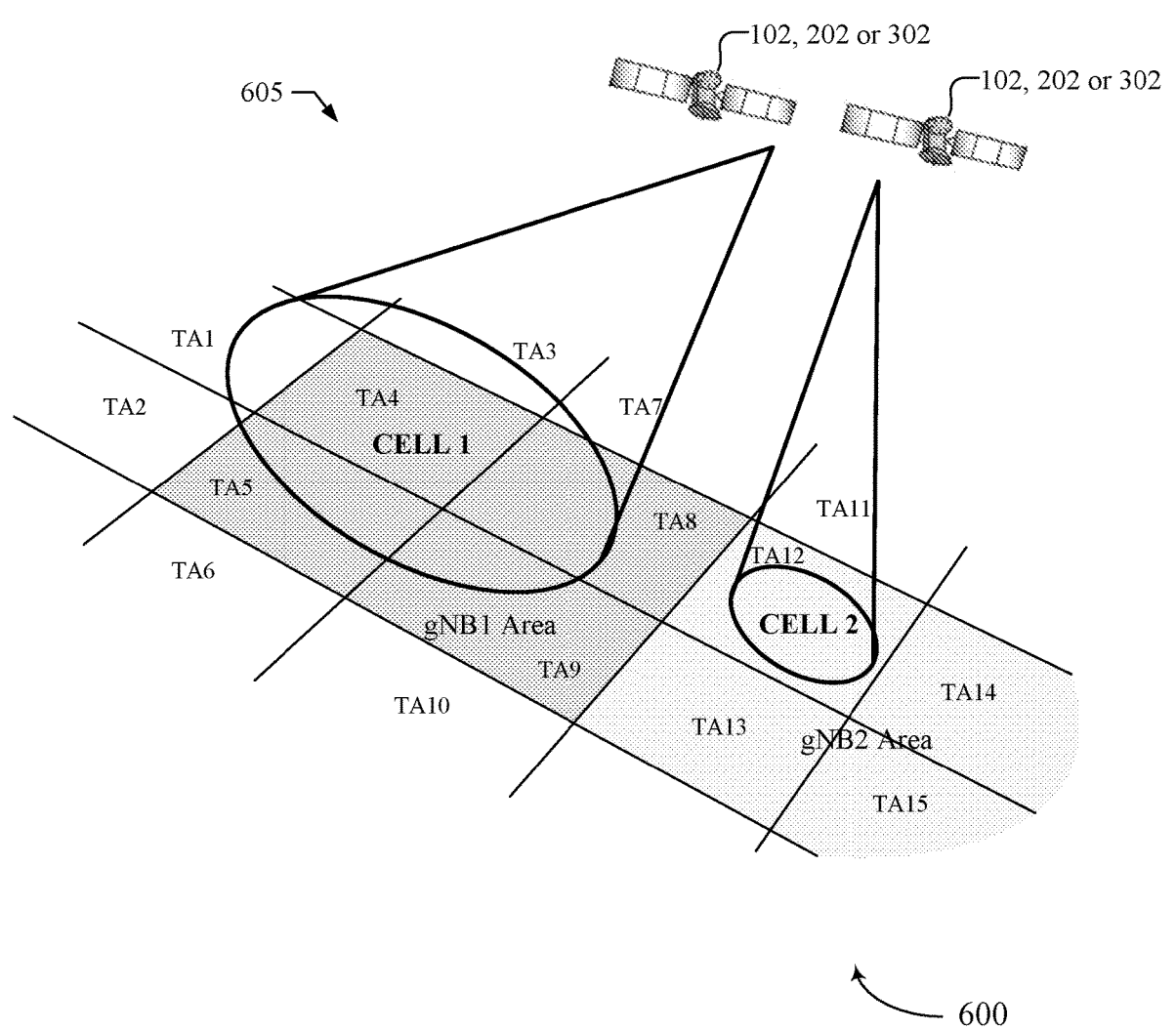
FIG. 6 illustrates an example of an assignment of satellite cells produced by an SV to fixed tracking areas (TAs).

FIG. 6 illustrates an example of an assignment of satellite cells, e.g., cell 1 and cell 2 in a communication system 600, produced by one or more SVs 102, 202, 302 over an area 605. FIG. 6 may implement aspects of communication systems 100, 200, 300, 400, and/or 500.

In communication system 600, and as illustrated, the area 605 includes a number of fixed TAs, e.g., TA1-TA15, wherein TA4, TA5, TA8, and TA9 are assigned to a gNB1 (which may be a gNB 106, gNB 202 or a gNB 307), and TA12, TA13, TA14, and TA15 are assigned to a gNB2 (which may be another gNB 106, 202 or 307). In one implementation, a satellite cell may be considered to support a fixed TA if the satellite cell is wholly within the TA (e.g., Cell 2 within TA 12); if the TA is wholly within the satellite cell (e.g., TA4 within Cell 1); or if the overlap of the coverage area of a satellite cell and a TA exceeds a predetermined threshold fraction of the total coverage area of the satellite cell or the total area of the TA (e.g., Cell 1 overlap with TA1, TA3, TA5, TA8 or TA9). An SV 102, 202, 302 may broadcast, e.g., in a System Information Block type 1 (SIB1) or SIB type 2 (SIB2), the identities (IDs) of supported PLMNs (e.g., where a PLMN ID comprises a Mobile Country Code (MCC) and Mobile Network Code (MNC)) and, for each supported PLMN, the IDs of supported TAs (e.g., where the ID of a TA comprises a Tracking Area Code (TAC)). For an NGEO SV, the supported PLMNs and TAs may change as satellite cell coverage areas change. A gNB 106/202/307 may determine PLMN and TA support (and thus the PLMN IDs and TACs which are broadcast in a SIB for each satellite cell) from known ephemeris data for each SV 102/202/302 and a known directionality and angular range for component satellite beams for each satellite cell (e.g., Cell 1 and Cell 2). A gNB 106/202/307 may then update SIB broadcasting.

Thus, as illustrated in FIG. 6, an SV 102/202/302 may broadcast for Cell 1 a SIB that includes TACs for TA4 and possibly TA1, TA3, TA5, TA8, and/or TA9. Similarly, the SV 102/202/302 or another SV 102/202/302 may broadcast for Cell 2 a SIB that includes a TAC for TA12 only. The Cell 1 may be assigned to gNB1 (which has coverage of TA4, TA5, TA8, and TA9) and Cell 2 may be assigned to gNB2 (which has coverage of TA12, TA13, TA14, and TA15). Cell 1 and Cell 2 may be transferred from gNB1 to gNB2 or from gNB2 to gNB1 if the cell coverage area moves from one gNB area to another.

The coverage area for a fixed TA may be defined in a manner that is simple, precise, flexible, and requires minimal signaling for conveyance to a UE 115 or gNB 106/202/307, or an entity in a 5GCN 110. A fixed TA area may be small enough to allow efficient paging by comprising an area supported by just a few satellite cells (e.g., less than 10) and may also be large enough to avoid excessive UE registration (e.g., may extend at least several kilometers in any direction). The shape of a fixed TA area may be arbitrary, e.g., the shape may be defined by a PLMN operator or may have one or more restrictions. For example, one restriction for the shape of the fixed TA area may be that a fixed TA along the border of a country precisely aligns with the border to avoid serving UEs 115 in another country. Additionally, a fixed TA may be restricted to align with an area of interest, e.g., a Public Safety Answering Point (PSAP) serving area, the area of a large campus, etc. Additionally, a fixed TA may be restricted so that parts of the fixed TA align with a physical obstacle, such as the bank of a river or lake.

The coverage area for fixed cells may likewise be defined in a manner that is simple, precise, flexible, and requires minimal signaling for conveyance to a UE 115 or gNB 106/202/307. A fixed cell coverage area may allow for simple and precise association with a fixed TA, e.g., one fixed cell may belong unambiguously to one fixed TA.

It may be beneficial for entities in a communication system (e.g. a UE 115 and/or AMF 122 in communication systems 100, 200, or 300) to know when satellite coverage will and will not be available at a particular location (e.g. a current location of a UE 115). Traditional satellite coverage information techniques make use of satellite orbital and ephemeris data to indicate to an entity (e.g. a UE 115) when each of a number of satellites will be visible at a particular location (e.g. a current location of the entity). With these techniques, the entity would need to calculate the position of a satellite (using the orbital or ephemeris data) and determine at what times the satellite will and will not be visible at the particular location, which may be processor intensive, require implementation of complex programming logic and be prone to error. For example, even when a satellite is visible at a location, the location may not be in coverage of a satellite cell supported by the satellite (e.g. if the satellite does not have an antenna directed towards the location and is able to transmit and receive signals to and from the location). Additionally, a satellite may not always have a backhaul connection to an NTN Gateway (e.g. an NNT Gateway 104) during the time that the satellite is visible at the location (e.g. if a PLMN is not configured to provide coverage using the satellite while the satellite is visible at the location).

One way in which satellite coverage data may be provided to a UE is through the broadcast of ephemeris data at an access stratum (AS) level for an NTN RAT. For example, for EPS, a base station, such as an eNB, may broadcasts ephemeris for up to (e.g.) four satellites in a System Information Block (SIB) such as a SIB32, which supports coverage information for the RAT of the particular AS (e.g., LTE LEO). The base station may additionally broadcast orbital parameters (and possibly a position) of each satellite. The data quantity broadcast per satellite may be approximately 18 octets (e.g. such as for EPS in 3GPP Release 17 using the SIB32). The total data for four satellites is then approximately 72 octets. The LEO satellite coverage at any location can be in the range of 5-15 minutes. Hence, the broadcast data for four satellites would minimally provide coverage data for around the next 60 minutes when there are almost no coverage gaps or around 2 hours with 50% coverage and around 10 hours with 10% coverage. Satellites may not return to cover the same location again for 12 hours or more, e.g., due to the Earth's rotation. Hence, a SIB32 may only be usable to indicate coverage at any location for around 1 to 10 hours. The quantity of coverage data needed for 24 hours of coverage may then be as much as 500 to 1000 octets. Moreover, the coverage data may not be fully reliable as radio cell information is not included, e.g., radio cell coverage and regions where NTN is visible but not supported may not be addressed. Further, the coverage data would not address TN RATs. Additionally, there may also be a security risk if a fake gNB/eNB were to broadcast a SIB32 indicating a lack of coverage at a time when there was coverage.

Another way in which satellite coverage data may be provided to a UE is at a Non Access Stratum (NAS) level. For long-term coverage information at a number of locations, a significant amount of data could be needed, which may not be suitable for NAS transfer, which may normally be used for controlling service to and mobility of UEs and not for providing large amounts of data to UEs.

Therefore, new techniques may be needed to provide more accurate and reliable satellite coverage information to entities like a UE 115, AMF 122, and an MME in the case of a 4G LTE network. Satellite coverage information (or data) may also be referred to as satellite coverage availability information (SCAI).

One way to provide coverage information (e.g. SCAI) to a UE 115 is a coverage map, which may be more advantageous than providing satellite orbital (ephemeris) data. When coverage data is provided as ephemeris/orbital data, the UE has to perform its own coverage prediction. For example, if the UE is at location L at time T, the UE needs to determine whether there will be coverage at this location and time. To determine this, the UE would use the ephemeris (and any radio cell) data and calculate whether there is satellite visibility (for L and T) and possibly radio cell coverage (if known) for L and T. The answer may be a binary yes/no (e.g., maybe with a threshold probability between yes and no). With a coverage map, the UE 115 may only need to look up the answer, which can be a very simple operation. Because the coverage map provider may have much more information than that available to a UE, in only a few orbital parameters (e.g., the provider may know exactly how many satellites and radio cells will be supported for L and T), the coverage map lookup yes/no answer may be much more reliable than providing ephemeris data to the UE.

Figure 7A:
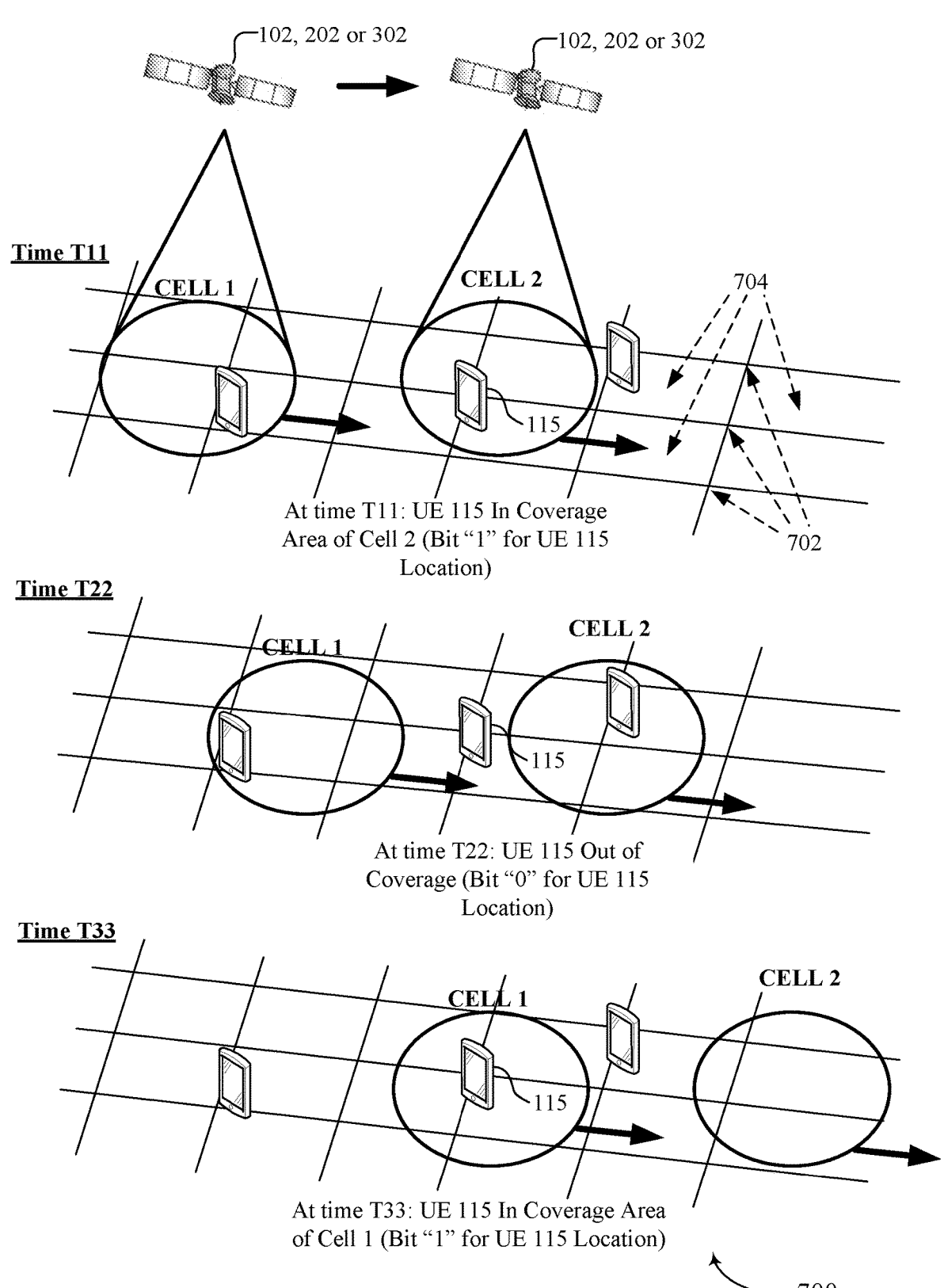
FIG. 7A illustrates an example of UEs that are in or out of coverage of an SV at different times and at different locations.

FIG. 7A illustrates an example of an assignment of satellite cells, e.g., cell 1 and cell 2 in a communication system 700, produced by one or more SVs 102, 202, 302 over an area divided into grid squares/points. FIG. 7A may implement aspects of communication systems 100, 200, 300, 400, 500, and/or 600.

Aspects of the techniques described herein may include a server (e.g. an operation and maintenance (O&M) server), which may be associated with (e.g. owned and operated by)

a serving PLMN for a UE or a space vehicle operator (SVO). The server may determine, pre-configure, and signal satellite coverage data showing times of satellite cell (NTN) coverage and lack of coverage (e.g., times of no NTN coverage) at different locations and/or at different times. The satellite coverage data may be provided by the server to a UE 115, an AMF 122, an MME, a gNB 106/202/307, and/or to other entities to show when wireless coverage via one or more satellite cells is and is not available at one or more locations. The satellite coverage data may be determined (e.g. by the server), in part, using knowledge of SV orbital or ephemeris data, SV support of satellite cells, and backhaul connection availability to an NTN Gateway. However, the satellite coverage data itself may exclude all of this original source information and may more directly indicate coverage versus lack of coverage, which may reduce processing complexity and processing load at a recipient entity (e.g. UE 115 or AMF 122) and avoid error.

In one embodiment, the satellite coverage data may be provided in the form of a "coverage map" which may reference, indicate or comprise a number of separate locations, designated L1, L2, L3, . . . Ln here, and/or a sequence of consecutive times, designated T1, T2, T3, . . . Tm here. Thus, coverage data may be provided for one or more locations and at one or more times. Each location Li ($1 \leq i \leq n$) may correspond to a single point on the Earth's surface or to an area on the surface of the Earth (e.g. where each area is between 1 and 20 km in length from one side to another or where each point is spaced 1 to 20 km away from nearest other points). The sequence of consecutive times may occur at intervals, e.g. fixed intervals where each fixed interval is 10 seconds up to 2 minutes. In one implementation, the areas may each correspond to a fixed cell or a fixed tracking area as illustrated and described in FIGS. 5 and 6. The locations Li may further be arranged in a grid pattern as exemplified in FIG. 7A, where the locations Li may be either points 702 corresponding to the intersections of the vertical and horizontal lines in FIG. 7A, or rectangular areas 704 corresponding to the areas bounded by the vertical and horizontal lines in FIG. 7A. While the grid pattern shown in FIG. 7A is rectangular, other grid patterns are possible (e.g. based on triangles or hexagons). In addition, while FIG. 7A shows rectangular areas, locations Li that correspond to areas may have any shape, including (e.g.) circles, ellipses, and polygons. Furthermore, locations Li that correspond to areas may be non-overlapping (e.g. as in FIG. 7A) or may be overlapping (e.g. as in FIG. 7A) or may be overlapping. For each location Li ($1 \leq i \leq n$) and time Tj ($1 \leq j \leq m$), the coverage map can indicate whether satellite coverage is or is not available at that location and at that time. A UE 115 can be assumed to be at a location Li if Li corresponds to an area and the UE 115 is inside the area or if Li corresponds to a point and is the closest point to UE 115.

Satellite coverage being available can correspond to a location Li being either entirely or partially within the coverage area of at least one satellite cell that can provide access to a particular PLMN (e.g. a current serving PLMN for a UE 115, a home PLMN for a UE 115 or any PLMN for which a UE 115 is allowed access). Similarly, satellite coverage not being available can correspond to a location Li not being either entirely or partially within the coverage area of at least one satellite cell that can provide access to a particular PLMN (e.g. a current serving PLMN for a UE 115, a home PLMN for a UE 115 or any PLMN for which a UE 115 is allowed access). For a location Li corresponding to a point (e.g. a point 702 in FIG. 7A), the point would typically be either within or not within a coverage area of a satellite cell with no difference between being partially or entirely within the coverage area. For a location Li corresponding to an area (e.g. an area 704 in FIG. 7A), the location Li may be partially within but not entirely within the coverage area of a satellite cell, and hence there may be a difference between a coverage map based on partial inclusion and a coverage map based on total inclusion. A UE 115 or other entity (e.g. an AMF 122 or MME) can then decide (e.g. based on serving PLMN or home PLMN configuration data) whether to base satellite coverage determination for a location Li on partial inclusion or total inclusion.

A coverage map can indicate whether satellite coverage is or is not available at a location Li and a time Tj using a binary one value or a Boolean TRUE value (e.g. corresponding to coverage being available) or a binary zero value or Boolean FALSE value (e.g. corresponding to coverage not being available). A coverage map can then be represented by an array or a string of binary ones and zeros (or Boolean TRUE and FALSE values) and hence as a bit map, which may comprise a bit string or a bit array, and where there is some known correspondence between each bit in the bit map and a particular location Li and time Tj. Additional information may be provided as part of a coverage map, or separately from it, to indicate the locations L1, L2, L3, . . . Ln, and the consecutive times T1, T2, T3, . . . Tm that are represented in the coverage map and (if not implicit) to indicate a method used to encode the bit values. Thus, a coverage map (e.g. a bit map) may include multiple bits, where each bit corresponds to satellite coverage data for a specific location and a specific time.

For example, as shown in FIG. 7A at time T11, a UE 115 may be located within or at a grid point location where UE 115 is within the coverage area of cell 2. Accordingly, a bit map may be encoded to indicate a "1" bit at a bit position corresponding to the current location of UE 115 at time T11. Accordingly, UE 115 may transition to or otherwise enter a coverage state for cell 2 via SV 102/202/302 at time T11.

However, movement of SV 102/202/303 may result in the coverage area of cell 2 moving such that, at time T22, UE 115 is no longer within the coverage area of cell 2. UE 115, accessing the coverage map, may determine that its current location is out of coverage at time T22 by finding a "0" bit within the bit map for a bit position corresponding to the current location of UE 115 at time T22. Accordingly, at time T22, UE 115 may transition or otherwise enter a no coverage state. UE 115 may adopt various power saving and resource conservation techniques while operating in the no coverage state.

At time T33, movement of another SV 102/202/302 may result in the current location of UE 115 being within the coverage area of cell 1. Again, a bit in the bit map corresponding to the current location of UE 115 at time T33 may be encoded as a "1" bit to again indicate that UE 115 has satellite coverage at time T33. Accordingly, UE 115 may transition to or otherwise enter a coverage state and resume communications via the other SV 102/202/302.

The total number of bits in a bit map may depend on the number of locations n and the number of times m for which coverage data is provided. For example, for a PLMN with a 2000 by 2000 km coverage area, 24 hours of coverage data, 1-minute intervals between consecutive times, and 20 km square grid point spacing, the coverage map may be encoded as a bit map containing ($100 \times 100 \times 24 \times 60$) bits which equal 1.8 Megabytes (mega octets) of data without compression. However, it is likely that bits in the bit map corresponding to nearby locations and nearby times will typically have the same value (either a "1" or a "0") due to coverage conditions typically being the same at nearby times and at nearby locations. This may allow compression of the bitmap using one-dimensional, two-dimensional, or three-dimensional compression techniques (e.g. a compression algorithm). For example, with a one-dimensional technique, runs of consecutive zero or one-bit values in the bit map can each be encoded as a different and typically shorter bit sequence that can be distinguished from any other bit sequence encoding (e.g. using the one-dimensional coding scheme defined in the ITU T.4 "Standardization of Group 3 facsimile terminals for document transmission" standard). This may significantly reduce the overall size of the bit map. For example, with a two-dimensional technique, a bit map applicable to one time (e.g. T1) may be compressed using a one-dimensional technique, and then a bit map for a next time (e.g. T2) may be encoded by assigning a "0" bit value to any Location Lj whose coverage did not change since the previous time T1 and a "1" bit value to any location Lk whose coverage did change since the previous time T1. This bit map may then be compressed using the same (or a similar) one-dimensional technique used for the bit map at time T1. Additionally or instead, a bit map may be provided to an entity (e.g. a UE 115) for just a single location (e.g. a current location of a UE 115) or for a small number of locations which may substantially reduce the size of the bit map. For example, a small number of locations might comprise: (i) locations nearby to a UE 115; (ii) locations which a UE 115 has recently visited; (iii) locations which a UE 115 habitually visits such as a workplace, home, or the location of a friend or relative; (iv) locations which a UE 115 indicates as being of interest; (v) locations which a UE 115 is expected to visit in the near future; or (vi) some combination of these. For the previous example, if a bit map for just one location was provided, the uncompressed bit map size would be reduced to 180 bytes and if a bit map for an area 100×100 km was provided, the uncompressed bit map size could be 4.5 Kbytes.

A separate time-location-based coverage map may be provided for each RAT, or coverage maps for each RAT may be combined, e.g., using logical OR or by including the separate bit values. Additionally, coverage maps for a TN RAT may be provided. In some implementations, a coverage map may provide two (or more) bits per location and time to indicate a probability of coverage (e.g. zero, low, moderate, high). For one location, 24-hour coverage at 2-minute intervals, the uncompressed data size for coverage data for one RAT may be approximately 90 octets.

Figure 7B:
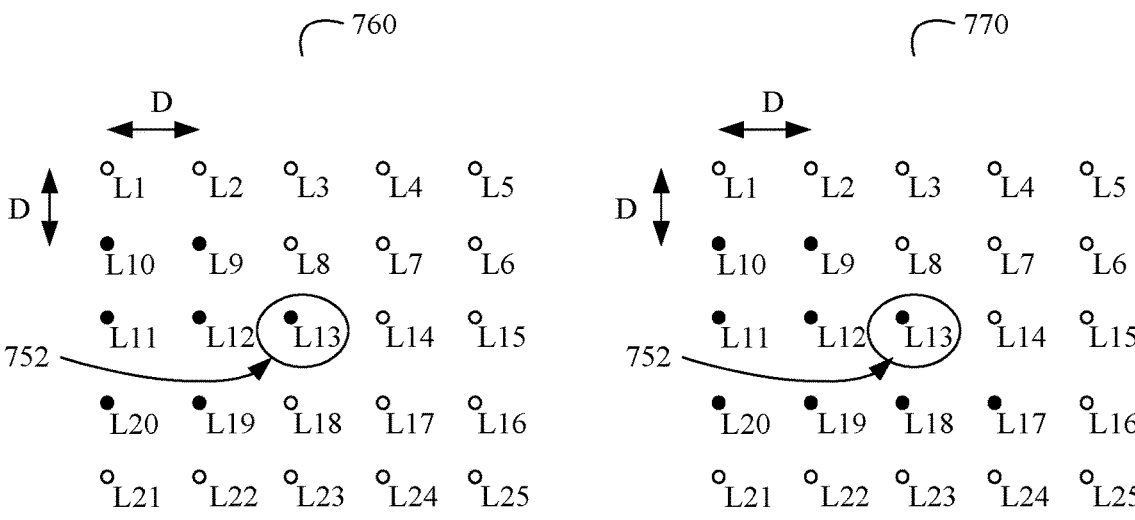
FIG. 7B illustrates a coverage map and coverage bit map for a UE.
Figure 7B:

FIG. 7B illustrates an example of coverage maps represented by bit maps, where compression may be used, for a communication system 750, produced by one or more SVs 102, 202, 302 over an area overlaid with a square array of grid points. FIG. 7B may implement aspects of communication systems 100, 200, 300, 400, 500, 600, and/or 700. The grid point array in communication system 750 comprises 25 grid points (labeled L1, L2, L3, . . . L25) which are separated by distances D from one another (e.g. where D equals 10 to 50 km) and arranged around a central grid point 752 (corresponding to location L13), which may correspond to a current or recent location of a UE 115. The grid point array may be used to provide a coverage map to UE 115 for a current or recent location of UE 115 (corresponding to the grid point 752) and for a small number of locations at grid points nearby to the current or recent location. FIG. 7B shows satellite coverage 760 for the grid point array at a time T1 and satellite coverage 770 for the same grid point array at a subsequent time T2 (e.g. where T2 may occur one minute or a few minutes after time T1). A grid point location that has satellite coverage is represented in FIG. 7B by a small solid black disk and a grid point location that does not have satellite coverage is represented in FIG. 7B by a small disk with a white interior. If a bit string is used to represent the coverage at the grid point locations at time T1 with a "1" bit value used to indicate coverage and a "0" bit value used to indicate no coverage, the bit string for the locations in the order L1, L2, L3, etc., would be "0000000011111000001100000". This bit string contains 25 bits (for the 25 locations), where there are 8 consecutive "0" values, 5 consecutive "1" values, 5 consecutive "0" values, 2 consecutive "1" values, and 5 consecutive "0" values. These may be compressed, for example, using the one-dimensional coding scheme defined in the ITU T.4 standard (and using white to represent "0" values and black to represent '1" values) as "10011", "0011", "1100", "11" and "1100", respectively. This allows the bit string to be compressed to "10011001111001111100" which now has 19 bits. A bit string representing the coverage 770 at time T2 can be created using a "0" bit value for any location whose coverage did not change at time T2 and a "1" bit value for any location whose coverage did change at time T2. In the example in FIG. 7B, coverage only changes at locations L17 and L18 at time T2. Hence a bit string showing the coverage 770 for time T2 would be "0000000000000000110000000". This has 16 consecutive "0" values, 2 consecutive "1" values, and 7 consecutive "0" values. These may be compressed, for example, using the ITU T.4 one-dimensional coding scheme as "101010", "11", and "1111" respectively. This allows the bit string to be compressed to "101010111111" which now has only 12 bits. Compression may be particularly efficient when a large area comprising many grid point locations is entirely in coverage or entirely not in coverage, and/or when coverage does not change from one time to the next, because there can then be a large number of consecutive bits with the same bit value, which can allow much higher compression than in the two examples above (e.g. using the ITU T.4 standard schemes or other schemes).

In another embodiment, satellite coverage data may be provided in the form of a "time sequence", which may comprise a sequence of times or time periods indicating when satellite coverage begins and ends at a particular location. For example, a sequence of consecutive times t1, t2, t3, . . . tr may be provided indicating when satellite coverage may start or end at a certain location, where alternate times in the sequence alternately indicate the start or end of satellite coverage. For example, satellite coverage may be indicated to start at t1, end at t2, start again at t3, end again at t4, etc. There may be an implicit convention or an explicit indication that the first time in the sequence indicates a start (or end) of satellite coverage. In a variant of this embodiment, the consecutive times t1, t2, t3, . . . may comprise time periods and not time instants. There may then also be an implicit starting time T (e.g. which may be a current time at which the consecutive times are received by an entity) or an explicitly provided starting time T. An entity can then determine that satellite coverage will start (or end) at time T+t1, end (or start) at time T+t1+t2, start again (or end again) at time T+t1+t2+t3, etc.

In some embodiments, a coverage map may be combined with a time sequence. For example, a coverage map (e.g. a bit map) may be provided to a UE 115 indicating locations with and without satellite coverage at a time T1. A second time T2 or a duration D2 may also be provided to the UE 115 indicating a time or duration for the coverage map. For example, the provision of a time T2 may indicate that the satellite coverage indicated by the coverage map remains the same (for all locations in the coverage map) from time T1 to time T2. Similarly, the provision of a duration D2 may indicate that the satellite coverage indicated by the coverage map remains the same for the duration D2, i.e. from time T1 to time T1+D2. In some embodiments, a coverage map and an extra time or duration (e.g. T2 or D2 in the previous example) may be provided when all locations in the coverage map either have satellite coverage or do not have satellite coverage.

Figure 7C:
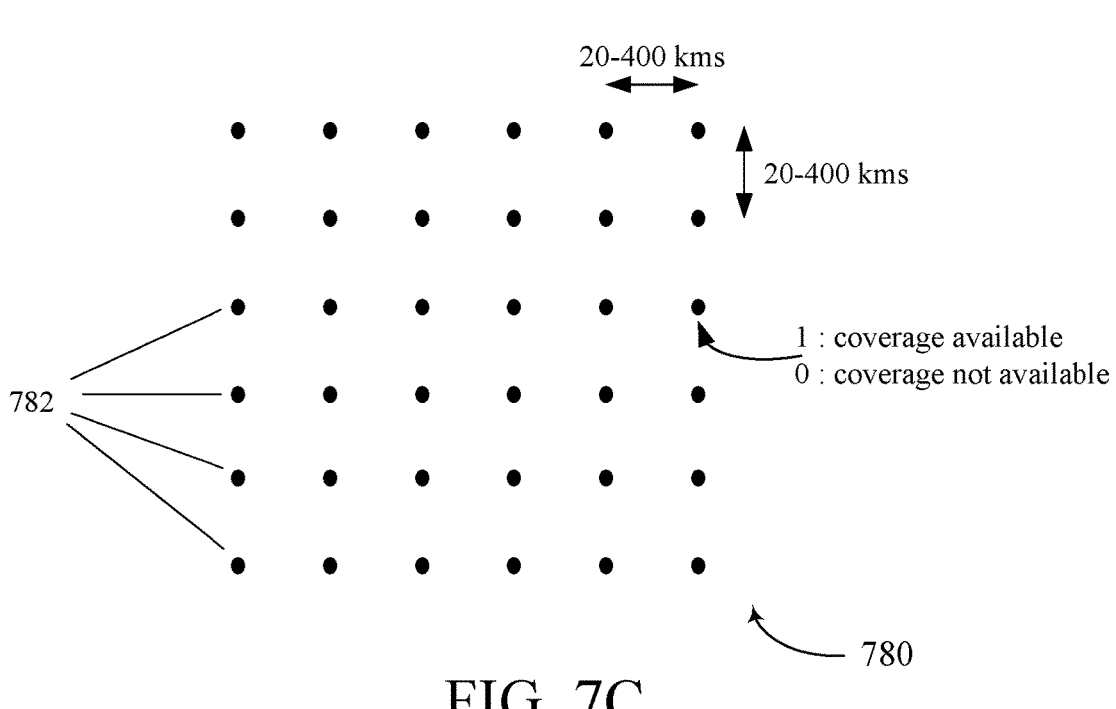
FIG. 7C illustrates another example of a coverage map and coverage bit map for a UE.

FIG. 7C illustrates an example of a coverage map 780 that illustrates locations 782 as grid points in a rectangular array. As discussed above, coverage map 780 may enable a UE 115 to determine that it has to remain with no service or has to attempt to register on available different RATs/PLMNs to receive the normal service during discontinuous coverage in a current NTN RAT. With the use of a coverage map 780, the UE 115 may avoid attempting PLMN access when there is no network coverage. Further, coverage map 780 may inform the UE 115 when there is network coverage so that the UE 115 may attempt PLMN access as needed e.g. to transfer signaling, transfer data or receive paging, etc., with the network coverage provided by any RAT supported by the UE. The content of coverage data in coverage map 780 may be general enough to support both satellite (NTN) RATs and TN RATs, either separately or in combination.

The content of coverage data included in coverage map 780 may show the expected coverage by one or more satellite RATs and/or one more terrestrial RATs at one or more locations and for a particular time in the future. A set of coverage maps can then be provided to the UE 115 for each of a sequence of times occurring at fixed periodic intervals, such as at intervals of one minute. The locations 782 supported by coverage map 780 may correspond to grid points in a rectangular array, as illustrated in FIG. 7C, but other arrays are possible, such as a hexagonal array.

In FIG. 7C, each grid point (dot) 782 represents one location. These locations (i.e. grid points) can be spaced apart horizontally and vertically by a fixed distance (e.g. 20 to 400 km). The absolute location of each grid point can then be known by specifying an absolute (global) location for just one grid point in the array (e.g. a center grid point or a grid point at one corner). The expected (satellite and/or terrestrial) coverage at the location of each grid point can be indicated by a binary one value (e.g., when there is coverage) or a binary zero value (e.g. when there is no coverage), which would allow the entire coverage map to be represented and encoded as a binary array, as discussed previously. This binary array might be applicable to just one time and might then need to be repeated to indicate coverage at other times. For example, in the case of the grid point array shown in FIG. 7C, 36 bits would be needed to indicate the coverage at all 36 grid points. If this coverage applies to a time T1 and coverage is needed for additional times T2, T3, . . . Tm, then a total of 36*m bits would need to be provided along with some encoding rules on how the bits are to be associated with the different grid point locations and different times T1 to Tm.

Instead of providing a simple binary yes/no indication of coverage, expected coverage could be indicated by assigning 2 or more bits for each location to indicate a probability of coverage—e.g. where 00=zero probability of coverage, 01=low probability, 10=medium probability, 11=high probability of coverage. The coverage map 780 can further indicate coverage for just one RAT or may indicate expected coverage for multiple RATs. For example, with binary coverage values assigned to a number of RATs R1, R2, . . . Rn, a binary one could mean that there is coverage from at least one of the RATs R1-Rn, whereas a binary zero value could indicate that none of the RATs provide coverage.

Because it is likely that coverage will often be the same for nearby times and for nearby locations, there would be the possibility of compressing the binary encoding of the coverage maps to reduce bit size.

In the case of one location (e.g. possibly suitable for a UE 115 that will not move by more than around 200 km from some initial location), the size of the binary coverage map for 24 hours of coverage data at 2-minute intervals could be 90 octets without compression and ignoring extra data like a global location indication of the one location.

The example in FIG. 7C assumes that a coverage map 780 is spatial (for one time only) and, as noted previously, is repeated for subsequent times, i.e.:

Coverage Map=<Coverage for locations L1 to Ln at T1> <Coverage for locations L1 to Ln at T2> <Coverage for locations L1 to Ln at T3> . . . <Coverage for locations L1 to Ln at Tm>

However, this could be reversed by providing a temporal coverage map for one location (grid point) for a sequence of times and then repeating this for each of the other locations (grid points), i.e.:

Coverage Map=<Coverage for location L1 at T1, T2, . . . Tm> <Coverage for location L2 at T1, T2, . . . Tm> <Coverage for location L3 at T1, T2, . . . Tm> . . . <Coverage for locations Ln at T1, T2, . . . Tm>

According to some embodiments, the precision (accuracy) of the coverage and no coverage indications can be increased using a smaller grid point spacing (e.g. 100 km instead of 400 km) and smaller interval between successive times (e.g. 15 seconds instead of 1 minute), though with an accompanying increase in coverage map size.

According to some embodiments, in order to compress the data size of a coverage map, any sequence of repeated binary ones or repeated binary zeros in a coverage map may be indicated by including the number of repeated binary ones or binary zeros rather than by including all of the repeated values. For example, a temporal coverage map for one location X (grid point) for a sequence of times could be expressed as:

Coverage at Location X=<Start Time> <1/0 duration 1> <1/0 duration 2> <1/0 duration 3> . . . <1/0 duration N>

In this example, a leading 1 or 0 binary value can indicate whether there is coverage or not and the value of the associated duration indicates for how long the coverage or lack of coverage will persist. The durations can be related to actual time periods given the start time. If durations are encoded as 7-bit values (e.g. in units of minutes), the coverage at location X becomes an octet sequence instead of a binary sequence. This could result in a much smaller coverage map than using binary encoding if the durations of no coverage and/or of coverage tend to be fairly large (e.g. more than 20 minutes), such as when coverage is either very sparse or highly available. The durations may be further encoded using 2 alternative units (e.g. minutes versus seconds as indicated using an extra bit) to achieve higher accuracy and precision with only a small increase in coverage map data size.

SCAI may also be provided to an MME or AMF (e.g. an AMF 122) as well as to a UE. For an AMF (or MME), SCAI may apply to an area—and by implication a serving area for an AMF (or MME) which may be large (e.g. an entire country or region of a country). The SCAI may also need to apply to a period of time for this area (e.g. 6 hours, 24 hours, 48 hours, etc.) to enable an indication of when coverage is and is not available for different locations within the area.

An individual UE (e.g. UE 115) would not normally need SCAI for an entire AMF (or MME) area. However, since a UE can move around, and possibly unpredictably, within an AMF (or MME) serving area and possibly cross over different AMF (or MME) serving areas, an area approach to supporting SCAI for a UE could also be suitable. For example, in an extreme case where a UE is not expected to move a large distance (e.g. by less than 25 km), UE SCAI might be minimized to a single location or to a small area (e.g. a circle with a 25 km radius) surrounding a single location. In other cases, where a UE can move by longer distances, possible future locations of the UE (e.g. based on a maximum distance of travel estimate) can be used to define a larger area for which SCAI is provided. Either possibility would make UE SCAI a subset of SCAI for an AMF (or MME) or for several AMFs (or MMEs) when the UE may cross over AMF (or MME) areas.

Additionally or instead, UE SCAI might be based on a known or expected trajectory of a UE in which future UE locations are defined together possibly with the times at which the UE will be at these locations. When the times are not known, the UE trajectory can define an area for which SCAI can be provided as a subset of SCAI for an AMF (or MME). When the times are known, UE SCAI can be provided for specific locations at specific times which may reduce the amount of SCAI. However, the UE SCAI can remain a subset of SCAI for an AMF (or MME) by including coverage information for a subset of both the locations and times of SCAI for an AMF (or MME).

With respect to the content of SCAI, according to some embodiments and as described previously, satellite coverage availability may be indicated by a Boolean "True" or "False" value (e.g. as discussed for FIGS. 7A-7C) which could be provided for a set of locations (e.g. within an AMF or MME area or within an area applicable to a UE) and for a sequence of times. At a particular location and time, the indication can mean simplistically that a UE would either be able to (True), or not able to (False), access at least one satellite for a particular satellite RAT at that location and time. That would mean coverage at the particular location and time by at least one satellite radio cell with sufficient signal power and quality to be considered by a UE as a "suitable cell" (e.g. according to requirements in 3GPP TS 38.304 for NR or 3GPP TS 36.304 for LTE). Radio cells that were not able to provide coverage to a particular location due to regulatory requirements (e.g. where a radio cell unintentionally provides coverage to a non-allowed country) or PLMN restrictions (e.g. where a radio cell does not support a particular serving PLMN or equivalent PLMN at a particular location) would have to be discounted (e.g. ignored).

However, not all UEs might be equal in terms of their minimum signal receive power and quality requirements for selecting a "suitable cell". Differences could exist between different types of UE such as a very-small-aperture terminal (VSAT) with a small (and movable) dish antenna, a handheld UE (e.g. smartphone) with an integrated antenna, and a UE in a vehicle or inside a building with access to an external (e.g. non-dish) antenna. These differences might affect cell selection for satellites with a low elevation (e.g. 15 degrees or less) where low signal levels might allow access by some UEs but not others.

Since access to a suitable cell can depend on the receiver sensitivity of a UE including a UE antenna gain or loss, SCAI True and False indications could assume a standard minimum receiver sensitivity for a UE, e.g. as defined in 3GPP TS 38.101-5 for NR and 3GPP TS 36.102 for LTE. Any difference to this (e.g. for a VSAT UE) could be indicated by an overall receiver and antenna gain or loss for a UE relative to the standard minimum sensitivity.

Alternatively or in addition, SCAI could distinguish between (e.g. be based on) one or more of the following UE parameters:
UE Type (e.g. VSAT, handheld UE with integrated antenna, other UE with external antenna)
Antenna Rx gain (or loss)
Overall UE receiver and antenna gain (or loss)
Minimum Receive Power (and Quality) Level(s) supported by a UE
SCAI provided to an AMF or MME (e.g. by an O&M server) could then include SCAI for each of different allowed values of the above parameter(s), whereas SCAI provided to a single UE (e.g. by a server or by an AMF or MME) would include SCAI for just the particular parameter value(s) applicable to that UE.

Additionally or alternatively, providing SCAI (e.g. from a server to a UE, AMF or MME)) may comprise providing an indication of the maximum signal power (and quality) available at any location and time for all satellite radio cells providing coverage to the location at that time. The signal power (and quality) could be in terms of intensity (i.e. dBm per unit area for power) or in terms of power (dBm) received by an ideal isotropic antenna. An indication of this maximum signal power (and quality) could be provided over an entire area for any particular time in the form of a heat map where locations with the same maximum signal power (and quality) level would have a common numeric value (or values), which may be visually represented by a unique shade and/or color on a map of the area. Multiple instances of such a heat map could be provided to a UE, AMF or MME for a sequence of separate times. For a UE, a small map might suffice with power level indications for just specific locations (and times).

Figure 7D:
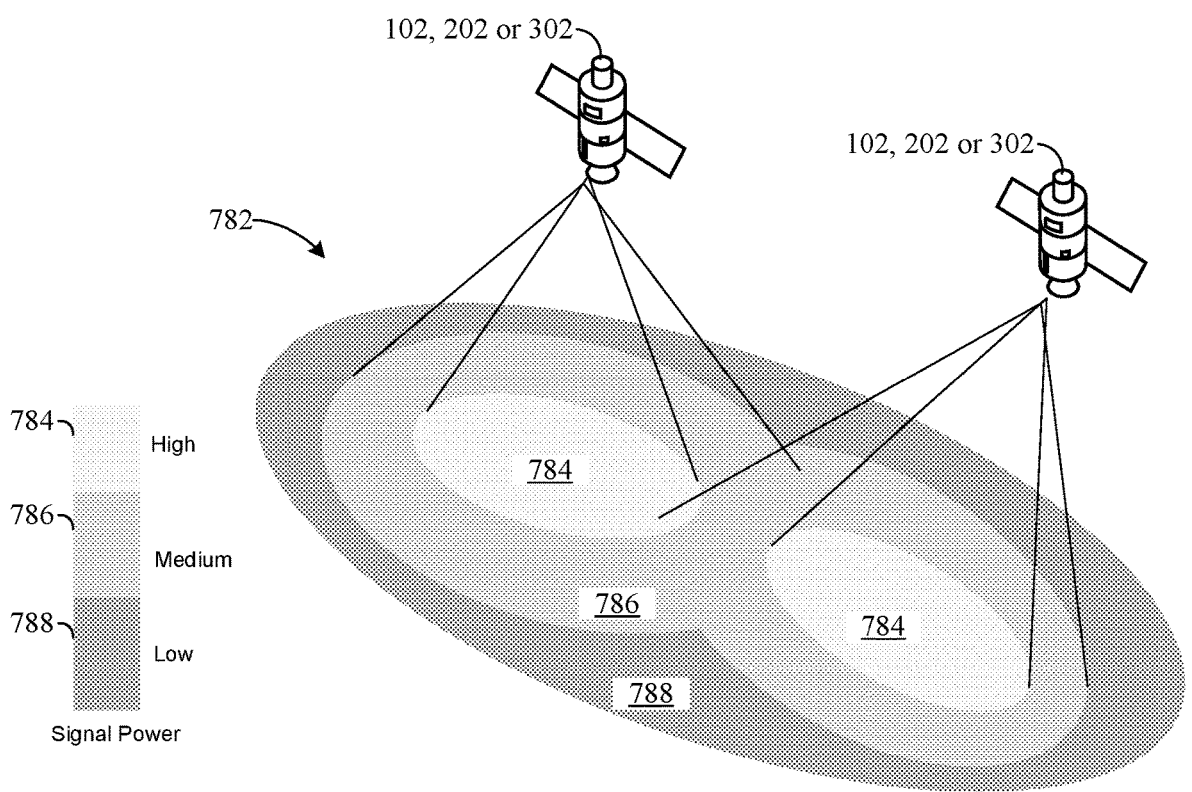
FIG. 7D illustrates an example signal power heat map that may be used for indicating satellite coverage availability, according to some embodiments.

FIG. 7D shows an example visual representation of a heat map. In this example, for SVs 102, 202, 302, a heat map of an area 782 is illustrated. In the heat map, the area 782 is separated into regions having high 784, medium 786, and low 788 maximum signal power, respectively. Other heat maps may vary in the number of gradations of values, allowing for coarser or finer mapping of signal power, depending on desired functionality.

For a UE, SCAI could be provided for a known or expected UE trajectory, according to some embodiments. In a limiting degenerate case, the trajectory could become a single location when the UE was not expected to move by more than some maximum distance (e.g. 25 km). An initial location could be provided using complete coordinates (e.g. latitude, longitude) and subsequent locations (when present) could be indicated as locations relative to the initial location. SCAI indications could then be provided for each location and for one or more times when the UE was, or might be, expected to be present at that location.

According to some embodiments, to indicate different locations over an area (e.g. for an AMF or MME or for a UE whose future movement was unknown), a grid point approach can be used (e.g. as discussed for FIGS. 7B and 7C) in which locations are indicated for a set of grid points in a rectangular or hexagonal array with equal spacing.

Figure 7F:
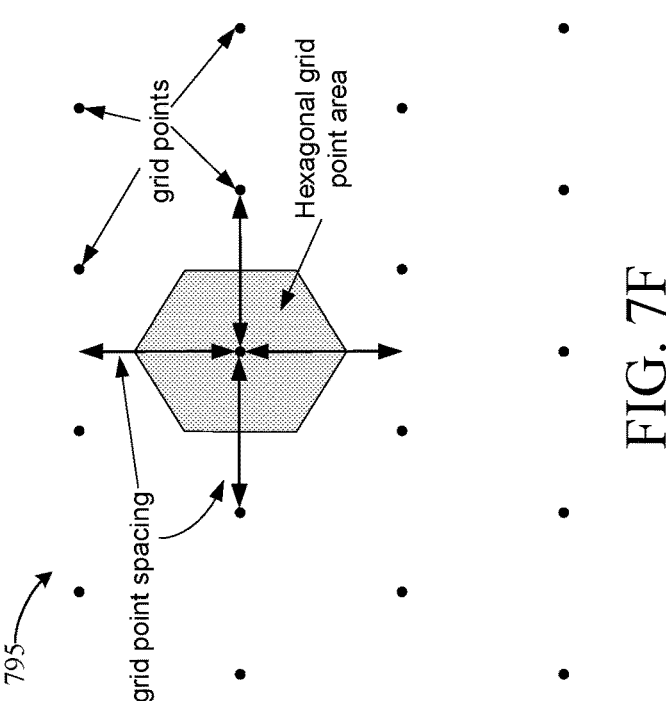
FIGS. 7E and 7F illustrate different types of grid point arrays that may be used for indicating satellite coverage availability, according to some embodiments.
Figure 7E:
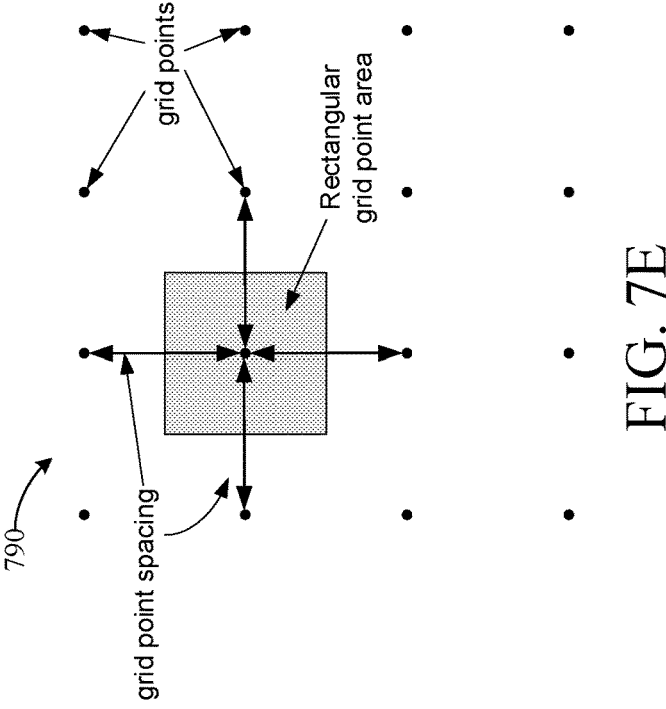

FIG. 7E illustrates an example rectangular grid point array 790, and FIG. 7F illustrates an example hexagonal grid point array 795. A Boolean Coverage Availability Indication or a Numeric Signal Power Indication could be provided for each grid point and could be calculated (e.g. by a server) to apply to either just that location (Option A) or to an area ("grid point area") around the grid point containing locations that were closer to that grid point than to any other grid point (Option B). As an example, a Numeric Signal Power Indication for a grid point could be set to either the signal power at the grid point location (for Option A) or the minimum signal power for all locations in the grid point area (for Option B). A Boolean Coverage Availability Indication could be likewise set to True if and only if there was coverage at either the grid point location (for Option A) or at all locations in the grid point area (for Option B).

According to some embodiments, the SCAI indications for a set of grid points may be provided for a sequence of times with a fixed periodic interval. There might be a convention that SCAI indications remain valid for some minimum portion of the time interval. For example, for a sequence of times T0–T, T0, T0+T, T0+2T (where T is the periodic interval), the SCAI indication provided for T0 might be calculated to apply minimally to the time T0 or some portion (up to 100%) of the time interval T0–0.5T to T0+0.5T. Coding of the SCAI could be location-based and then time-based, where SCAI indications are provided for all grid point locations at a particular time, with the data then repeated for each successive time. Alternatively, the coding could be time-based and then location-based, where the opposite convention is used. Using single bits to represent Boolean Coverage Availability Indications and binary values to represent Numeric Signal Power Indications, the entire SCAI could be encoded as a bit string. In some cases, SCAI indications may remain the same for different locations for long periods of time. This may generally apply when satellite access availability is either low (e.g. less than 15% of the time) or high (e.g. greater than 85% of the time). For these cases, providing SCAI indications for a sequence of times with a fixed periodic interval would generally repeat most of the same data at each periodic time. A more efficient way to provide an SCAI indication, in this case, may be to provide an SCAI indication together with a time period for which the indication applies. For a particular location and with N durations, this would lead to the following type of sequence:

<Initial Time> <N> <SCAI Indication 1> <Period 1> <SCAI Indication 2> <Period 2> . . . <SCAI Indication N> <Period N>

The Initial Time may indicate the starting time. Each period may indicate for how long a particular SCAI Indication applies with the starting time for that period equal to the Initial Time plus all the previous Periods. This may be encoded as a bit string and repeated for each grid point or each location, according to some embodiments.

With respect to the encoding of SCAI, different types of SCAI content as described above may be combined and then encoded in different ways. Three examples are provided below that may be used, according to some embodiments. These examples are assumed to be used to provide SCAI to a UE, where the UE first indicates a number of parameters (referred to as input parameters) and values of the parameters to a source of SCAI such as a server and the server then sends SCAI that is applicable to the parameters and parameters values received from the UE. However, the examples can also apply to providing SCAI to an MME or AMF instead of to a UE, where the MME or AMF provide the same parameters and parameter values (instead of the UE) and receives back the SCAI applicable to the parameters and parameter values.

A first example of SCAI encoding involves using grid points with Boolean coverage availability indications. In this example, a UE may first indicate the following "input parameters" to a source of SCAI (e.g. an external server):

Registered PLMN and/or a List of supported PLMNs (if not already known or implied);

One or more satellite RATs (satellite availability is then based on radio cell availability for any of the RATs);

List of supported frequency bands (if not implied by the particular RATs);

Location (e.g. latitude and longitude) for a reference grid point (e.g. the most Southerly and then most Westerly grid point);

Grid Point Spacing;

Start Time, Periodic Time Interval, Number of Periodic Times;

Type of Array (e.g. rectangular or hexagonal);

Number of Grid Points (e.g. total number or separate numbers in North-South and East-West directions);

Parameter(s) for minimum receive signal power comprising one or more of:

UE Type (e.g. VSAT, handheld UE with integrated antenna, other UE with external antenna);

UE Category (e.g. category M1 or category NB1/NB2 for a UE with E-UTRA access);

UE antenna Rx gain (or loss);

UE Receiver and Antenna Gain or Loss relative to minimum requirements (e.g. in 3GPP TS 38.101-5 or 3GPP TS 36.102);

Minimum Receive Power (and Quality) Level(s) supported by a UE; or some combination of these.

As noted above, an AMF or MME could provide the same set of input parameters when requesting SCAI (e.g. from a server or using O&M) except that these might be provided separately for each satellite RAT, each frequency band, and for different receive signal power parameters.

It is noted that a grid point spacing can define a North-South and East-West straight line distance between pairs of adjacent grid points. Due to the curvature of the Earth, this distance might be measured over a great circle, which can be a line of longitude for distances in a North-South direction and a great circle at right angles to this for an East-West direction that would approximate a line of latitude at lower latitudes but would diverge from this at higher latitudes.

The input parameter values could be constrained to reduce complexity. For example, a reference location could be quantized to exact degrees or exact half degrees of latitude and longitude; grid point spacing might be restricted to say 20 km, 50 km, 100 km, or 200 km; the Start Time might be current time rounded to a next minute boundary; the time interval might be restricted to say 30 seconds, 1 minute, 2 minutes or 5 minutes; the number of times might be 100 times some power of 2; only a rectangular array might be supported; the number of grid points might be restricted to a square with 1, 2×2, 3×3, 4×4 etc. grid points; and the minimum receive signal power parameters might just indicate a UE type, a UE category or one of just a few values of receiver and antenna gain or loss.

Based on the input parameters above, SCAI (e.g. from an external server) could be delivered to the requesting UE or requesting AMF or MME as a sequence of bit strings, where each bit string is for a separate time and includes one bit for each grid point in the grid point array with a one value indicating coverage and a zero value indicating no coverage to a UE for which the input parameters above are applicable. There could be a fixed order of grid point inclusion (e.g. West to East, then South to North starting at the reference grid point). This could lead to a combined bit string containing only SCAI Boolean indications without a need for delimiters, length indications, or parameter type indications.

In one example (referred to as "Example 1"), for a square area of 2000×2000 km containing 1600 grid points spaced 50 km apart and with a periodic time interval of 1 minute, the combined bit string size for 24 hours of data could have the following size:

$$SCAI \text{ Size} = (1600 \times 24 \times 60) \text{ bits}$$
$$= 2.3 \, M \text{ bits or } 288 \, K \text{ bytes}$$

This may be reasonable for an AMF or MME though, in some embodiments, not a UE. In another example, for just one grid point and a periodic time interval of 1 minute over 24 hours, the SCAI data size could decrease to 180 octets which may be small enough for one UE even using transport by SMS.

A second example of SCAI encoding involves using grid points with Boolean coverage availability and time duration indications. Based on input parameters, which can be the same as the input parameters for the first example of SCAI encoding described above, SCAI could be delivered as a sequence of time durations for each grid point, where each time duration includes a Boolean indication of coverage availability or unavailability. The output could look as follows for each grid point when there are N durations (Duration 1, Duration 2, Duration 3 etc. to Duration N):

Output=<N> <Binary 0 or 1> <Duration 1> <Binary 0 or 1> <Duration 2> <Binary 0 or 1> <Duration 3> . . . <Binary 0 or 1> <Duration N>

The initial value (<N>) above provides the number of durations and each duration (e.g. <Duration n>) might be encoded as a fixed length bit string (e.g. 8 bits). The above output for just one grid point could then be concatenated for all of the grid points according to some defined ordering of grid points to produce the complete SCAI as a combined bit string. For the Example 1 above, and assuming an average duration of 15 minutes and the use of 2 octets to encode the number of durations N, and the use of 1 octet to encode each of the Durations, the total SCAI size could be:

$$SCAI \text{ Size} = 1600 \times \left(16 + \left(24 \times 60/15\right) \times 9\right) \text{ bits}$$
$$= 1.41 \, M \text{ bits or } 176 \, K \text{ bytes}$$

For just one grid point in this example, the SCAI data size could decrease to 110 octets.

A third example of SCAI encoding involves using grid points or a trajectory with signal power and time duration indications. For grid points, the input parameters can be as described for the first example of SCAI encoding above. For a trajectory (where it is assumed that a time and duration of a UE at each location may be unknown), a UE might indicate the following input parameters to a source of SCAI (e.g. an external server):

List of supported PLMNs (if not already known or implied);

One or more satellite RATs (satellite availability is then based on radio cell availability for any of the RATs);

List of supported frequency bands (if not implied by the particular RATs);

Reference Location (e.g. latitude and longitude for the start of the trajectory);

Additional Locations for the trajectory (e.g. relative to the reference location or relative to a previous additional location);

Start Time and Total Duration;

Parameter(s) for minimum receive signal power as in the first example of SCAI encoding.

The above input parameters could be constrained to reduce complexity as in the first SCAI example above.

Based on the input requirements above, SCAI would be delivered (e.g. to a UE, AMF, or MME) as a sequence of time durations for each grid point or each location on the trajectory where each time duration includes numeric signal power (and quality) level(s) for the supported frequency bands.

For each grid point or each location, and with N durations, the SCAI output could look as follows:

Output=<N> <signal power/quality level(s)> <Duration 1> <signal power/quality level(s)> <Duration 2> . . . <signal power/quality level(s)> <Duration N>

This output could be encoded as a bit string and concatenated over all grid points or all locations based on a defined ordering of grid points or locations to produce the final SCAI.

For the grid point example in the second example of SCAI encoding and assuming signal power/quality level(s) can be encoded in 2 octets and the average duration is 10 minutes, the total SCAI size could be:

$$SCAI \text{ Size} = 1600 \times \left(16 + \left(24 \times 60/10\right) \times 24\right) \text{ bits}$$
$$= 5.56 \, M \text{ bits or } 694 \, K \text{ bits}$$

For just one grid point in this example, the SCAI data size would decrease to 434 octets. For a trajectory of length 2000 km containing locations at intervals of 50 km (thus containing 41 locations), the SCAI size could be 17.8 Kbytes.

A coverage map (or set of coverage maps) can be provided to a UE by a server via user plane or Short Message Service (SMS) or may be provided to a UE by an MME or AMF using NAS. Two alternative solutions can be used for this:

A first solution (referred to as "Solution A") is based on an HTTPS or SMS query from a UE to a server. The UE may include authorization data with the query that is meaningful to the server and is previously provided to the UE by the serving PLMM (also referred to as the Registered PLMN (RPLMN)).

A second solution (referred to as "Solution B") is based on a simple NAS request/response (e.g. as part of NAS Attach, Tracking Area Update (TAU) or Registration).

For example, a coverage map (or set of maps) can be provided to a UE 115 from a server via user plane (e.g., as discussed later in FIGS. 8A and 8B) based on an HTTPS query from the UE 115 to the server. This might be supported by a visiting PLMN (VPLMN), a home PLMN (HPLMN), or by a satellite operator. The UE 115 may also provide a temporary identifier (ID) to the server that is pre-configured in the server and that verifies permission for the UE 115 (e.g. a subscription) to receive the coverage data. The temporary ID may be assigned to the UE by the VPLMN or HPLMN after verification of a UE subscription or other permission to receive coverage data. The temporary ID may be, or look like, a large random number (e.g. 128 bits) to ensure security.

In another implementation, satellite coverage data, e.g. in the form of a coverage map and/or time sequence, can be provided to an AMF 112 and/or a gNB 106/202/307 (e.g. by an O&M server). The AMF 112 or gNB 106/202/307 may then filter, reformat or otherwise modify the satellite coverage data for easier and faster access (e.g. by a UE 115), which may reduce the overall satellite coverage data size (e.g. if the AMF 112 or gNB 106/202/307 removes data for certain locations and/or times in the satellite coverage data that are not needed by a UE 115). The AMF 112 or gNB 106/202/307 may then provide the filtered, reformatted or otherwise modified satellite coverage data to a UE 115—e.g. for just the current UE 115 location, for all locations nearby the UE 115, or for an entire serving PLMN coverage area (e.g. as described above). For example, an AMF 122 can provide satellite coverage data to a UE 115 using a Non Access Stratum (NAS) message (e.g. when the UE 115 performs a NAS Registration with the AMF 122). A gNB 106/202/307 may also broadcast satellite coverage data (e.g. in one or more SIB messages) in each satellite cell to all UEs 115 with access to the satellite cell. The broadcast satellite coverage data may be restricted to providing coverage information for just locations within the current coverage area of the satellite cell or could, in one extreme variant, provide satellite coverage data for just a single location comprising the current coverage area of the satellite cell or a central location for this coverage area. Coverage information provided using this extreme variant may be approximate since not all locations within the current coverage area of the satellite cell would necessarily receive identical satellite coverage at future times. However, a convention could be then used whereby coverage is indicated as being available at any future time for the entire current coverage area of the satellite cell if at least part of this area (e.g. a central location) receives satellite coverage at the future time. A UE 115 which makes use of satellite coverage data for this extreme variant can then be aware that coverage may not always be available at its current location at a future time even when that current location is within the location area for which satellite coverage is indicated as being available at the future time.

As described above, a UE 115 can be provided with satellite coverage data, which may comprise one or more coverage maps (e.g. each comprising a bit map) and/or time sequences indicating satellite coverage availability for one or more locations and/or for one or more times. For example, an AMF 122 could send satellite coverage data to a UE 115 (e.g. in the form of a bit map or time sequence) for just a current UE 115 location, which might be based on a current serving fixed cell for the UE 115 or a current TA in which the UE 115 is located (e.g. as indicated to the AMF 122 by a serving gNB 106/202/307 for the UE 115). Alternatively, the UE 115 might send a request (e.g. a NAS Request message) to a serving AMF 122 indicating one or more locations and a time period for which the UE 115 requests satellite coverage data. The AMF 122 can then send satellite coverage data to the UE 115 (e.g. in a NAS Response message) for the indicated locations and time period. For example, the AMF 122 may determine the satellite coverage data based on more complete and comprehensive satellite coverage data (e.g. for an entire PLMN coverage area) which the AMF 122 receives from an O&M server or from a gNB 106/202/307. A UE 115 may use the satellite coverage data, its current location, as well as a current time to determine when UE 115 will be in coverage and out of coverage of a satellite cell.

As discussed above, with limited satellite deployment (e.g., initially), there may be times at any given geographic location when no satellite coverage (e.g. no satellite cell) is available to a UE—which may be referred to as a "coverage gap" or "unavailability period". For some UEs (e.g., Cellular IOT (CIoT)), the UE may transition to a dormant state during a coverage gap, and may not attempt to find a cell or initiate a mobile originated (MO) service such as the origination of a voice call or a data session or the sending of data or a text message. The network may similarly not attempt to initiate any mobile terminated (MT) service towards the UE when the UE is within a coverage gap, such as not attempting to initiate a voice call or data session to the UE from an external entity and not attempting to send data or a text message from an external entity (e.g. external client 140) to the UE. For a non-IOT UE, the user of the UE may want to minimize out-of-coverage periods by looking for and using other available terrestrial network (TN) cells or NTN cells for other NTN RATs or other PLMNs. In this situation, transitioning to a completely dormant state might not be suitable. Moreover, if a UE is moving, a coverage gap at an old location may become irrelevant at a new location where satellites (or satellite cells) are once again available. For MT services and for a moving UE, the network may be able to reach the UE at a new location (where satellites are available), so again transitioning to a completely dormant state (with respect to the UE) on the network side may also be unsuitable.

In certain embodiments, an operation and maintenance (O&M) manager or server (e.g., belonging to a PLMN) may pre-configure and transfer to other entities (e.g. gNBs 106/202/307 and/or AMFs 122) satellite coverage data showing times of NTN coverage and lack of coverage (e.g., times of no NTN coverage) at different locations in a PLMN coverage area. The satellite coverage data may be as described for FIGS. 7A-7F.

In one embodiment, a gNB 106/202/307 that receives satellite coverage data from an O&M server or that calculates satellite coverage data from other data received from an O&M server (e.g. satellite orbital or ephemeris data and data on satellite cells) may broadcast satellite coverage data in each cell for locations in that cell as discussed for FIGS. 7A-7F. A UE 115 Access Stratum (AS) layer may then determine periods of satellite unavailability at the UE 115 location based on the broadcast satellite coverage data that is received. The AS layer may report a no cell available state to a NAS layer in the UE 115 during satellite unavailability (e.g., during a no coverage state). The NAS layer may then change a NAS state for the UE 115 to indicate wireless coverage is not available (e.g., may enter a NAS 5GMM-REGISTERED.NO-CELL-AVAILABLE state), which may also be supported for terrestrial wireless access when UE 115 loses wireless coverage. The AS layer may reduce or cease cell search (e.g., reduce a frequency of satellite cell searching or stop cell searching) during a no-coverage period/state. The AS layer can be optionally configured to search for an NTN or TN cell periodically before the next satellite cell available time to allow for possible UE 115 movement to a new location.

In some other embodiments, a UE 115 NAS layer may obtain and/or otherwise determine a time T1 when satellite coverage at the UE 115 location will cease (e.g., during a no coverage state) and a time T2 when satellite coverage will resume (e.g., during a coverage state). The period starting at time T1 (which may be referred to as a start time) and ending at time T2 (which may be referred to as an end time) may be referred to as a coverage gap or unavailability period, the duration of which could typically equal T2–T1. For example, the network (e.g. a serving AMF 122) may provide satellite coverage data to the UE 115 during a UE Registration and/or in other NAS responses if requested by the UE 115, and the UE 115 may then calculate T1 and T2. In another example, the network (e.g. a serving AMF 122) may determine and then provide the values of T1 and T2 to the UE 115 during UE 115 Registration and/or in other NAS responses. In a further example, a serving gNB 106/202/307 may broadcast satellite coverage data or the values of T1 and T2 in a SIB in a satellite cell. The satellite coverage data or the values of T1 and T2 that are broadcast may then be received by the UE 115 AS layer and provided by the UE 115 AS layer to the UE 115 NAS layer, e.g. when, or soon after, the satellite cell is acquired (e.g., during the coverage state). The UE 115 NAS layer can provide the values of T1 and T2 to applications and/or to a user of UE 115 to indicate a future loss and a later resumption of satellite coverage. At time T1 (e.g., at the expiration of a timer for T1 and at the onset of the no coverage state), the NAS layer may enter a no coverage state (e.g., a 5GMM-REGISTERED.NO-COVER-AGE state), may deactivate the AS Layer, and may start a timer that will expire at the time T2. At the time T2 (e.g. at the expiration of a timer for T2 which may occur at the resumption of a coverage state), the NAS layer may reactivate the AS layer. In some embodiments, a network side NAS layer (e.g. a NAS layer in a serving AMF 122) may also enter a no coverage state with respect to UE 115 at the time T1 and may inhibit mobile terminated (MT) activity for the UE 115 until the time T2. In other embodiments, and as described later here in association with FIG. 14, the UE may determine the times T1 and T2 from coverage data received earlier from the network or from an external server, and may then report the times T1, T2 and/or the duration T1-T2 to the network (e.g. to a serving AMF or MME for the UE) using a procedure that supports reporting of an unavailability period caused by loss of satellite coverage or caused by other events such as a UE reboot or software upgrade.

The different types of satellite coverage data and their usage described above in association with FIGS. 7A to 7F can enable a UE 115 to determine at what times (e.g. times T1 and T2) the UE 115 will and will not be in coverage of a satellite cell enabling access to a serving PLMN. However, the satellite coverage data may not indicate whether and at what times and locations the UE 115 may be in coverage of a satellite cell not supporting the serving PLMN but instead supporting a PLMN different to the serving PLMN (e.g. a home PLMN for the UE 115). Additionally, the satellite coverage data may not indicate whether and at what locations (and possibly at what times) the UE 115 may be in coverage of a TN cell for the serving PLMN (or another PLMN such as a home PLMN for the UE 115), e.g. a TN cell that supports 5G NR access to a terrestrial gNB or a TN cell that supports LTE access to a terrestrial ng-eNB or terrestrial gNB. Therefore, when a UE 115 determines that satellite coverage is not available for a serving PLMN (e.g. when UE 115 enters a no coverage state for a serving PLMN), the UE 115 may not know whether to continue searching for a satellite cell for another PLMN (e.g. a home PLMN) and/or whether to search for a TN cell. Such lack of knowledge by UE 115 may lead to unnecessary power expenditure if UE 115 continues searching for a satellite cell for another PLMN and/or for a TN cell and finds none. Such lack of knowledge by UE 115 may also lead to an unnecessary lack of PLMN access by UE 115 if UE 115 instead enters a dormant state during a no coverage state for the serving PLMN, in which UE 115 deactivates all satellite and TN cell searching, and if a satellite cell for another PLMN or a TN cell is, or later becomes, available to UE 115 during the no coverage state.

For a UE 115 that is only subscribed or configured to access, or only capable of accessing, satellite cells for the serving PLMN (e.g. where the serving PLMN is a home PLMN for UE 115 and UE 115 does not support TN access), this may not be a problem, and the UE 115 can then go into a totally dormant state during a period of no satellite coverage for the serving PLMN. However, for a UE 115 that supports roaming to other PLMNs with satellite access and/or supports TN access, it may be advantageous if the UE 115 can know whether satellite access for other PLMNs and/or terrestrial wireless access is available when in a no-coverage state for the serving PLMN.

Extensions of the techniques described above for providing satellite coverage data to a UE 115 can be used to provide the UE 115 with this extra information on satellite coverage availability for other PLMNs and TN coverage availability. In one such extension, extra coverage data (e.g. a coverage map, bit map, or time sequence as described for FIGS. 7A-7F) may be provided to UE 115 by the serving PLMN (e.g. by an AMF 112, MME or gNB 106/202/307) or by another entity (e.g. a server accessed by UE 115 via the Internet such as a server supported by a home PLMN, an SVO or by a vendor or OEM for the UE 115) for one or more other PLMNs and in the same or a similar way as satellite coverage data is provided for the serving PLMN. The extra coverage data may be supported as described for FIGS. 7A-7F, but, instead of indicating satellite availability and unavailability for different locations and/or different times for the serving PLMN, the extra coverage data may instead indicate satellite availability and unavailability for different locations and/or different times for one or more other PLMNs. In another extension, extra coverage data may be provided for terrestrial wireless access and may indicate TN cell availability and TN cell unavailability for different locations and/or different times for the serving PLMN and/or for one or more other PLMNs. Since terrestrial cells do not typically move (though may sometimes be switched on and off), a coverage map for TN cells may comprise a string of bits or an array of bits where each bit in the string of bits or array of bits corresponds to a particular location in an array of locations (e.g. a rectangular grid point array of locations) and indicates whether TN cells are or are not available at that location and at any time and not just one particular time. Similar to a coverage map for satellite access, such a coverage map for TN cells may also be compressed when nearby locations tend to have the same coverage or non-coverage attribute and thus the same bit value.

In one extension for providing extra coverage data for terrestrial access, binary values (e.g. 1 or 0) may be provided in a coverage map for each location to indicate coverage (e.g. binary "1") versus no coverage (e.g. binary "0"). In another type of extension for providing extra coverage data for terrestrial access, ternary or quaternary values may be provided in a coverage map instead of binary values. For example, with ternary values, a value "0" may indicate TN coverage is not available, a value "1" may indicate TN coverage is available and a value "2" may indicate TN coverage may be available but is not guaranteed. The third value "2" may be useful to indicate a location where TN coverage can sometimes be available (e.g. depending on the exact location of a UE 115) but not always, which may be used at a location where TN coverage by a serving PLMN can be blocked by buildings, natural obstacles (e.g. hills, trees) but is normally available if a UE 115 has a line of sight to a terrestrial base station or access point. With quaternary values, the values "0", "1", and "2" may have the meaning just described and a fourth value "3" may be included to indicate a location where TN coverage can sometimes be available as for the value "2" but with a lower (or higher) probability than the value "2".

In another type of extension, extra coverage data may be provided as a single coverage map that combines coverage indications for the serving PLMN and for other PLMNs and/or combines coverage indications for both satellite access and terrestrial access. The single coverage map may provide a string or array of binary, ternary, quaternary (or additional valued) parameters, where each parameter in the string or array indicates whether there is or is not satellite and/or TN cell coverage for the serving PLMN and possibly additional PLMNs at a particular location and/or particular time. For example, in a simplest example, a string or array of binary values may be provided using a bit map as described for FIGS. 7A-7F. A bit that is set to a "0" may then indicate that no coverage is available either from a satellite cell or TN cell for a particular location and time, whereas a bit set to a "1" may indicate that coverage is available for that time and location from at least one of a satellite cell or TN cell. In another example using quaternary values, a quaternary value provided for a particular location and time may indicate no satellite and no TN coverage for a "0" value, satellite but no TN coverage for a "1" value, TN but not satellite coverage for a "2" value and both satellite and TN coverage for a "3' value. A string or array of quaternary values can also be encoded as a bit string or array by using 2 bits to encode each quaternary value. Such a bit string or array may then also be compressed when values for nearby locations and/or times tend to be the same.

The extensions described above for providing extra (satellite and/or terrestrial) coverage data to a UE 115 for TN cells and/or other PLMNs can allow a UE 115 to modify support of coverage gaps and satellite coverage such that a UE 115 can access a satellite cell for another PLMN or a TN cell during a (satellite) coverage gap for the serving PLMN and without expending power searching for other satellite cells or TNs cells when none are available.

In another implementation, the satellite coverage data may be provided to the UE 115 from a server. For example, the coverage information may be treated as a network resource and accessed by the UE 115 using an address, such as a URI, for the server, which is obtained by the UE 115 from a network entity (e.g. an AMF 122, MME or gNB 106/202/307). The UE 115 may then access the server based on the address to obtain the coverage information. The UE 115, for example, may send an HTTP or HTTPS (or other data) request to the server identified by the address. The request sent to the server by the UE 115 may indicate one or more input parameters (e.g. as described above for the three SCAI examples) that may be used to identify the requested information. For example, the UE 115 may indicate a location of the requested coverage information or an area of the requested coverage information, such as a radius of a circle centered on the location or the length and width of a rectangle associated with the location. The UE 115 may indicate the relevant time, such as a start time and a stop time, for the requested coverage information. The UE 115 may indicate relevant RAT(s) and/or PLMN(s) for the requested coverage information. The UE 115 may indicate supported methods or encodings for receiving coverage information from the server. The server may recognize the address association with coverage data and return the requested coverage information to the UE 115.

The server may belong to the serving PLMN or to a Home PLMN (HPLMN) (e.g. when a UE is roaming) or to a separate third party, such as a space vehicle operator (SVO). The benefit of using an SVO server to provide coverage data rather than a PLMN server may be that (a) the coverage map data need not be transferred to a PLMN (or multiple PLMNs), and (b) the SVO server will directly receive each request and accordingly can charge for the data more reliably. For example, if one SVO supports 100 PLMNs, then instead of transferring some or all of its coverage map data to each one of these 100 separate PLMNs, the SVO may assign URI IDs to each PLMN and maintain a single server to provide coverage data on behalf of all 100 PLMNs. Accordingly, there may be up to a 100 times reduction in overall implementation cost for one server for the SVO versus 100 separate servers for each of the 100 PLMNs.

The address (e.g., URI) for the server may be provided to the UE 115 by a network entity, e.g., in the HPLMN or VPLMN. The address may have limited usage, for example, the address may be used only once by the UE to request coverage data, or may be used multiple times within a limited time period, and/or may be used for a maximum number of requests, or may be used indefinitely. The address may be provided to a UE 115 by the network entity using NAS (e.g. via Registration Request and Accept messages), where the UE 115 may indicate one or more of the input parameters in the NAS request that may be used to identify the requested SCAI as discussed above in order to allow the network entity to select a server and address that can support these input parameters. The address may alternatively be provided to the UE 115 using an RRC unicast request/response or in a SIB (e.g. which may be ciphered to allow charging for the configuration data), or the address may be provided via pre-configuration on the universal subscriber identity module (USIM) of a UE 115 by the HPLMN operator.

It may be desirable to transfer the coverage information in a secure manner that may protect UE privacy and may permit charging for the coverage data. The coverage information may be transferred in a secure manner because a network entity in the serving or home PLMN provides the address and HTTPS may be used by the UE 115 to request and obtain the coverage data. In order to charge for coverage data, the address, e.g., URI, may need to identify the UE 115, but it may be undesirable to provide the real UE identity (e.g. Subscription Permanent Identifier (SUPI) to the server for possible privacy reasons. To enable this, a temporary identifier may be assigned to the UE 115. For example, the address (e.g., the URI) may be assigned to one UE or a group of UEs with a random component in the least significant part (e.g. 128 or 256 random bits). In a variant, the random component may not be part of the address but may be provided as a separate input parameter. The address (or random component) may be pre-configured in both the server and network entity that provides the address (e.g. AMF or gNB) The server may record usage of the address or the random component (e.g. on receiving a request for coverage data from the UE, the server records the address). The network entity that provides the address also records the identity(ies) of UE(s) to which the address (or random component) is provided. Records may be evaluated offline, e.g., by a network entity, the server, or a third-party charging entity to determine address (or random component) provision to UEs and usage by UEs. The random component may be used as the temporary identifier for the UE.

To avoid the need to pre-configure millions of addresses or random components at a server and network entity, the server and network entity may agree on a simple set of identifiers (e.g. a sequence of regularly spaced numbers such as (in decimal) 1,000,000,000, 1,000,001,000, 1,000,002, 000, 1,000,003,000, 1,000,004,000, 1,000,005,000, etc.) and may use ciphering to generate and verify the temporary identifier. The network entity, for example, may select a so far unused identifier from the set of identifiers for the UE (e.g. 1,000,004,000 in the above example) and may cipher the identifier using a secret cipher key to produce the random component, which is then sent by the UE to the server. The server deciphers the random component using the same cipher key to obtain the original identifier (e.g. 1,000,004, 000 in this example), which may then be verified as legitimate if the identifier belongs to the set of identifiers. For example, an unauthorized UE that attempted to request SCAI from the server by providing a random component that was not obtained legitimately and that was deciphered by the server to yield a value that did not belong to the set of identifiers (e.g. a value of 1,000,003,107 in the previous example) could be recognized by the server as not being authorized to receive SCAI. The server and network entity may record assignment and usage of identifiers for charging purposes. The use of a ciphered temporary identifier for the UE may enable security, privacy, and an ability to charge for access to the coverage data. An attacker could not guess a valid random component with any likelihood of success, for example, when the number of bits is around 128 or more. If a UE loses or a user discloses the address and temporary identifier, other parties may benefit, but this is no different to a user giving away any other item of value and need not affect charging.

Security of the server address (e.g., a URI) may be enabled by a very large number of possible random components. With random components containing 128 bits, that number may be around $10^{38}$. Assuming 1 trillion ($10^{12}$) of these are reserved for coverage data provision, the probability of an attacker correctly guessing one of these reserved components (and thereby enabling free access to coverage data) would be 1 in $10^{26}$, which is a very low probability. The use of ciphering to determine the random components avoids having to assign and store the random components individually by some other process (e.g. using a random number generator). Instead, IDs selected from a pre-configured sequence of integers (e.g. all integers between 1 and 1 trillion or all integers between 1 and 1 trillion each multiplied by 1 trillion) are ciphered, as needed, using a secret key to generate the random components. Should the key become discovered in some way, the operator can change it. If the coverage data itself is not considered sensitive (e.g. the coverage data would not include user or UE information), there may be no significant loss other than the operator losing a small amount of revenue before changing the key.

Data, such as the coverage data illustrated in coverage maps illustrated in FIGS. 7A-7F may be obtained by the UE 115 using a query to a server. The procedure for the UE 115 to obtain the data may have two parts. First, the UE 115 obtains authorization data. Then the UE 115 sends a request (e.g., via HTTPS or SMS) to the server that includes the authorization data. The authorization data can be part of an address (URI) or can be a separate input parameter (e.g. in the body of an SMS message). If charging will not be used (e.g. coverage data is available to all UEs without charge), then the first part of the procedure could be omitted and the UE might construct a standard address (URI) associated with either the serving PLMN (e.g., the VPLMN or HPLMN).

Figures 8A, 8B, 8C:
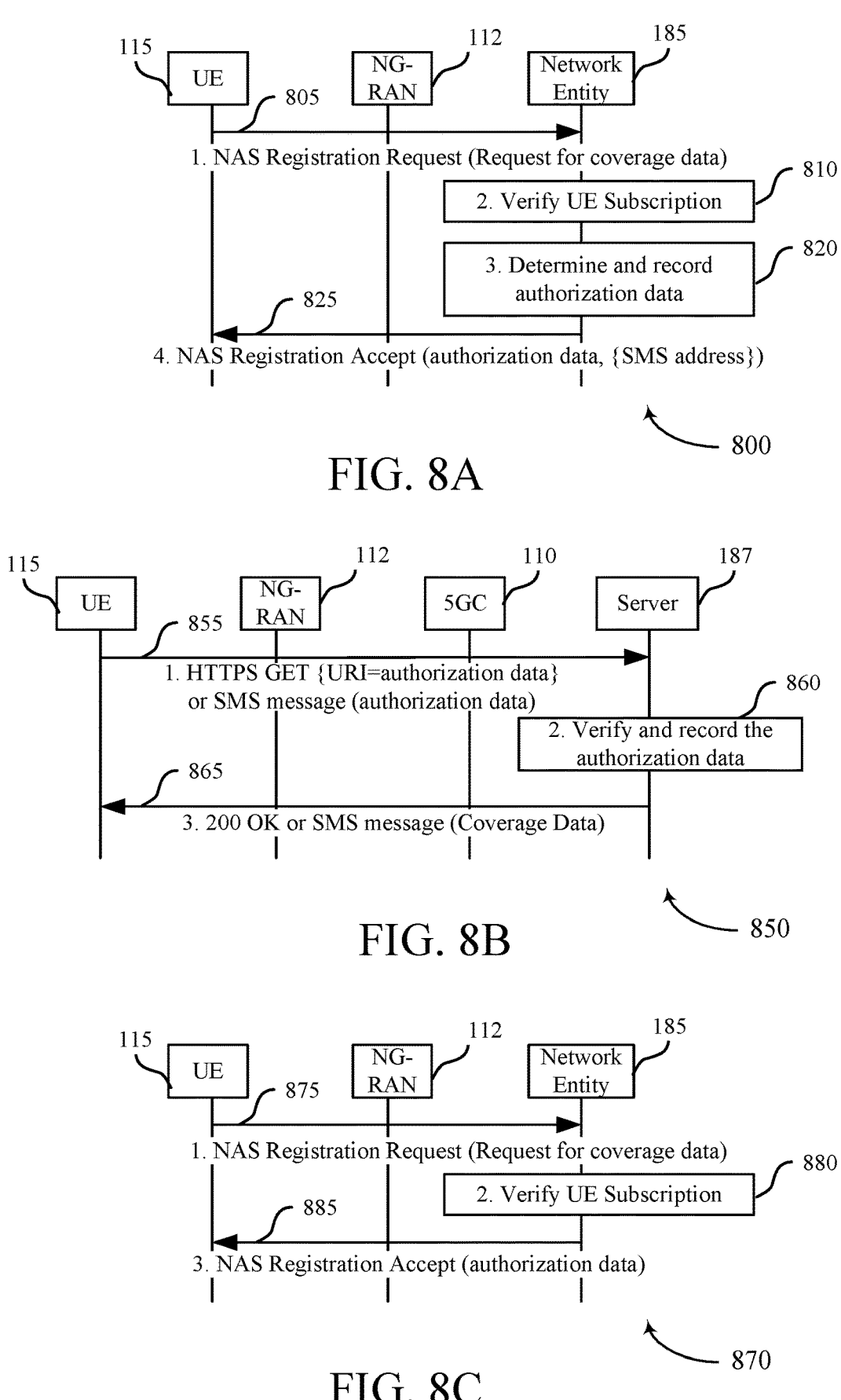
FIGS. 8A-8C illustrate examples of processes that support the transfer of coverage data from a server to a UE based on an obtained address of the server, in accordance with aspects of the present disclosure.

FIGS. 8A and 8B together illustrate a procedure for a UE 115 to obtain coverage data from a server 187 based on authorization data obtained by the UE 115, in accordance with aspects of the present disclosure, with the first part illustrated by procedure 800 in FIG. 8A and the second part illustrated by procedure 850 in FIG. 8B. This corresponds to Solution A described earlier here. FIG. 8A shows the first procedure 800 for a 5G System (5GS). A procedure for EPS can be analogous using a NAS Attach or NAS Tracking Area Update (TAU) instead of a NAS Registration. The procedure illustrated in FIG. 8A is based on NAS but could use some other protocol layer instead, such as RRC. Aspects of procedure 800 may be implemented by or implemented at communication systems 100, 200, 300, 400, 500, 600, and/or 700. Aspects of procedure 800 may be implemented by or implemented at UE 115 and network entity 185, which may be examples of the corresponding devices described herein. For example, network entity 185 may include one or more entities within the core network, such as an AMF 122, LMF 124, SMF 134 or an MME, or may be a base station such as gNB 106/202/307, which may be separate from an SV 102/202/302 or as described above may be included as part of an SV 202. Operations within the procedures in FIGS. 8A-8C are shown as numerals and referred to herein as stages (which may or may not be separately labeled in the figures). This convention is also used in other figures described hereafter.

The coverage data transferred from the server 187 to the UE 115 may be coverage data that enables the UE 115 to determine whether access to the serving PLMN can be possible at one or more locations of the UE, at one or more future times, using one more radio access technologies (RATs), or for some combination of these. For example, the serving PLMN may have discontinuous satellite coverage, and the coverage data may include coverage data for one or more satellite RAT. The coverage data may additionally or alternatively apply to TN RATs. In some implementations, the coverage data transferred from the server 187 to the UE 115 may be data other than coverage data. The coverage data may be as described previously, e.g. for FIGS. 7A-7F and for the first, second and third SCAI examples.

Procedure 800 shown in FIG. 8A, may start with the UE 115 in satellite coverage for a serving PLMN. For example, UE 115 may be located inside the coverage area of at least one satellite cell supported by the SV 102/202/302, as described previously. Note that references to a serving PLMN herein may correspond in some cases to a private wireless network (not a public wireless network) and/or to a network that provides Internet access and/or other satellite services. Moreover, the UE may transmit signals to receive signals from and/or otherwise access the serving PLMN via a communication satellite (e.g., the SV 102/202/302 and an NTN Gateway 104). Accordingly, UE 115 may establish a connection, or may already have a connection, with the serving PLMN (e.g. with network entity 185) for performing wireless communications via the SV 102/202/302. For example, UE 115 may perform an initial Registration procedure with the serving PLMN (e.g., with network entity 185) via the SV 102/202/302, an NTN Gateway 104, and the gNB 106/202/307.

At 805, the UE 115 may send a request for coverage data to the network entity 185. In one implementation, the UE 115 sends a Registration Request to the network entity 185 (e.g., the serving AMF 122) (e.g. for an initial registration, periodic registration, or registration update) and includes a request for the provision of coverage data from the server 187 (shown in FIG. 8B) and whether HTTPS or SMS is preferred. In some implementations, the UE 115 may send the request using a RRC unicast request. The request may indicate, for example, one or more input parameters (e.g. as described for the first, second and third SCAI examples above) that may assist the network entity 185 in selecting the address of the server 187 to provide the coverage data. Input parameters might be included to indicate the type(s) of coverage data needed (e.g. a RAT or RATs) and applicable location(s), times, and satellite RATs. For example, the request may indicate one or more coverage parameters, such as a location for the requested coverage information, an area of the requested coverage information, such as a radius of a circle centered on the location, or the length and width of a rectangle associated with the location, the relevant time, such as a start time and a stop time, for the requested coverage information, relevant RAT(s) and/or PLMN(s) for the requested coverage information, supported methods or encodings for receiving coverage information from the server.

At 810, the network entity 185 (e.g., serving AMF 122) may authenticate the UE 115 and may verify the UE subscription to receive coverage data (of the requested type(s) and/or for the requested location(s)) and whether the requested location(s) can be supported (e.g. are in a country supported by the AMF 122).

At 820, the network entity 185 (e.g., serving AMF 122) determines (i) a server applicable to the type(s) of coverage data and location(s), and (ii) authorization data. The authorization data can be a text string address (URI) for the server or the content of an SMS message to be sent to the server. The authorization data can include a temporary identifier (ID) for the UE 115 and optionally details of the request received at step 1 (e.g. may indicate the applicable location(s), times, and satellite RATs). In instances in which the authorization data includes a temporary ID, the temporary ID may be assumed to be already pre-configured in the server 187 and to have been agreed in advance between the serving PLMN (e.g., the network entity 185) and server 187 when the server 187 is managed by another party (e.g. am SVO). Thus, the temporary ID, for example, may be a reserved value defined in advance in the network entity 185 and the server 187. The temporary ID could be a large random or pseudo-random number (e.g. 128 bits) with a set of (pseudo-)random numbers pre-configured in the server 187 and in the serving PLMN (e.g., the network entity 185). Such randomization could make guessing a valid temporary ID almost impossible for an unsubscribed UE. In some implementations, the temporary ID may be ciphered (e.g. as described previously). Pseudo-random temporary IDs could be generated by ciphering a regular series of IDs (e.g. the integers 1, 2, 3, 4, 5, etc.) using a secret ciphering key known only to the serving PLMN and server. For example, the network entity 185 and the server 187 may be preconfigured with a common set of identifiers and a cipher key. The network entity 185 may select one of the identifiers (e.g., a previously unused identifier) from the set of identifiers for the UE 115 and may cipher the identifier using the cipher key to generate the temporary identifier for the UE 115. The server 187 may later decipher the temporary identifier for the UE 115 using the cipher key to obtain the identifier selected by the network entity 185 (in process 850). The temporary identifier may be part of the address of the server 187. For example, the temporary ID may be appended to the address (URI) as an extension of the URI.

At 825, the network entity 185 (e.g., serving AMF 122) may return the authorization data in the Registration Accept and, in the case of SMS, an SMS address for the server. In some implementations, the network entity 185 may provide the authorization data to the UE 115 using an RRC unicast response or in a SIB (e.g., which may be ciphered). The network entity 185 (e.g., serving AMF 122) may also indicate a limitation on usage of the authorization data—e.g. a maximum number of requests to the server or a maximum time duration of usage.

In some implementations, instead of receiving the authorization data from the network entity 185, the UE 115 may obtain the authorization data without assistance from the network entity 185, thereby obviating the need for stages 805, 810, 820, and 825, which may be used if a standard URI is used and charging is not applicable. For example, the UE 115 may obtain the authorization data from a USIM on the UE 115 that may be configured by the home PLMN for the UE 115 or by assembling a standardized address or standardized temporary identifier. For example, the UE 115 may assemble a standardized address as "nameofdata.mnc<MNC>.mcc<MCC>0.3gppnetwork.org" where <MNC> and <MCC> are replaced by a mobile country code (MCC) and a mobile network code (MNC) numbers for the serving PLMN and "nameofdata" denotes some fixed alphanumeric name standardized for the type of coverage data such as "satellitecoveragedata". The standardized temporary identifier may be assembled in a similar manner.

FIG. 8B shows the second procedure 850, which can be the same for both 5GS and EPS. The procedure 850 shown in FIG. 8B, may start after the UE 115 has obtained the address of the server and temporary identifier is discussed in FIG. 8A. Aspects of procedure 850 may be implemented by or implemented at communication systems 100, 200, 300, 400, 500, 600, and/or 700. Aspects of procedure 850 may be implemented by or implemented at UE 115 and/or server 187, which may be examples of the corresponding devices described herein. For example, the server 187, for example, may belong to the serving PLMN, e.g., VPLMN or HPLMN, for the UE 115, to an operator of satellites (e.g. SVO) providing access to the serving PLMN, or to a separate third party.

At 855, the UE 115 accesses the server 187 using the authorization data received in the first procedure 800. For example, as illustrated at 855, the UE 115 sends an HTTP or HTTPS Request (e.g. an HTTPS GET) to the server 187 with a URI equal to the authorization data obtained in the first procedure 800 or sends an SMS message with the authorization data in the SMS message body using an SMS destination address that was received in the first procedure. The request (HTTPS Request) or SMS message may not need to include any additional data because the authorization data can already include all data (e.g. all input parameters) needed by the server 187. This may avoid the UE 115 having to support proprietary server protocols related to the request or any need to standardize such protocols. However, in another embodiment, the UE 115 may include input parameters in the HTTP or HTTPS Request or in the SMS message sent at 855, such as those described for the first, second and third SCAI examples above, and that define the type of coverage data requested (e.g. such as applicable satellite RATs, locations and times). In this embodiment, the authorization data provided by the network entity 185 in procedure 800 may not need to include any input parameters.

At 860, the server 187 verifies that the authorization data is valid (e.g. contains a valid temporary ID and satisfies any limitations on a number of requests or a time period for requests) and records the details of the request. For example, as discussed in 820 of procedure 800 shown in FIG. 8A, the authorization data may include a temporary ID for UE 115 that is known to both the network entity 185 and the server 187. The temporary ID, for example, may be a reserved value defined in advance in the network entity 185 and the server 187. In some implementations, the temporary ID may be ciphered. For example, the network entity 185 and the server 187 may be preconfigured with common temporary IDs and a cipher key. The server 187 may decipher the temporary ID received from the UE 115 using the cipher key to obtain the original temporary ID selected by the network entity 185 and may verify that the original temporary ID belongs to the preconfigured common temporary IDs. The temporary ID for the UE 115 may permit the UE 115 to access and obtain coverage data from the server 187 with limitations. For example, the UE 115 may access the server 187 and obtain coverage data a limited number of times, or over a limited amount of time, or both. The server 187 may verify that the temporary ID has not exceeded any such limitations.

At 865, the server 187 returns the requested coverage data to the UE 115 according to the request at 855. The returned coverage data may use an encoding known to both the UE and server. The coverage data, for example, may be provided in an HTTP or HTTPS 200 OK message or SMS message from the server 187. The coverage data may enable the UE 115 to determine whether access to the serving PLMN can be possible at one or more locations of the UE, at one or more future times, using one more radio access technologies (RATs), or for some combination of these, as described previously. For example, the serving PLMN may have discontinuous satellite coverage, and the coverage data may include coverage data for one or more satellite RATs and may optionally apply to TN RATs. In some implementations, the coverage data transferred from the server 187 to the UE 115 at 865 may be or may include data other than coverage data.

To support charging and billing of UEs, a billing center can collect records of authorization data (e.g., assigned temporary IDs and corresponding UE identities from the network entity 185 (e.g. an AMF 122) and temporary IDs used to request coverage data from the server 187). This may allow the exact coverage data provided to each UE to be determined and billed.

FIG. 8C shows a NAS procedure for obtaining coverage data for 5GS. A procedure for EPS can be analogous using an Attach or TAU. This procedure corresponds to Solution B described previously.

At 875, the UE 115 may send a NAS Registration Request to the network entity 185 such as a serving AMF 122 (e.g. for an initial registration, periodic registration or registration update) and may include a request for provision of coverage data. Additional input parameters can be included to indicate applicable location(s), times, and satellite RATs, such as those described previously for the first, second and third SCAI examples.

At 880 network entity 185 may verify the UE subscription to receive coverage data and whether the requested input parameters (e.g. location(s) and time(s)) can be supported (e.g. are in a country supported by the network entity 185).

At 885, the network entity 185 returns the requested coverage data in a NAS Registration Accept. The network entity 185 may obtain the coverage data from pre-configured data in the network entity 185, which may not need any interpretation or significant processing by the network entity 185 if coverage data is configured in the network entity 185 for just a limited set of locations and a small set of alternative durations. Alternatively, the network entity 185 could send the request from the UE 115 to a server (e.g. using the procedure 850 in FIG. 8B with the network entity 185 acting as the UE 115 in procedure 850) and include returned coverage data at 885.

The procedure shown in FIG. 8C may be similar to the procedure shown in FIG. 8A except for returning coverage data instead of authorization data. This may allow a serving PLMN to support either procedure or both procedures based on a common request/response from/to the UE 115. For example, a UE 115 may indicate in a NAS Registration Request which procedure(s) the UE 115 supports and then the network entity 185 can attempt to match the UE support. Conflict may arise only if the UE 115 and network entity 185 each support only one procedure that is different from the other. That may be avoided if one of the procedures is defined as a common mandatory default.

A coverage map as defined herein may have several advantages compared to the provision of satellite orbital data using a SIB (e.g. as in SIB32 in 3GPP TS 36.331). For example, with a coverage map, a UE may not be required to perform any complex calculation to determine expected coverage and can just look up its current location and time in a coverage data map to see whether there is coverage. Coverage data can also be prepared in advance (e.g. by a satellite operator or server) with complete and accurate knowledge of satellite orbital data and radio cell planning and can thus be more reliable than coverage data extrapolated by a UE from orbital data parameters. The coverage data can also be provided for an arbitrary period—e.g. for 24 hours or 1 week or more. In addition, coverage data can be more complete. For example, a SIB32 as defined in 3GPP TS 36.331 may only include ephemeris data for 4 satellites. It is then possible that a UE near a boundary of a radio cell might receive coverage from satellites not included in the SIB32 or that a satellite included in the SIB32 that should be visible to a UE does not provide coverage to the UE due to restrictions on PLMN or country support or because radio cells are not configured for the entire area of visibility of the satellite.

Further, the procedures 800 and 850 of FIGS. 8A and 8B for obtaining coverage data using an HTTPS or SMS Query to a server may have a number benefits. For example, these procedures allow use of a server from a satellite operator which can avoid impacts to PLMNs for determining and providing coverage data to UEs. The procedures can also support charging and billing for coverage data and secure transfer of coverage data. The procedures can also support UEs with and without an IP protocol stack—e.g. by using SMS in the procedure 850 when a UE does not support HTTP and IP.

The procedure 870 of FIG. 8C for obtaining coverage data using NAS may have a number of benefits. For example, this may reduce signaling impact to a UE due to being an extension of existing NAS Registration procedures for 5GS access and existing NAS Attach and TAU procedures for EPS access. The procedure 870 can also support charging for coverage data and secure transfer of coverage data.

Figure 9:
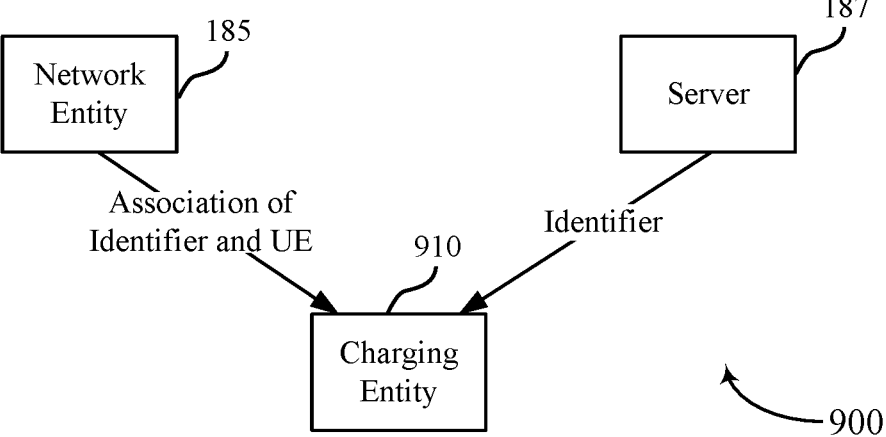
FIG. 9 illustrates an example of a process for billing/charging for UE access to coverage data in accordance with aspects of the present disclosure.

FIG. 9 illustrates a procedure 900 for charging a UE 115 for accessing and obtaining coverage data. As illustrated, after the server 187 receives a request from the UE 115 for coverage data that includes an identifier for the UE (e.g. as at 855 in FIG. 8B), e.g., a temporary identifier, the server 187 records the identifier and provides the identifier to a charging entity 910 and possibly details of the coverage data provided to the UE 115 (e.g. at 865 in FIG. 8B). The charging entity 910 may belong to the serving PLMN or may belong to a third party. The network entity 185 that determined and provided the identifier to the UE 115 (e.g. as at 820 and 825 in FIG. 8A) provides (e.g. an association of) the same identifier and a permanent identifier of the UE 115 (e.g. a SUPI) to the charging entity 910. The charging entity 910 may then identify the UE 115 that accessed and obtained coverage data from the server 187 (using the association of the identifier and permanent identifier) and charge the UE 115 accordingly.

Figure 10:
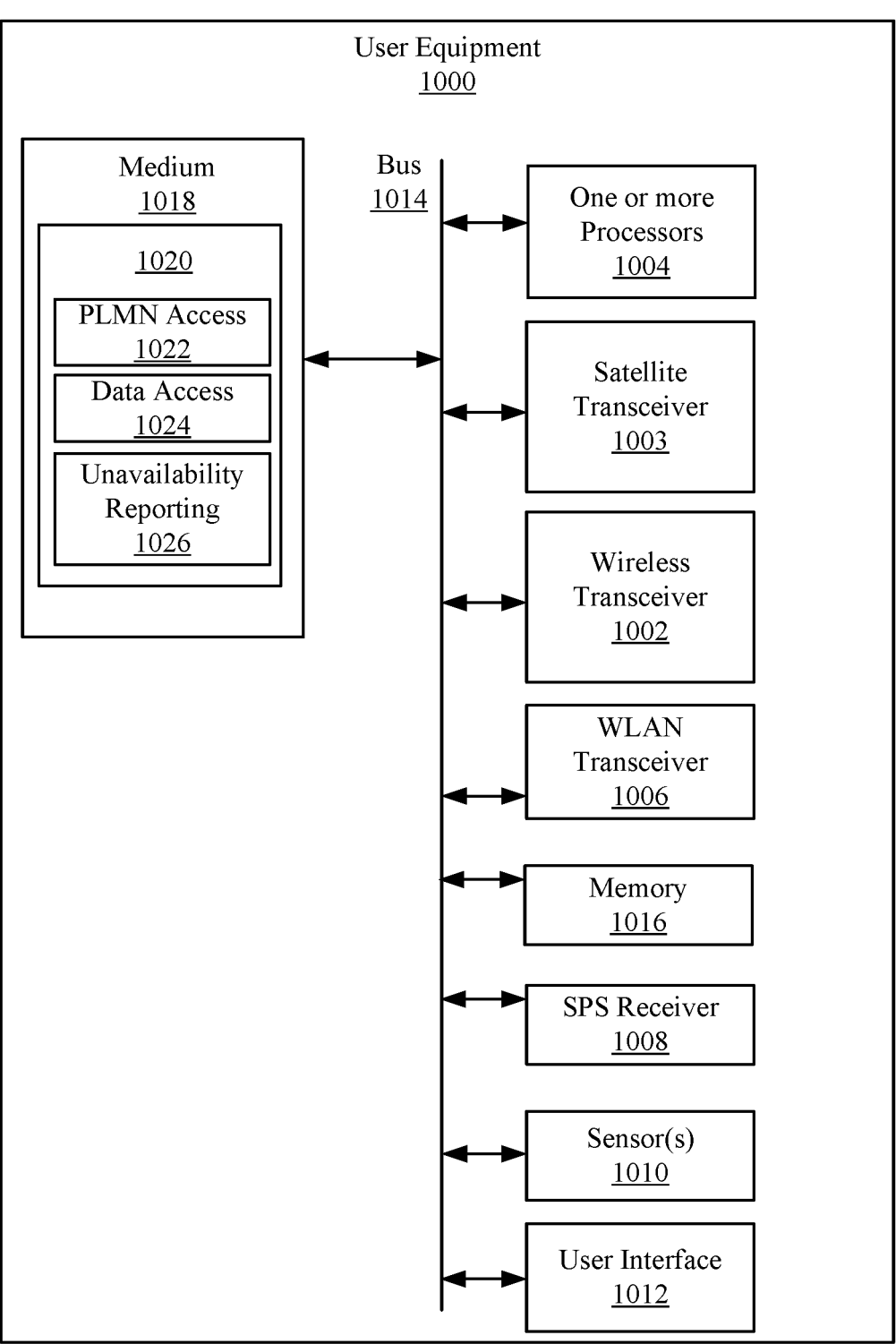
FIG. 10 illustrates a block diagram of a UE that supports obtaining coverage data to assist access by the UE to a serving public land mobile network (PLMN) in accordance with aspects of the present disclosure.

FIG. 10 is a diagram illustrating an example of a hardware implementation of UE 1000, such as UE 115 shown in FIGS. 1, 2, and 3, 7A, 8A, 8B, 8C and 16. The UE 1000 may be configured to perform any of the signal flows shown in FIGS. 8A, 8B and 8C and the method 1500 of FIG. 15 and techniques disclosed herein. The UE 1000 may include, e.g., hardware components such as a satellite transceiver 1003 to wirelessly communicate with an SV 102/202/302 via a wireless antenna (not shown in FIG. 10), e.g., as shown in FIGS. 1, 2, and 3. The UE 1000 may further include wireless transceiver 1002 to wirelessly communicate with terrestrial base stations in an NG-RAN 112 via a wireless antenna (not shown in FIG. 10), e.g., base stations such as a gNB or an ng-eNB. The UE 1000 may also include additional transceivers, such a wireless local area network (WLAN) transceiver 1006, as well as an SPS receiver 1008 for receiving and measuring signals from SPS SVs 190 (shown in FIGS. 1, 2, and 3) via a wireless antenna (not shown in FIG. 10). In some implementations, the UE 1000 may receive data from a satellite, e.g., via satellite transceiver 1003, and may respond to a terrestrial base station, e.g., via wireless transceiver 1002, or via WLAN transceiver 1006. Thus, UE 1000 may include one or more transmitters, one or more receivers or both, and these may be integrated, discrete, or a combination of both. The UE 1000 may further include one or more sensors 1010, such as cameras, accelerometers, gyroscopes, electronic compass, magnetometer, barometer, etc. The UE 1000 may further include a user interface 1012 that may include e.g., a display, a keypad or other input device, such as virtual keypad on the display, through which a user may interface with the UE 1000. The UE 1000 further includes one or more processors 1004, memory 1016, and non-transitory computer readable medium 1018, which may be coupled together with bus 1014. The one or more processors 1004 and other components of the UE 1000 may similarly be coupled together with bus 1014, a separate bus, or may be directly connected together or coupled using a combination of the foregoing.

The one or more processors 1004 may be implemented using a combination of hardware, firmware, and software. For example, the one or more processors 1004 may be configured to perform the functions discussed herein by implementing one or more instructions or program code 1020 on a non-transitory computer readable medium, such as medium 1018 and/or memory 1016. In some embodiments, the one or more processors 1004 may represent one or more circuits configurable to perform at least a portion of a data signal computing procedure or process related to the operation of UE 1000.

The medium 1018 and/or memory 1016 may store instructions or program code 1020 that contain executable code or software instructions that when executed by the one or more processors 1004 cause the one or more processors 1004 to operate as a special purpose computer programmed to perform the techniques disclosed herein (e.g. such as the signal flows shown in FIGS. 8A, 8B and 8C and the method 1500 of FIG. 15 and algorithms disclosed herein). As illustrated in UE 1000, the medium 1018 and/or memory 1016 may include one or more components or modules that may be implemented by the one or more processors 1004 to perform the methodologies described herein. While the components or modules are illustrated as software in medium 1018 that is executable by the one or more processors 1004, it should be understood that the components or modules may be stored in memory 1016 or may be dedicated hardware either in the one or more processors 1004 or off the processors.

A number of software modules and data tables may reside in the medium 1018 and/or memory 1016 and be utilized by the one or more processors 1004 in order to manage both communications and the functionality described herein. It should be appreciated that the organization of the contents of the medium 1018 and/or memory 1016 as shown in UE 1000 is merely exemplary, and as such the functionality of the modules and/or data structures may be combined, separated, and/or be structured in different ways depending upon the implementation of the UE 1000. While the components or modules are illustrated as software in medium 1018 and/or memory 1016 that is executable by the one or more processors 1004, it should be understood that the components or modules may be firmware or dedicated hardware either in the one or more processors 1004 or off the processors.

As illustrated, the program code 1020 stored on medium 1018 and/or memory 1016 may include a PLMN access module 1022 that when implemented by the one or more processors 1004 configures the one or more processors 1004 to receive and transmit, via wireless transceiver 1002 or satellite transceiver 1003, wireless signals to access a PLMN, such as 5GCN 110 shown in FIGS. 1-3. The one or more processors 1004, for example, may be configured to access the PLMN and request, receive and use coverage data.

As illustrated, the program code 1020 stored on medium 1018 and/or memory 1016 may include a data access module 1024 that when implemented by the one or more processors 1004 configures the one or more processors 1004 to request and receive coverage data from network entity or a server as discussed herein, and in particular discussed in relation to FIGS. 8A, 8B and 8C.

Figure 14:
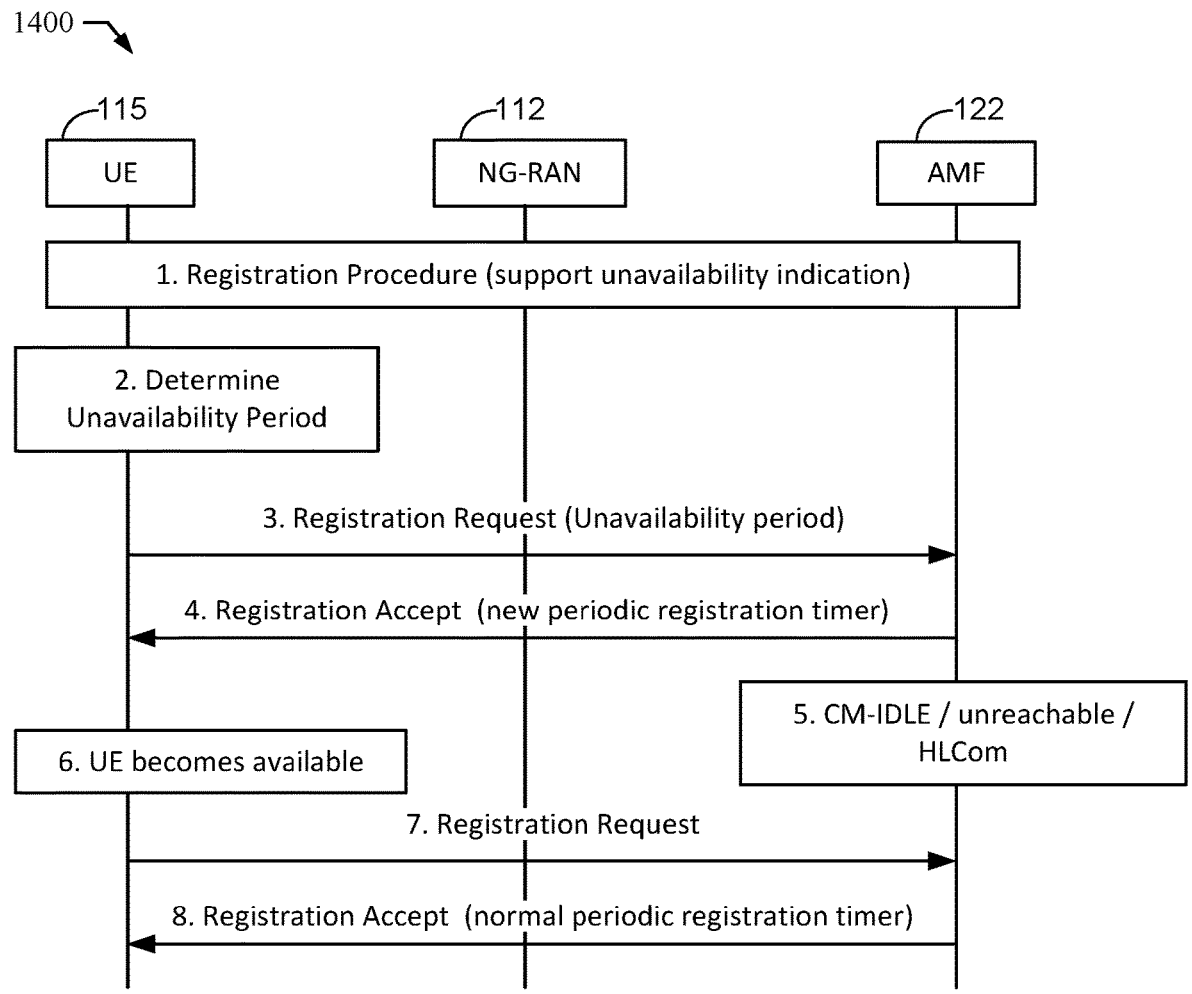
FIG. 14 is a diagram of a procedure that may be performed to report a generalized unavailability period, according to an embodiment.

As illustrated, the program code 1020 stored on medium 1018 and/or memory 1016 may include an unavailability reporting module 1026 that when implemented by the one or more processors 1004 configures the one or more processors 1004 to report an upcoming unavailability period and/or the ending of an unavailability period to a network entity as discussed herein, and in particular discussed in relation to FIG. 14.

The methodologies described herein may be implemented by various means depending upon the application. For example, these methodologies may be implemented in hardware, firmware, software, or any combination thereof. For a hardware implementation, the one or more processors 1004 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 1000 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1018 or memory 1016 and executed by one or more processors 1004, causing the one or more processors 1004 to operate as a special purpose computer programmed to perform the techniques disclosed herein. Memory may be implemented within the one or processors 1004 or external to the one or more processors 1004. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 1000 may be stored as one or more instructions or code on a non-transitory computer-readable storage medium such as medium 1018 or memory 1016. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 1000 may be provided as signals on transmission media included in a communication apparatus. For example, a communication apparatus comprising part or all of UE 1000 may include a transceiver having signals indicative of instructions and data. The instructions and data are stored on non-transitory computer readable medium 1018 or memory 1016, and are configured to cause the one or more processors 1004 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 11:
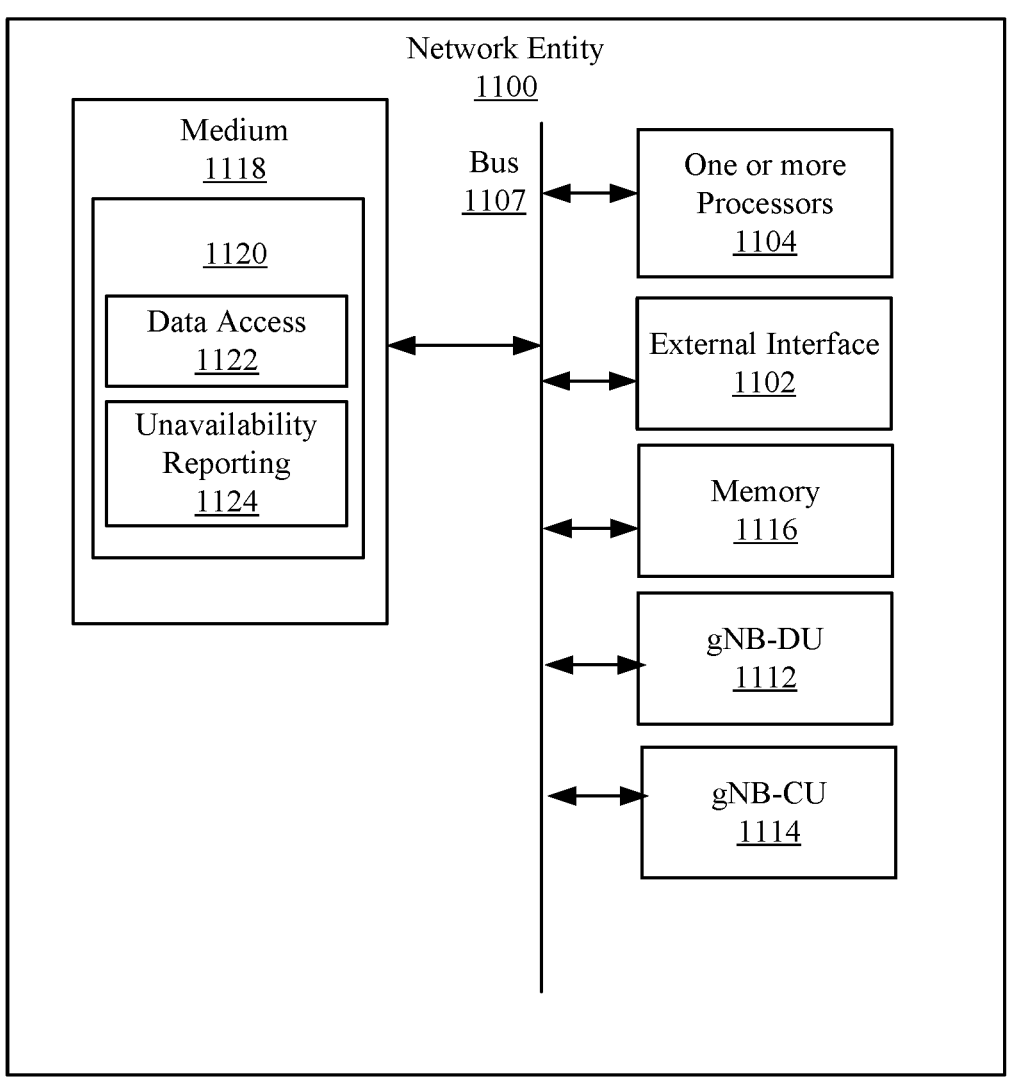
FIG. 11 illustrates a block diagram of a network entity that supports providing coverage data to assist access by the UE to a serving PLMN in accordance with aspects of the present disclosure.

FIG. 11 is a diagram illustrating an example of a hardware implementation of a network entity 1100, which may correspond to network entity 185 illustrated in FIGS. 8A, 8C, and 9. The network entity 1100, for example, may be one or more entities within the core network, such as an AMF 122, SMF 134, LMF 124, or an MME, or may be a base station such as gNB 106/202/307, which may be separate from an SV 102/202/302 or as described above may be included as part of an SV 202. The network entity 1100 may perform the signal flows illustrated in FIGS. 8A, 8C, and 16 and method 1600 of FIG. 16 and algorithms disclosed herein. The network entity 1100 may include, e.g., hardware components such as an external interface 1102, which may comprise one or more wired and/or wireless interfaces capable of connecting to and communicating with the UE 115 and with one or more entities in a core network in a PLMN, such as AMF 122 in 5GCN 110, NTN Gateway 104, as well as other gNBs, and to other elements in a wireless network directly or through one or more intermediary networks and/or one or more network entities, as shown in FIGS. 1, 2, and 3. The external interface 1102 may include one or more antennas to support a wireless interface and/or a wireless backhaul to elements in the wireless network. The network entity 1100 further includes one or more processors 1104, memory 1116, and non-transitory computer readable medium 1118, which may be coupled together with bus 1107. The network entity 1100 may include a gNB-DU 1112 and/or gNB-CU 1114 (e.g. in the case that network entity 1100 corresponds to gNB 202 in FIG. 2 with gNB 202 comprising a gNB-CU and one or more gNB-DUs), which may be hardware components or implemented by specifically configured one or more processors 1104. gNB-DU 1112 and gNB-CU 1114 may not be present when network entity 1100 itself corresponds to a gNB-DU (e.g. gNB-DU 302) or to a gNB-CU (e.g. gNB-CU 307) or corresponds to a core network entity, such as AMF 122, LMF 124, or an MME.

The one or more processors 1104 may be implemented using a combination of hardware, firmware, and software. For example, the one or more processors 1104 may be configured to perform the functions discussed herein by implementing one or more instructions or program code 1120 on a non-transitory computer readable medium, such as medium 1118 and/or memory 1116. In some embodiments, the one or more processors 1104 may represent one or more circuits configurable to perform at least a portion of a data signal computing procedure or process related to the operation of network entity 1100.

Figure 12:
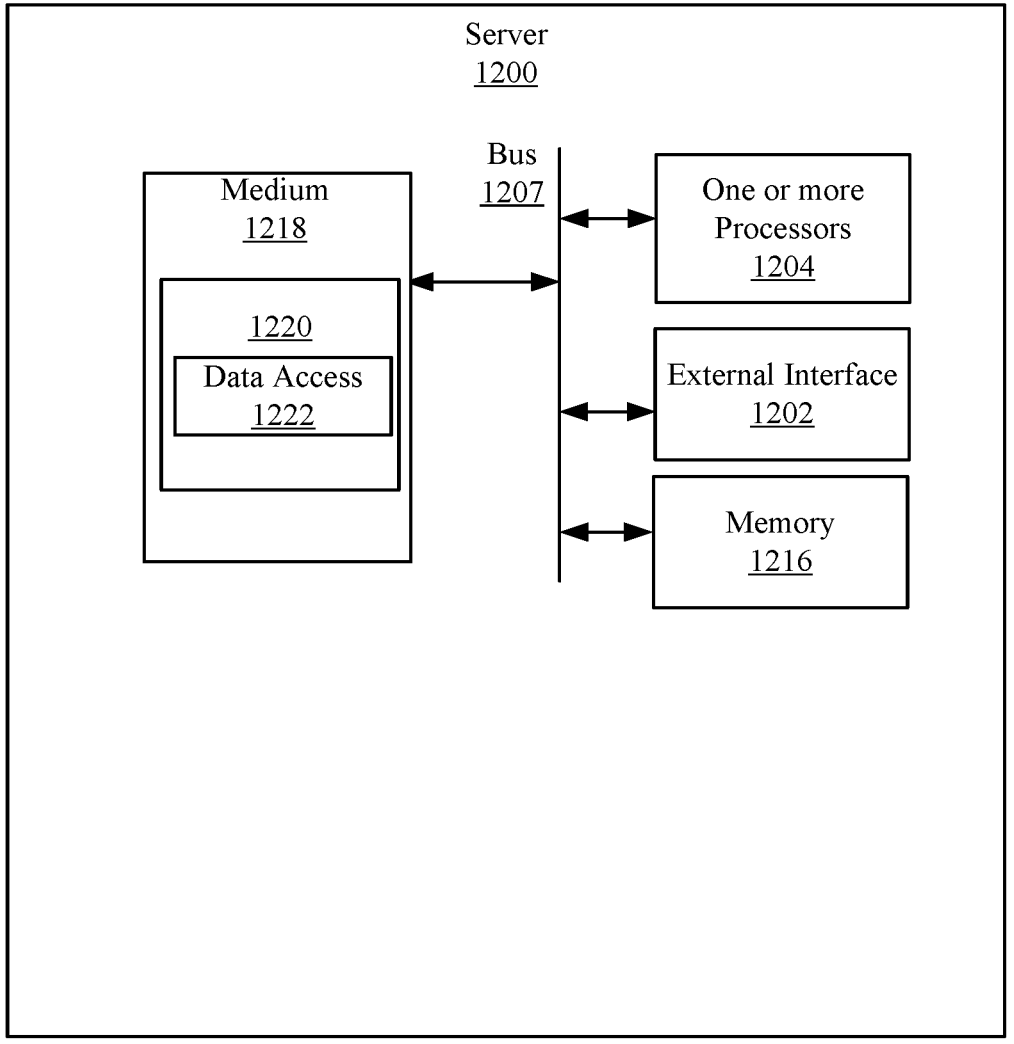
FIG. 12 illustrates a block diagram of a server that supports providing coverage data to assist access by the UE to a serving PLMN in accordance with aspects of the present disclosure.

The medium 1118 and/or memory 1116 may store instructions or program code 1120 that contain executable code or software instructions that when executed by the one or more processors 1104 cause the one or more processors 1104 to operate as a special purpose computer programmed to perform the techniques disclosed herein (e.g. such as the signal flows illustrated in FIGS. 8A, 8B, and 12 and method 1600 of FIG. 16 and algorithms disclosed herein). As illustrated in network entity 1100, the medium 1118 and/or memory 1116 may include one or more components or modules that may be implemented by the one or more processors 1104 to perform the methodologies described herein. While the components or modules are illustrated as software in medium 1118 that is executable by the one or more processors 1104, it should be understood that the components or modules may be stored in memory 1116 or may be dedicated hardware either in the one or more processors 1104 or off the processors.

A number of software modules and data tables may reside in the medium 1118 and/or memory 1116 and be utilized by the one or more processors 1104 in order to manage both communications and the functionality described herein. It should be appreciated that the organization of the contents of the medium 1118 and/or memory 1116 as shown in network entity 1100 is merely exemplary, and as such the functionality of the modules and/or data structures may be combined, separated, and/or be structured in different ways depending upon the implementation of the network entity 1100. While the components or modules are illustrated as software in medium 1118 and/or memory 1116 that is executable by the one or more processors 1104, it should be understood that the components or modules may be firmware or dedicated hardware either in the one or more processors 1104 or off the processors.

As illustrated, the program code 1120 stored on medium 1118 and/or memory 1116 may include a data access module 1122 that when implemented by the one or more processors 1104 configures the one or more processors 1104 to support the provision of coverage data to the UE from a server or from the network entity 1100 as discussed herein, and in particular discussed in relation to FIGS. 8A, 8B, 8C and FIG. 9.

As illustrated, the program code 1120 stored on medium 1118 and/or memory 1116 may include an Unavailability Reporting module 1124 that when implemented by the one or more processors 1104 configures the one or more processors 1104 to support the receipt of a report from a UE concerning an unavailability period for the UE as discussed herein, and in particular discussed in relation to FIG. 14.

The methodologies described herein may be implemented by various means depending upon the application. For example, these methodologies may be implemented in hardware, firmware, software, or any combination thereof. For a hardware implementation, the one or more processors 1104 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of network entity 1100 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1118 or memory 1116 and executed by one or more processors 1104, causing the one or more processors 1104 to operate as a special purpose computer programmed to perform the techniques disclosed herein. Memory may be implemented within the one or processors 1104 or external to the one or more processors 1104. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by network entity 1100 may be stored as one or more instructions or code on a non-transitory computer-readable storage medium such as medium 1118 or memory 1116. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for network entity 1100 may be provided as signals on transmission media included in a communication apparatus. For example, a communication apparatus comprising part or all of network entity 1100 may include a transceiver having signals indicative of instructions and data. The instructions and data are stored on non-transitory computer readable media, e.g., medium 1118 or memory 1116, and are configured to cause the one or more processors 1104 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

FIG. 12 is a diagram illustrating an example of a hardware implementation of a server 1200 belonging to the serving PLMN, a home PLMN for the UE, an operator of satellites providing access to the serving PLMN, or to a separate third party. The server 1200, for example, may be the server 187 illustrated in FIGS. 8B, and 9. The server 1200 may perform the signal flows of FIGS. 8B, and 9 and techniques disclosed herein. The server may operate as a network node in a communication network, e.g., a wireless network, PLMN, etc. The server 1200 includes, e.g., hardware components such as an external interface 1202 configured to be communication with network components in the PLMN and UE 115, e.g., using HTTP, HTTPs or SMS. The server 1200 includes one or more processors 1204, memory 1216, and non-transitory computer readable medium 1218, which may be coupled together with bus 1207.

The one or more processors 1204 may be implemented using a combination of hardware, firmware, and software. For example, the one or more processors 1204 may be configured to perform the functions discussed herein by implementing one or more instructions or program code 1220 on a non-transitory computer readable medium, such as medium 1218 and/or memory 1216. In some embodiments, the one or more processors 1204 may represent one or more circuits configurable to perform at least a portion of a data signal computing procedure or process related to the operation of server 1200.

The medium 1218 and/or memory 1216 may store instructions or program code 1220 that contain executable code or software instructions that when executed by the one or more processors 1204 cause the one or more processors 1204 to operate as a special purpose computer programmed to perform the techniques disclosed herein (e.g. such as the signal flows of FIGS. 8B and 9 and techniques disclosed herein). As illustrated in server 1200, the medium 1218 and/or memory 1216 may include one or more components or modules that may be implemented by the one or more processors 1204 to perform the methodologies described herein. While the components or modules are illustrated as software in medium 1218 that is executable by the one or more processors 1204, it should be understood that the components or modules may be stored in memory 1216 or may be dedicated hardware either in the one or more processors 1204 or off the processors. The medium 1218 and/or memory 1216 (or another medium including an external storage medium accessed by the server 1200) may store data that may be provided to a UE upon request, such as coverage data that may enable the UE to determine whether access to a serving PLMN can be possible at one or more locations of the UE, at one or more future times, using one more radio access technologies (RATs) or for some combination of these. The coverage data may be for NTN RAT(s) and/or TN RAT(s).

A number of software modules and data tables may reside in the medium 1218 and/or memory 1216 and be utilized by the one or more processors 1204 in order to manage both communications and the functionality described herein. It should be appreciated that the organization of the contents of the medium 1218 and/or memory 1216 as shown in server 1200 is merely exemplary, and as such the functionality of the modules and/or data structures may be combined, separated, and/or be structured in different ways depending upon the implementation of the server 1200. While the components or modules are illustrated as software in medium 1218 and/or memory 1216 that is executable by the one or more processors 1204, it should be understood that the components or modules may be firmware or dedicated hardware either in the one or more processors 1204 or off the processors.

As illustrated, the program code 1220 stored on medium 1218 and/or memory 1216 may include a data access module 1222 that when implemented by the one or more processors 1204 configures the one or more processors 1204 to support the provision of coverage data to the UE as discussed herein, and in particular discussed in relation to FIG. 8B and FIG. 9.

The methodologies described herein may be implemented by various means depending upon the application. For example, these methodologies may be implemented in hardware, firmware, software, or any combination thereof. For a hardware implementation, the one or more processors 1204 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of server 1200 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1218 or memory 1216 and executed by one or more processors 1204, causing the one or more processors 1204 to operate as a special purpose computer programmed to perform the techniques disclosed herein. Memory 1216 may be implemented within the one or processors 1204 or external to the one or more processors 1204. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by server 1200 may be stored as one or more instructions or code on a non-transitory computer-readable storage medium such as medium 1218 or memory 1216. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for server 1200 may be provided as signals on transmission media included in a communication apparatus. For example, a communication apparatus comprising part or all of server 1200 may include a transceiver having signals indicative of instructions and data. The instructions and data are stored on non-transitory computer readable media, e.g., medium 1218 or memory 1216, and are configured to cause the one or more processors 1204 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 13:
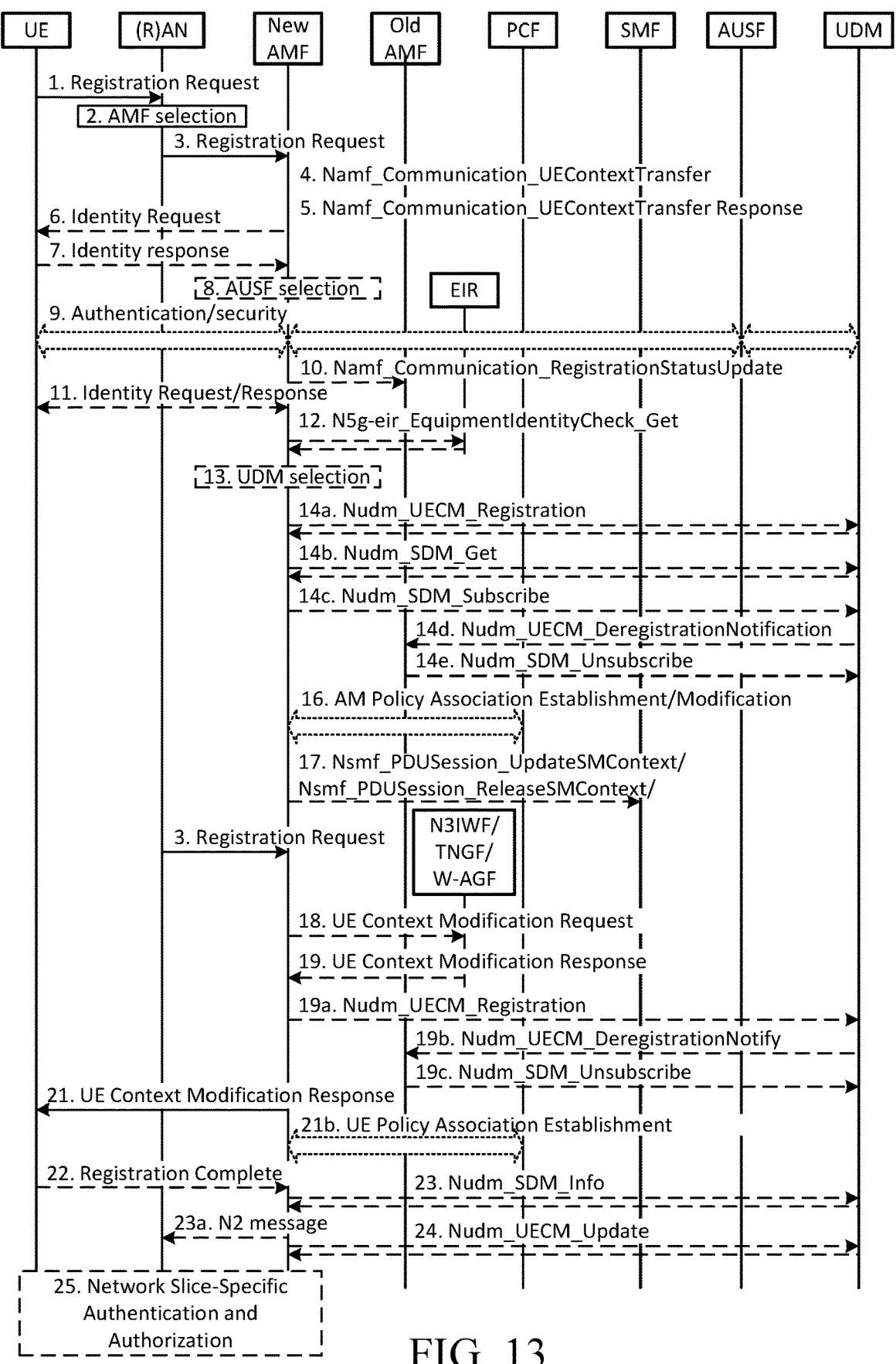
FIG. 13 is a diagram of a Registration of a UE with a PLMN which may assist provision of coverage data to the UE.

FIG. 13 illustrates a procedure to enable a UE (e.g. UE 115) to register with a serving PLMN that may be providing 5G NR satellite access to the UE, where, among other things, a serving AMF (e.g. AMF 120) for the UE in the serving PLMN may provide authorization data to the UE. FIG. 13 shows a procedure that is similar to the procedure described previously for FIG. 8A but allows for provision of authorization data by either a serving AMF for a UE (as in FIG. 8A) or by a UDM in the HPLMN of the UE. Following use of the procedure shown in FIG. 13 by a UE, the UE might use the authorization data thereby obtained to obtain coverage data from a server (referred to below as an external server) as described for FIG. 8B.

In FIG. 13, the authorization data may come from (e.g. may be determined by) either the serving AMF or a Unified Data Management (UDM) in the UE's HPLMN. The authorization data provides information to the UE to enable the UE to access an external server (e.g. a server belonging to a satellite network operator) and to obtain satellite coverage data (e.g. satellite coverage map data) from the server. For example, the satellite coverage data may indicate when satellite coverage is available and is not available at one or more locations and at one or more times as described elsewhere here. The UE may provide input parameters to the external server such as a minimum signal level or minimum signal power and with the external server then determining that satellite coverage is not available at any location and time either when no satellites are visible at this location and time or when signal levels or signal power from all visible satellites at this location and time are below the minimum signal level or minimum signal power provided by the UE. However, the external server may determine that satellite coverage is available at any location and time when the signal level or signal power from at least one visible satellite at this location and time is equal to or greater than the minimum signal level or minimum signal power provided by the UE. The minimum signal level or minimum signal power level provided by the UE may equal the minimum signal level or signal power necessary for the UE to be able to access the satellite for communication with a serving PLMN. When the serving AMF (e.g. AMF 122) provides the authorization data to the UE, the external server may be associated with the serving PLMN. When the UDM provides the authorization data to the AMF for forwarding to the UE, the external server may be associated with the UE's HPLMN. The authorization data may include an address of the server (e.g. an IP address, URI, fully qualified domain name (FQDN), SMS address), may indicate a protocol or transport protocol to be used by the UE to access the external server and obtain satellite coverage data from the server (e.g. HTTP, HTTPS, SMS), may include a temporary identifier (or identity) for the UE which can be verified or authenticated by the external server (e.g. as described elsewhere here) and may indicate the types of satellite coverage data available from the external server and a time period or time duration during which the UE is allowed to access the external server to obtain satellite coverage data.

The UE may initiate the registration procedure using any of a variety of registration types, including when the UE needs authorization to obtain coverage availability information for NR satellite access. The various stages of the procedure of FIG. 13 are discussed below, where portions that are most relevant to obtaining authorization to receive coverage data are shown in italic font.

STAGE 1: The UE sends a NAS Registration Request to the AMF (e.g. as at 805 in FIG. 8A). Details of this include a UE to (R)AN: AN message (AN parameters, Registration Request (Registration type, SUCI or 5G-GUTI or PEI, [last visited TAI (if available)], Security parameters, [Requested NSSAI], [Mapping Of Requested NSSAI], [Default Configured NSSAI Indication], [UE Radio Capability Update], [UE MM Core Network Capability], [PDU Session status], [List Of PDU Sessions To Be Activated], [Follow-on request], [MICO mode preference], [Requested Active Time], [Requested DRX parameters for E-UTRA and NR], [Requested DRX parameters for NB-IoT], [extended idle mode DRX parameters], [LADN DNN(s) or Indicator Of Requesting LADN Information], [NAS message container], [Support for restriction of use of Enhanced Coverage], [Preferred Network Behavior], [UE paging probability information], [Paging Subgrouping Support Indication], [UE Policy Container (the list of PSIs, indication of UE support for ANDSP and the operating system identifier)] and [UE Radio Capability ID], [Release Request indication], [Paging Restriction Information], PEI, [PLMN with Disaster Condition], [Requested Periodic Update time], [Unavailability Period Duration], [Request authorization for obtaining satellite coverage availability information])). The UE Policy Container and its usage are defined in 3GPP TS 23.503.

In the case of NG-RAN, the AN parameters may include, e.g., 5G-S-TMSI or GUAMI, the Selected PLMN ID (or PLMN ID and NID, see clause 5.30 of 3GPP TS 23.501) and NSSAI information, the AN parameters also include Establishment cause. The Establishment cause provides the reason for requesting the establishment of an RRC connection. Whether and how the UE includes the NSSAI information as part of the AN parameters is dependent on the value of the Access Stratum Connection Establishment NSSAI Inclusion Mode parameter, as specified in clause 5.15.9 of 3GPP TS 23.501.

The AN parameters may also include an IAB-Indication if the UE is an IAB-node accessing 5GS.

The Registration type indicates if the UE wants to perform an Initial Registration (i.e. the UE is in RM-DEREG- ISTERED state), a Mobility Registration Update (i.e. the UE is in RM-REGISTERED state and initiates a Registration procedure due to mobility or due to the UE needs to update its capabilities or protocol parameters, or to request a change of the set of network slices it is allowed to use), a Periodic Registration Update (i.e. the UE is in RM-REGISTERED state and initiates a Registration procedure due to the Periodic Registration Update timer expiry, see clause 4.2.2.2.1 of 3GPP TS 23.502), an Emergency Registration (i.e. the UE is in limited service state), a Disaster Roaming Initial Registration, or a Disaster Roaming Mobility Registration Update.

When the UE is using E-UTRA, the UE may indicate its support of CIoT 5GS Optimizations, which may be relevant for the AMF selection, in the RRC connection establishment signaling associated with the Registration Request.

When the UE is performing an Initial Registration or a Disaster Roaming Registration the UE may indicate its UE identity in the Registration Request message as follows, listed in decreasing order of preference in the case of registration with a PLMN:

i) a 5G-GUTI mapped from an EPS GUTI, if the UE has a valid EPS GUTI.

ii) a native 5G-GUTI assigned by an equivalent SNPN to the SNPN to which the UE is attempting to register along with the NID of the SNPN that assigned the 5G-GUTI, if available;

iii) a native 5G-GUTI assigned by the PLMN to which the UE is attempting to register, if available;

iv) a native 5G-GUTI assigned by an equivalent PLMN to the PLMN to which the UE is attempting to register, if available;

iv) a native 5G-GUTI assigned by any other PLMN, if available. According to some embodiments, this can also be a 5G-GUTIs assigned via another access type.

v) Otherwise, the UE may include its SUCI in the Registration Request as defined in 3GPP TS 33.501.

If the UE is registering with an SNPN, when the UE is performing an Initial Registration the UE may indicate its UE identity in the Registration Request message as follows, listed in decreasing order of preference:

i) a native 5G-GUTI assigned by the same SNPN to which the UE is attempting to register, if available;

ii) a native 5G-GUTI assigned by any other SNPN along with the NID of the SNPN that assigned the 5G-GUTI, if available.

iii) Otherwise, the UE may include its SUCI in the Registration Request as defined in 3GPP TS 33.501.

When the UE performing an Initial Registration has both a valid EPS GUTI and a native 5G-GUTI, the UE may also indicate the native 5G-GUTI as Additional GUTI. If more than one native 5G-GUTIs are available, the UE may select the 5G-GUTI in decreasing order of preference among items (ii)-(iv) in the list above.

The NAS message container may be included if the UE is sending a Registration Request message as an Initial NAS message and the UE has a valid 5G NAS security context and the UE needs to send non-cleartext IEs (see clause 4.4.6 in 3GPP TS 24.501.) If the UE does not need to send non-cleartext IEs, the UE may send a Registration Request message without including the NAS message container.

If the UE does not have a valid 5G NAS security context, the UE may send the Registration Request message without including the NAS message container. The UE may include the entire Registration Request message (i.e. containing cleartext IEs and non-cleartext IEs) in the NAS message container that is sent as part of the Security Mode Complete message in stage 9b.

When the UE is performing an Initial Registration (i.e. the UE is in RM-DEREGISTERED state) with a native 5G-GUTI then the UE may indicate the related GUAMI information in the AN parameters. When the UE is performing an Initial Registration with its SUCI, the UE may not indicate any GUAMI information in the AN parameters.

When the UE is performing an Initial Registration or a Mobility Registration and if CIoT 5GS Optimizations are supported the UE may indicate its Preferred Network Behavior (see clause 5.31.2 of 3GPP TS 23.501). If 51 mode is supported the UE's EPC Preferred Network Behavior is included in the 51 UE network capabilities in the Registration Request message, see clause 8.2.6.1 of 3GPP TS 24.501.

For an Emergency Registration, the SUCI may be included if the UE does not have a valid 5G-GUTI available; the PEI may be included when the UE has no SUPI and no valid 5G-GUTI. In other cases, the 5G-GUTI is included and it indicates the last serving AMF.

The UE may provide the UE's usage setting based on its configuration as defined in clause 5.16.3.7 of 3GPP TS 23.501. The UE provides Requested NSSAI (as described in clause 5.15.5.2.1 of 3GPP TS 23.501 and, if the UE supports the subscription-based restrictions to simultaneous registration of network slices, also taking into account the NSSRG Information constraints as described in clause 5.15.12 of 3GPP TS 23.501 and, in the case of Initial Registration or Mobility Registration Update, the UE includes the Mapping Of Requested NSSAI (if available), which is the mapping of each S-NSSAI of the Requested NSSAI to the HPLMN S-NSSAIs, to ensure that the network is able to verify whether the S-NSSAI(s) in the Requested NSSAI are permitted based on the Subscribed S-NSSAIs. In the case of inter PLMN mobility, if the serving PLMN S-NSSAI(s) corresponding to the established PDU Session(s) are not present in the UE, the associated HPLMN S-NSSAI(s) associated with the established PDU Session(s) may be provided in the Mapping Of Requested NSSAI as described in clause 5.15.5.2.1 3GPP TS 23.501.

The UE includes the Default Configured NSSAI Indication if the UE is using a Default Configured NSSAI, as defined in 3GPP TS 23.501.

The UE may include UE paging probability information if it supports the assignment of WUS Assistance Information or AMF PEIPS Assistance Information from the AMF (see 3GPP TS 23.501).

The UE may include Paging Subgrouping Support Indication as defined in 3GPP TS 23.501.

In the case of Mobility Registration Update, the UE includes in the List Of PDU Sessions To Be Activated the PDU Sessions for which there are pending uplink data. When the UE includes the List Of PDU Sessions To Be Activated, the UE may indicate PDU Sessions only associated with the access the Registration Request is related to. As defined in 3GPP TS 24.501 the UE may include always-on PDU Sessions which are accepted by the network in the List Of PDU Sessions To Be Activated even if there are no pending uplink data for those PDU Sessions.

NOTE 3: A PDU Session corresponding to a LADN is not included in the List Of PDU Sessions To Be Activated when the UE is outside the area of availability of the LADN.

The UE MM Core Network Capability is provided by the UE and handled by AMF as defined in clause 5.4.4a of 3GPP TS 23.501. The UE includes in the UE MM Core Network Capability an indication if it supports Request Type flag "handover" for PDN connectivity request during the attach procedure as defined in clause 5.17.2.3.1 of 3GPP TS 23.501. If the UE supports 'Strictly Periodic Registration Timer Indication', the UE indicates its capability of 'Strictly Periodic Registration Timer Indication' in the UE MM Core Network Capability. If the UE supports CAG, the UE indicates its capability of "CAG supported" in the UE MM Core Network Capability. If the UE operating two or more USIMs, supports and intends to use one or more Multi-USIM feature(s), the UE indicates one or more Multi-USIM specific features described in clause 5.38 of 3GPP TS 23.501 in the UE MM Core Network Capability. If the UE supports equivalent SNPNs, the UE indicates its capability of "equivalent SNPNs" in the UE MM Core Network Capability. If the UE supports Unavailability Period, the UE indicates its capability of "Unavailability Period Support" in the UE MM Core Network Capability.

The UE may provide either the LADN DNN(s) or an Indication Of Requesting LADN Information as described in clause 5.6.5 of 3GPP TS 23.501.

If available, the last visited TAI may be included in order to help the AMF produce Registration Area for the UE.

NOTE 4: With NR satellite access, the last visited TAI is determined as specified in clause 5.4.11.6 of 3GPP TS 23.501.

The Security parameters are used for Authentication and integrity protection, see 3GPP TS 33.501. Requested NSSAI indicates the Network Slice Selection Assistance Information (as defined in clause 5.15 of 3GPP TS 23.501). The PDU Session status indicates the previously established PDU Sessions in the UE. When the UE is connected to the two AMFs belonging to different PLMN via 3GPP access and non-3GPP access then the PDU Session status indicates the established PDU Session of the current PLMN in the UE.

The Follow-on request is included when the UE has pending uplink signaling and the UE doesn't include List Of PDU Sessions To Be Activated, or the Registration type indicates the UE wants to perform an Emergency Registration. In Initial Registration and Mobility Registration Update, UE provides the UE Requested DRX parameters, as defined in clause 5.4.5 of 3GPP TS 23.501. The UE may provide the extended idle mode DRX parameters as defined in clause 5.31.7.2 of 3GPP TS 23.501 to request extended idle mode DRX.

The UE provides UE Radio Capability Update indication as described in 3GPP TS 23.501.

The UE includes the MICO mode preference and optionally a Requested Active Time value and Requested Periodic Update time value if the UE wants to use MICO Mode with Active Time.

The UE may indicate its Service Gap Control Capability in the UE MM Core Network Capability, see clause 5.31.16 of 3GPP TS 23.501.

For a UE with a running Service Gap timer in the UE, the UE may not set Follow-on Request indication or Uplink data status in the Registration Request message (see clause 5.31.16 of 3GPP TS 23.501), except for network access for regulatory prioritized services like Emergency services or exception reporting.

If UE supports RACS and has been assigned UE Radio Capability ID(s), the UE may indicate a UE Radio Capability ID as defined in clause 5.4.4.1a of 3GPP TS 23.501 as non-cleartext IE.

The PEI may be retrieved in initial registration from the UE as described in clause 4.2.2.2.1 of 3GPP TS 23.502.

If a UE supports the subscription-based restrictions to simultaneous registration of network slices feature, it includes the NSSRG handling support indication in the UE 5GMM Core Network Capability according to clause 5.15.12 of 3GPP TS 23.501. The AMF stores whether the UE supports this feature in the UE context.

When a Multi-USIM UE wants to enter CM-IDLE state immediately e.g. after having performed mobility or periodic registration, it includes the Release Request indication and optionally provides Paging Restriction Information.

When the UE is performing a Disaster Roaming Registration, the UE may indicate the PLMN with Disaster Condition for the cases as defined in 3GPP TS 24.501.

If the UE and network have indicated support Unavailability Period and an event is triggered in the UE that would make the UE unavailable for a certain period of time, the UE indicates Unavailability Period by including Unavailability Period Duration as described in clause 5.4.1.4 of 3GPP TS 23.501.

If the Registration is for NR satellite access, and if the UE supports receipt of satellite coverage availability information (SCAI) and needs an authorization or a further authorization to obtain satellite coverage availability information from an external server, the UE includes a request for authorization for obtaining the satellite coverage availability information in the Registration Request sent at stage 1.

STAGE 2: If a 5G-S-TMSI or GUAMI is not included or the 5G-S-TMSI or GUAMI does not indicate a valid AMF the (R)AN, based on (R)AT and Requested NSSAI, if available, selects an AMF The (R)AN selects an AMF as described in clause 6.3.5 of 3GPP TS 23.501. If UE is in CM-CONNECTED state, the (R)AN can forward the Registration Request message to the AMF based on the N2 connection of the UE.

If the (R)AN cannot select an appropriate AMF, it forwards the Registration Request to an AMF which has been configured, in (R)AN, to perform AMF selection.

STAGE 3: (R)AN to new AMF: N2 message (N2 parameters, Registration Request (as described in stage 1) and [LTE-M Indication].

When NG-RAN is used, the N2 parameters include the Selected PLMN ID (or PLMN ID and NID, see clause 5.30 of 3GPP TS 23.501), Location Information and Cell Identity related to the cell in which the UE is camping, UE Context Request which indicates that a UE context including security information needs to be setup at the NG-RAN.

When NG-RAN is used, the N2 parameters may also include the Establishment cause and IAB-Indication if the indication is received in AN parameters in stage 1.

Mapping Of Requested NSSAI is provided only if available.

If the Registration type indicated by the UE is Periodic Registration Update, then stages 4 to 19 may be omitted.

When the Establishment cause is associated with priority services (e.g. MPS, MCS), the AMF includes a Message Priority header to indicate priority information. Other NFs relay the priority information by including the Message Priority header in service-based interfaces, as specified in 3GPP TS 29.500.

The RAT Type the UE is using is determined (see clause 4.2.2.2.1 of 3GPP TS 23.502) and based on it the AMF determines whether the UE is performing Inter-RAT mobility to or from NB-IoT. If the AMF receives the LTE M indication, then it considers that the RAT Type is LTE-M and stores the LTE-M Indication in UE Context.

If a UE includes a Preferred Network Behavior, this defines the Network Behavior the UE supports and is expecting to be available in the network as defined in clause 5.31.2 of 3GPP TS 23.501.

If the UE has included the Preferred Network Behavior and what the UE indicated it supports in Preferred Network Behavior is incompatible with the network support, the AMF may reject the Registration Request with an appropriate cause value (e.g. one that avoids retries on this PLMN).

If there is a Service Gap timer running in the UE Context in AMF for the UE and Follow-on Request indication or Uplink data status is included in the Registration Request message, the AMF may ignore the Follow-on Request indication and Uplink data status and not perform any of the actions related to the status.

If the UE has included a UE Radio Capability ID in stage 1 and the AMF supports RACS, the AMF stores the Radio Capability ID in UE context.

For NR satellite access, the AMF may verify the UE location and determine whether the PLMN is allowed to operate at the UE location, as described in clause 5.4.11.4 of 3GPP TS 23.501. If the UE receives a Registration Reject message with cause value indicating that the PLMN is not allowed to operate at the present UE location, the UE may attempt to select a PLMN as specified in 3GPP TS 23.122.

For a Disaster Roaming Registration, based on the ULI (including Cell ID) received from the NG-RAN, the PLMN with Disaster Condition derived from the UE's 5G-GUTI, derived from the UE's SUCI or indicated by the UE and the local configuration, the AMF determines if Disaster Roaming service can be provided. If the current location is not subject to Disaster Roaming service or the Disaster Roaming service is not provided to the PLMN with Disaster Condition derived from the UE's 5G-GUTI, derived from the UE's SUCI or indicated by UE, then the AMF should reject the Registration Request indicating a suitable Cause value.

STAGE 4: [Conditional] new AMF to old AMF: Namf_Communication_UEContextTransfer (complete Registration Request) or new AMF to UDSF: Nudsf_Unstructured Data Management_Query( ).

The new AMF determines the old AMF using the UE's 5G-GUTI. If the new AMF received an NID in the Registration request, it determines that the 5G-GUTI was assigned by an SNPN and determines the old AMF using the 5G-GUTI and NID of the SNPN.

(With UDSF Deployment): If the UE's 5G-GUTI was included in the Registration Request and the serving AMF has changed since last Registration procedure, new AMF and old AMF are in the same AMF Set and UDSF is deployed, the new AMF retrieves the stored UE's SUPI and UE context directly from the UDSF using Nudsf_Unstructured_DataManagement_Query service operation or they can share stored UE context via implementation specific means if UDSF is not deployed. This includes also event subscription information by each NF consumer for the given UE. In this case, the new AMF uses integrity protected complete Registration request NAS message to perform and verify integrity protection.

(Without UDSF Deployment): If the UE's 5G-GUTI was included in the Registration Request and the serving AMF has changed since last Registration procedure, the new AMF may invoke the Namf_Communication_UEContextTransfer service operation on the old AMF including the complete Registration Request NAS message, which may be integrity protected, as well as the Access Type, to request the UE's SUPI and UE Context. See clause 5.2.2.2.2 of 3GPP TS 23.502 for details of this service operation. In this case, the old AMF uses either 5G-GUTI and the integrity protected complete Registration request NAS message, or the SUPI and an indication that the UE is validated from the new AMF, to verify integrity protection if the context transfer service operation invocation corresponds to the UE requested. The old AMF also transfers the event subscriptions information by each NF consumer, for the UE, to the new AMF. If the old AMF has not yet reported a non-zero MO Exception Data Counter to the (H-)SMF, the Context Response also includes the MO Exception Data Counter.

If the old AMF has PDU Sessions for another access type (different from the Access Type indicated in this stage) and if the old AMF determines that there is no possibility for relocating the N2 interface to the new AMF, the old AMF returns UE's SUPI and indicates that the Registration Request has been validated for integrity protection, but does not include the rest of the UE context.

For inter PLMN mobility, UE Context information includes HPLMN S-NSSAIs corresponding to the Allowed NSSAI for each Access Type, without Allowed NSSAI of old PLMN.

NOTE 5: The new AMF Sets the indication that the UE is validated according to stage 9a, if the new AMF has performed successful UE authentication after previous integrity check failure in the old AMF.

NOTE 6: The NF consumers do not need to subscribe for the events once again with the new AMF after the UE is successfully registered with the new AMF.

If the new AMF has already received UE contexts from the old AMF during handover procedure, then stage 4, 5 and 10 may be skipped.

For an Emergency Registration, if the UE identifies itself with a 5G-GUTI that is not known to the AMF, stages 4 and 5 are skipped and the AMF immediately requests the SUPI from the UE. If the UE identifies itself with PEI, the SUPI request may be skipped. Allowing Emergency Registration without a user identity is dependent on local regulations.

STAGE 5: [Conditional] old AMF to new AMF: Response to Namf_Communication_UEContextTransfer (SUPI, UE Context in AMF (as per Table 5.2.2.2.2-1)) or UDSF to new AMF: Nudsf_Unstructured Data Management_Query( ). The old AMF may start an implementation specific (guard) timer for the UE context.

If the UDSF was queried in stage 4, the UDSF responds to the new AMF for the Nudsf_Unstructured Data Management_Query invocation with the related contexts including established PDU Sessions, the old AMF includes SMF information DNN, S-NSSAI(s) and PDU Session ID, active NGAP UE-TNLA bindings to N3IWF/TNGF/W-AGF, the old AMF includes information about the NGAP UE-TNLA bindings. If the Old AMF was queried in stage 4, Old AMF responds to the new AMF for the Namf_Communication_UEContextTransfer invocation by including the UE's SUPI and UE Context.

If old AMF holds information about established PDU Session(s) and it is not an Initial Registration, the old AMF includes SMF information, DNN(s), S-NSSAI(s) and PDU Session ID(s).

If old AMF holds UE context established via N3IWF, W-AGF or TNGF, the old AMF includes the CM state via N3IWF, W-AGF or TNGF. If the UE is in CM-CONNECTED state via N3IWF, W-AGF or TNGF, the old AMF includes information about the NGAP UE-TNLA bindings.

If old AMF fails the integrity check of the Registration Request NAS message, the old AMF may indicate the integrity check failure. If the new AMF is configured to allow emergency services for unauthenticated UE, the new AMF behaves as follows:

If the UE has only an emergency PDU Session, the AMF either skips the authentication and security procedure or accepts that the authentication may fail and continues the Mobility Registration Update procedure; or If the UE has both emergency and non-emergency PDU Sessions and authentication fails, the AMF continues the Mobility Registration Update procedure and deactivates all the non-emergency PDU Sessions as specified in clause 4.3.4.2 of 3GPP TS 23.502.

NOTE 7: The new AMF can determine if a PDU Session is used for emergency service by checking whether the DNN matches the emergency DNN.

If old AMF holds information about AM Policy Association and the information about UE Policy Association (i.e. the Policy Control Request Trigger for updating UE Policy as defined in 3GPP TS 23.503), the old AMF includes the information about the AM Policy Association, the UE Policy Association and PCF ID. In the roaming case, V-PCF ID and H-PCF ID are included.

If old AMF was a consumer of UE related NWDAF services, the old AMF includes information about active analytics subscriptions, i.e. the Subscription Correlation ID, NWDAF identifier (i.e. Instance ID or Set ID), Analytics ID(s) and associated Analytics specific data in the Namf_Communication_UEContextTransfer response. Usage of the analytics information by the new AMF is specified in 3GPP TS 23.288.

During inter PLMN mobility, the handling of the UE Radio Capability ID in the new AMF is as defined in 3GPP TS 23.501.

NOTE 8: When new AMF uses UDSF for context retrieval, interactions between old AMF, new AMF and UDSF due to UE signaling on old AMF at the same time is implementation issue.

STAGE 6: [Conditional] new AMF to UE: Identity Request ( ).

If the SUCI is not provided by the UE nor retrieved from the old AMF the Identity Request procedure is initiated by AMF sending an Identity Request message to the UE requesting the SUCI.

STAGE 7: [Conditional] UE to new AMF: Identity Response ( ).

The UE responds with an Identity Response message including the SUCI. The UE derives the SUCI by using the provisioned public key of the HPLMN, as specified in 3GPP TS 33.501.

STAGE 8: The AMF may decide to initiate UE authentication by invoking an AUSF. In that case, the AMF selects an AUSF based on SUPI or SUCI, as described in clause 6.3.4 of 3GPP TS 23.501.

If the AMF is configured to support Emergency Registration for unauthenticated SUPIs and the UE indicated Registration type Emergency Registration, the AMF skips the authentication or the AMF accepts that the authentication may fail and continues the Registration procedure.

STAGE 9a: If authentication is required, the AMF requests it from the AUSF; if Tracing Requirements about the UE are available at the AMF, the AMF provides Tracing Requirements in its request to AUSF. For a Disaster Roaming Registration, the AMF may provide the indication of Disaster Roaming service in its request to AUSF. Upon request from the AMF, the AUSF may execute authentication of the UE. The authentication is performed as described in 3GPP TS 33.501. The AUSF selects a UDM as described in clause 6.3.8 of 3GPP TS 23.501 and gets the authentication data from UDM.

The AUSF may provide the indication of Disaster Roaming service to UDM if the indication is received from AMF. For a Disaster Roaming Registration, the AUSF executes authentication of the UE based on the local policy and/or local configuration as specified in clause 5.40.4 of 3GPP TS 23.501 and in 3GPP TS 33.501.

Once the UE has been authenticated the AUSF provides relevant security related information to the AMF. If the AMF provided a SUCI to AUSF, the AUSF may return the SUPI to AMF only after the authentication is successful.

After successful authentication in new AMF, which is triggered by the integrity check failure in old AMF at stage 5, the new AMF invokes stage 4 above again and indicates that the UE is validated (i.e. through the reason parameter as specified in clause 5.2.2.2.2 of 3GPP TS 23.502).

STAGE 9b: If NAS security context does not exist, the NAS security initiation is performed as described in 3GPP TS 33.501. If the UE had no NAS security context in stage 1, the UE includes the full Registration Request message as defined in 3GPP TS 24.501.

The AMF decides if the Registration Request needs to be rerouted as described in clause 4.2.2.2.3 of 3GPP TS 23.502, where the initial AMF refers to the AMF.

STAGE 9c: The AMF initiates NGAP procedure to provide the 5G-AN with security context as specified in 3GPP TS 38.413 if the 5G-AN had requested for UE Context. Also, if the AMF decides that EPS fallback is supported (e.g. based on UE capability to support Request Type flag "handover" for PDN connectivity request during the attach procedure as defined in clause 5.17.2.3.1 of 3GPP TS 23.501, subscription data and local policy), the AMF may send an indication "Redirection for EPS fallback for voice is possible" towards 5G-AN as specified in 3GPP TS 38.413. Otherwise, the AMF indicates "Redirection for EPS fallback for voice is not possible". In addition, if Tracing Requirements about the UE are available at the AMF, the AMF provides the 5G-AN with Tracing Requirements in the NGAP procedure.

STAGE 9d: The 5G-AN stores the security context and acknowledges to the AMF. The 5G-AN uses the security context to protect the messages exchanged with the UE as described in 3GPP TS 33.501.

STAGE 10: [Conditional] new AMF to old AMF: Namf_Communication_RegistrationStatusUpdate (PDU Session ID(s) to be released e.g. due to slice not supported).

If the AMF has changed the new AMF informs the old AMF that the registration of the UE in the new AMF is completed by invoking the Namf_Communication_RegistrationStatusUpdate service operation.

If the authentication/security procedure fails, then the Registration may be rejected and the new AMF invokes the Namf_Communication_RegistrationStatusUpdate service operation with a reject indication towards the old AMF. The old AMF continues as if the UE context transfer service operation was never received.

The new AMF determines the PDU Session(s) that cannot be supported in the new Registration Area in the cases below:
   If one or more of the S-NSSAIs used in the old Registration Area cannot be served in the target Registration Area.
   When continuity of the PDU Session(s) cannot be supported between networks (e.g. SNPN-SNPN mobility, inter-PLMN mobility where no HR agreement exists).

If any of the cases is met, the new AMF invokes the Namf_Communication_RegistrationStatusUpdate service operation including the rejected PDU Session ID towards the old AMF. Then the new AMF modifies the PDU Session Status correspondingly. The old AMF informs the corresponding SMF(s) to locally release the UE's SM context by invoking the Nsmf_PDUSession_ReleaseSMContext service operation.

If new AMF received in the UE context transfer in stage 5 the information about the AM Policy Association and the UE Policy Association and decides, based on local policies, not to use the PCF(s) identified by the PCF ID(s) for the AM Policy Association and the UE Policy Association, then it will inform the old AMF that the AM Policy Association and the UE Policy Association in the UE context is not used any longer and then the PCF selection is performed in stage 15.

If the new AMF received in the UE context transfer in stage 5 the information about UE related analytics subscription(s), the new AMF may take over the analytics subscription(s) from the old AMF. Otherwise, if the new AMF instead determines to create new analytics subscription(s), it informs the old AMF about the analytics subscriptions (identified by their Subscription Correlation ID) that are not needed any longer and the old AMF may now unsubscribe those NWDAF analytics subscriptions for the UE according to 3GPP TS 23.288.

STAGE 11: [Conditional] new AMF to UE: Identity Request/Response (PEI).

If the PEI was not provided by the UE nor retrieved from the old AMF the Identity Request procedure is initiated by AMF sending an Identity Request message to the UE to retrieve the PEI. The PEI may be transferred encrypted unless the UE performs Emergency Registration and cannot be authenticated.

For an Emergency Registration, the UE may have included the PEI in the Registration Request. If so, the PEI retrieval is skipped.

If the UE supports RACS as indicated in UE MM Core Network Capability, the AMF may use the PEI of the UE to obtain the IMEI/TAC for the purpose of RACS operation.

STAGE 12: Optionally the new AMF initiates ME identity check by invoking the N5g-eir_EquipmentIdentityCheck_Get service operation (see clause 5.2.4.2.2 of 3GPP TS 23.502).

The PEI check is performed as described in clause 4.7 of 3GPP TS 23.502.

For an Emergency Registration, if the PEI is blocked, operator policies determine whether the Emergency Registration procedure continues or is stopped.

STAGE 13: If stage 14 is to be performed, the new AMF, based on the SUPI, selects a UDM, then UDM may select a UDR instance. See clause 6.3.9 of 3GPP TS 23.501.

The AMF selects a UDM as described in clause 6.3.8 of 3GPP TS 23.501.

STAGE 14a-c: If the AMF has changed since the last Registration procedure, if UE Registration type is Initial Registration or Emergency Registration, or if the UE provides a SUPI which does not refer to a valid context in the AMF, or if the UE registers to the same AMF it has already registered to a non-3GPP access (i.e. the UE is registered over a non-3GPP access and initiates this Registration procedure to add a 3GPP access), the new AMF registers with the UDM using Nudm_UECM_Registration for the access to be registered (and subscribes to be notified when the UDM deregisters this AMF). The UDM based on the "Registration Type" in the Nudm_UECM_Registration request, can act on SoR information according to 3GPP TS 23.122. In this case, if the AMF does not have event exposure subscription information for this UE, the AMF indicates it to UDM. Then, if the UDM has existing applicable event exposure subscriptions for events detected in AMF for this UE or for any of the groups this UE belongs to (possibly retrieved from UDR), UDM invokes the Namf_EventExposure_Subscribe service for recreating the event exposure subscriptions.

The AMF provides the "Homogenous Support of IMS Voice over PS Sessions" indication (see clause 5.16.3.3 of 3GPP TS 23.501) to the UDM. The "Homogenous Support of IMS Voice over PS Sessions" indication may not be included unless the AMF has completed its evaluation of the support of "IMS Voice over PS Session" as specified in clause 5.16.3.2 of 3GPP TS 23.501.

During initial Registration, if the AMF and UE supports SRVCC from NG-RAN to UTRAN the AMF provides UDM with the UE SRVCC capability.

If the AMF determines that only the UE SRVCC capability has changed, the AMF sends UE SRVCC capability to the UDM.

NOTE 9: At this stage, it is possible that the AMF does not have all the information needed to determine the setting of the IMS Voice over PS Session Supported indication for this UE (see clause 5.16.3.2 of 3GPP TS 23.501). Hence the AMF can send the "Homogenous Support of IMS Voice over PS Sessions" later on in this procedure.

After AMF has successfully completed the Nudm_UECM_Registration operation and if the AMF does not have subscription data for the UE, the AMF retrieves the Access and Mobility Subscription data, SMF Selection Subscription data, UE context in SMF data and LCS mobile origination using Nudm_SDM_Get. If the AMF already has subscription data for the UE but the SoR Update Indicator in the UE context requires the AMF to retrieve SoR information depending on the NAS Registration Type ("Initial Registration" or "Emergency Registration") (see Annex C of 3GPP TS 23.122), the AMF retrieves the Steering of Roaming information using Nudm_SDM_Get. This requires that UDM may retrieve this information from UDR by Nudr_DM_Query. After a successful response is received, the AMF subscribes to be notified using Nudm_SDM_Subscribe when the data requested is modified, UDM may subscribe to UDR by Nudr_DM_Subscribe. The GPSI is provided to the AMF in the Access and Mobility Subscription data from the UDM if the GPSI is available in the UE subscription data. The UDM may provide indication that the subscription data for network slicing is updated for the UE. If the UE is subscribed to MPS in the serving PLMN, "MPS priority" is included in the Access and Mobility Subscription data provided to the AMF. If the UE is subscribed to MCX in the serving PLMN, "MCX priority" is included in the Access and Mobility Subscription data provided to the AMF. The UDM also provides the IAB-Operation allowed indication to AMF as part of the Access and Mobility Subscription data. The AMF may trigger the setup of the UE context in NG-RAN, or modification of the UE context in NG-RAN if the initial setup is at stage 9c, including an indication that the IAB-node is authorized. If the Registration Request sent at stage 1 is for NR satellite access and includes a request for authorization for obtaining satellite coverage availability information, the AMF retrieves subscription data for satellite coverage availability information from the UDM for the UE in the UE's HPLMN using Nudm_SDM_Get service operation at stage 14b.

For a Disaster Roaming Registration, the AMF may provide the indication of Disaster Roaming service to the UDM. The UDM provides the subscription data for a Disaster Roaming service to the AMF based on the local policy and/or the local configuration as specified in clause 5.40.4 of 3GPP TS 23.501.

The AMF provides MINT support indication via Nudm_UECM_Registration towards UDM, if UE includes the MINT support indication in the 5GMM capability as specified in clause 5.40.2 of 3GPP TS 23.501 or if the MINT support indication in the 5GMM capability is changed.

If the AMF receives a priority indication (e.g. MPS, MCX) as part of the Access and Mobility Subscription data, but the UE did not provide an Establishment cause associated with priority services, the AMF may include a Message Priority header to indicate priority information for all subsequent messages. Other NFs relay the priority information by including the Message Priority header in service-based interfaces, as specified in 3GPP TS 29.500.

The new AMF provides the Access Type it serves for the UE to the UDM and the Access Type is set to "3GPP access". The UDM stores the associated Access Type together with the serving AMF and does not remove the AMF identity associated to the other Access Type if any. The UDM may store in UDR information provided at the AMF registration by Nudr_DM_Update.

If the UE was registered in the old AMF for an access and the old and the new AMFs are in the same PLMN, the new AMF sends a separate/independent Nudm_UECM_Registration to update UDM with Access Type set to access used in the old AMF, after the old AMF relocation is successfully completed.

The new AMF creates an UE context for the UE after getting the Access and Mobility Subscription data from the UDM. The Access and Mobility Subscription data includes whether the UE is allowed to include NSSAI in the 3GPP access RRC Connection Establishment in clear text. The Access and Mobility Subscription data may include Enhanced Coverage Restricted information. If received from the UDM and the UE included support for restriction of use of Enhanced Coverage in stage 1, the AMF determines whether Enhanced Coverage is restricted or not for the UE as specified in clause 5.31.12 of 3GPP TS 23.501 and stores the updated Enhanced Coverage Restricted information in the UE context.

The Access and Mobility Subscription data may include the NB-IoT UE Priority.

The subscription data may contain Service Gap Time parameter. If received from the UDM, the AMF stores this Service Gap Time in the UE Context in AMF for the UE.

For an Emergency Registration in which the UE was not successfully authenticated, the AMF may not register with the UDM.

The AMF enforces the Mobility Restrictions as specified in clause 5.3.4.1.1 of 3GPP TS 23.501. For an Emergency Registration, the AMF may not check for Mobility Restrictions, access restrictions, regional restrictions or subscription restrictions. For an Emergency Registration, the AMF may ignore any unsuccessful registration response from UDM and continue with the Registration procedure.

NOTE 10: The AMF can, instead of the Nudm_SDM_Get service operation, use the Nudm_SDM_Subscribe service operation with an Immediate Report Indication that triggers the UDM to immediately return the subscribed data if the corresponding feature is supported by both the AMF and the UDM.

STAGE 14d: When the UDM stores the associated Access Type (e.g. 3GPP) together with the serving AMF as indicated in stage 14a, it will cause the UDM to initiate a Nudm_UECM_DeregistrationNotification (see clause 5.2.3.2.2 of 3GPP TS 23.502) to the old AMF corresponding to the same (e.g. 3GPP) access, if one exists. If the timer started in stage 5 is not running, the old AMF may remove the UE context for the same Access Type. Otherwise, the AMF may remove UE context for the same Access Type when the timer expires. If the serving NF removal reason indicated by the UDM is Initial Registration, then, as described in clause 4.2.2.3.2 of 3GPP TS 23.502, the old AMF invokes the Nsmf_PDUSession_ReleaseSMContext (SM Context ID) service operation towards all the associated SMF(s) of the UE to notify that the UE is deregistered from old AMF for the same Access Type. The SMF(s) may release the PDU Session on getting this notification.

If the old AMF has established an AM Policy Association and a UE Policy Association with the PCF(s) and the old AMF did not transfer the PCF ID(s) to the new AMF (e.g. new AMF is in different PLMN), the old AMF performs an AMF-initiated Policy Association Termination procedure, as defined in clause 4.16.3.2 of 3GPP TS 23.502 and performs an AMF-initiated UE Policy Association Termination procedure, as defined in clause 4.16.13.1 of 3GPP TS 23.502. In addition, if the old AMF transferred the PCF ID(s) in the UE context but the new AMF informed in stage 10 that the AM Policy Association information and UE Policy Association information in the UE context will not be used then the old AMF performs an AMF-initiated Policy Association Termination procedure, as defined in clause 4.16.3.2 of 3GPP TS 23.502 and performs an AMF-initiated UE Policy Association Termination procedure, as defined in clause 4.16.13.1 of 3GPP TS 23.502.

If the old AMF has an N2 connection for that UE (e.g. because the UE was in RRC Inactive state but has now moved to E-UTRAN or moved to an area not served by the old AMF), the old AMF may perform AN Release (see clause 4.2.6 of 3GPP TS 23.502) with a cause value that indicates that the UE has already locally released the NG-RAN's RRC Connection.

If the UE context in the old AMF contains an Allowed NSSAI including one or more S-NSSAI(s) subject to NSAC, the old AMF upon receipt of the Nudm_UECM_DeregistrationNotification from the UDM, sends an update request message for each S-NSSAI subject to NSAC to the corresponding NSACF(s) with update flag parameter set to decrease (see clause 4.2.11.2 of 3GPP TS 23.502).

At the end of registration procedure, the AMF may initiate synchronization of event exposure subscriptions with the UDM if the AMF does not indicate unavailability of event exposure subscription in stage 14a.

NOTE 11: The AMF can initiate synchronization with UDM even if events are available in the UE context (e.g. as received from old AMF) at any given time and based on local policy. This can be done during subscription change related event.

STAGE 14e: [Conditional] If old AMF does not have UE context for another access type (i.e. non-3GPP access), the Old AMF unsubscribes with the UDM for subscription data using Nudm_SDM_unsubscribe.

STAGE 15: If the AMF decides to initiate PCF communication, the AMF acts as follows.

If the new AMF decides to use the (V-)PCF identified by the (V-)PCF ID included in UE context from the old AMF in stage 5, the AMF contacts the (V-)PCF identified by the (V-)PCF ID to obtain policy. If the AMF decides to perform PCF discovery and selection and the AMF selects a (V)-PCF and may select an H-PCF (for roaming scenario) as described in clause 6.3.7.1 of 3GPP TS 23.501 and according to the V-NRF to H-NRF interaction described in clause 4.3.2.2.3.3 of 3GPP TS 23.502.

STAGE 16: [Optional] new AMF performs an AM Policy Association Establishment/Modification. For an Emergency Registration, this stage is skipped.

If the new AMF selects a new (V-)PCF in stage 15, the new AMF performs AM Policy Association Establishment with the selected (V-)PCF as defined in clause 4.16.1.2 of 3GPP TS 23.502.

If the (V-)PCF identified by the (V-)PCF ID included in UE context from the old AMF is used, the new AMF performs AM Policy Association Modification with the (V-)PCF as defined in clause 4.16.2.1.2 of 3GPP TS 23.502.

If the AMF notifies the Mobility Restrictions (e.g. UE location) to the PCF for adjustment, or if the PCF updates the Mobility Restrictions itself due to some conditions (e.g. application in use, time and date), the PCF may provide the updated Mobility Restrictions to the AMF. If the subscription information includes Tracing Requirements, the AMF provides the PCF with Tracing Requirements.

If the AMF supports DNN replacement, the AMF provides the PCF with the Allowed NSSAI and, if available, the Mapping Of Allowed NSSAI.

If the PCF supports DNN replacement, the PCF provides the AMF with triggers for DNN replacement.

STAGE 17: [Conditional] AMF to SMF: Nsmf_PDUSession_UpdateSMContext( ).

For an Emergency Registered UE (see 3GPP TS 23.501), this stage is applied when the Registration Type is Mobility Registration Update.

The AMF invokes the Nsmf_PDUSession_UpdateSMContext (see clause 5.2.8.2.6 of 3GPP TS 23.502) in the following scenario(s):

If the List Of PDU Sessions To Be Activated is included in the Registration Request in stage 1, the AMF sends Nsmf_PDUSession_UpdateSMContext Request to SMF(s) associated with the PDU Session(s) in order to activate User Plane connections of these PDU Session(s). Stages from stage 5 onwards described in clause 4.2.3.2 of 3GPP TS 23.502 are executed to complete the User Plane connection activation without sending the RRC Inactive Assistance Information and without sending MM NAS Service Accept from the AMF to (R)AN described in stage 12 of clause 4.2.3.2 of 3GPP TS 23.502. When a User Plane connection for a PDU Session is activated, the AS layer in the UE indicates it to the NAS layer.

If the AMF has determined in stage 3 that the UE is performing Inter-RAT mobility to or from NB-IoT, the AMF sends Nsmf_PDUSession_UpdateSMContext Request to SMF(s) associated with the UEs PDU Session(s), so the SMF(s) can update them according to the "PDU Session continuity at inter RAT mobility" subscription data. Stages from stage 5 onwards described in clause 4.2.3.2 are executed without sending MM NAS Service Accept from the AMF to (R)AN described in stage 12 of clause 4.2.3.2 of 3GPP TS 23.502.

When the serving AMF has changed, the new serving AMF notifies the SMF for each PDU Session that it has taken over the responsibility of the signaling path towards the UE: the new serving AMF invokes the Nsmf_PDUSession_UpdateSMContext service operation using SMF information received from the old AMF at stage 5. It also indicates whether the PDU Session is to be re-activated.

NOTE 12: If the UE moves into a different PLMN, the AMF in the serving PLMN can insert or change the V-SMF(s) in the serving PLMN for Home Routed PDU session(s). In addition, a V-SMF is removed in case the UE moves from a VPLMN into the HPLMN. In these cases, the same procedures described in clause 4.23.3 of 3GPP TS 23.502 are applied for the V-SMF change as for the I-SMF change (i.e. by replacing the I-SMF with V-SMF). During inter-PLMN change, if the same SMF is used, session continuity can be supported depending on operator policies.

Stages from stage 5 onwards described in clause 4.2.3.2 of 3GPP TS 23.502 are executed. In the case that the intermediate UPF insertion, removal, or change is performed for the PDU Session(s) not included in "PDU Session(s) to be re-activated", the procedure is performed without N11 and N2 interactions to update the N3 user plane between (R)AN and 5GC.

The AMF invokes the Nsmf_PDUSession_ReleaseSM-Context service operation towards the SMF in the following scenario:

If any PDU Session status indicates that it is released at the UE, the AMF invokes the Nsmf_PDUSession_Releas-eSMContext service operation towards the SMF in order to release any network resources related to the PDU Session.

If the serving AMF is changed, the new AMF may wait until stage 18 is finished with all the SMFs associated with the UE. Otherwise, stages 19 to 22 can continue in parallel to this stage.

STAGE 18: [Conditional] If the new AMF and the old AMF are in the same PLMN, the new AMF sends a UE Context Modification Request to N3IWF/TNGF/W-AGF as specified in 3GPP TS 29.413.

If the AMF has changed and the old AMF has indicated that the UE is in CM-CONNECTED state via N3IWF, W-AGF or TNGF and if the new AMF and the old AMF are in the same PLMN, the new AMF creates an NGAP UE association towards the N3IWF/TNGF/W-AGF to which the UE is connected. This automatically releases the existing NGAP UE association between the old AMF and the N3IWF/TNGF/W-AGF.

STAGE 19: N3IWF/TNGF/W-AGF sends a UE Context Modification Response to the new AMF.

STAGE 19a: [Conditional] After the new AMF receives the response message from the N3IWF, W-AGF or TNGF in stage 19, the new AMF registers with the UDM using Nudm_UECM_Registration as stage 14a, but with the Access Type set to "non-3GPP access". The UDM stores the associated Access Type together with the serving AMF and does not remove the AMF identity associated to the other Access Type if any. The UDM may store in UDR information provided at the AMF registration by Nudr_DM_Update.

STAGE 19b: [Conditional] When the UDM stores the associated Access Type (i.e. non-3GPP) together with the serving AMF as indicated in stage 19a, it will cause the UDM to initiate a Nudm_UECM_DeregistrationNotification (see clause 5.2.3.2.2 of 3GPP TS 23.502) to the old AMF corresponding to the same (i.e. non-3GPP) access. The old AMF removes the UE context for non-3GPP access.

STAGE 19c: The Old AMF unsubscribes with the UDM for subscription data using Nudm_SDM_unsubscribe.

STAGE 20a (not shown in FIG. 16): Void.

STAGE 21: The AMF returns a NAS Registration Accept to the UE (e.g. as at 825 in FIG. 8A). The details of this are: New AMF to UE: Registration Accept (5G-GUTI, Registration Area, [Mobility restrictions], [PDU Session status], [Allowed NSSAI], [Mapping Of Allowed NSSAI], [Configured NSSAI for the Serving PLMN], [Mapping Of Configured NSSAI], [NSSRG Information], [NSAG Information], [rejected S-NSSAIs], [Pending NSSAI], [Mapping Of Pending NSSAI], [Periodic Registration Update timer], [Active Time], [Strictly Periodic Registration Timer Indication], [LADN Information], [accepted MICO mode], [IMS Voice over PS session supported Indication], [Emergency Service Support indicator], [Accepted DRX parameters for E-UTRA and NR], [Accepted DRX parameters for NB-IoT], [extended idle mode DRX parameters], [Paging Time Window], [Network support of Interworking without N26], [Access Stratum Connection Establishment NSSAI Inclusion Mode], [Network Slicing Subscription Change Indication], [Operator-defined access category definitions], [List of equivalent PLMNs], [Enhanced Coverage Restricted information], [Supported Network Behavior], [Service Gap Time], [PLMN-assigned UE Radio Capability ID], [PLMN-assigned UE Radio Capability ID deletion], [WUS Assistance Information], [AMF PEIPS Assistance Information], [Truncated 5G-S-TMSI Configuration], [Connection Release Supported], [Paging Cause Indication for Voice Service Supported], [Paging Restriction Supported], [Reject Paging Request Supported], [Paging Restriction Information acceptance/rejection], ["List of PLMN(s) to be used in Disaster Condition"], [Disaster Roaming wait range information], [Disaster Return wait range information], [Forbidden TAI (s)], [List of equivalent SNPNs], [Registered NID], [Unavailability Period Supported], [Authorization for obtaining satellite coverage availability information]). The Authorization for obtaining satellite coverage availability information included in the NAS Registration Accept may correspond to the authorization data described for 820 and 825 in FIG. 8A.

If the Requested NSSAI does not include S-NSSAIs which map to S-NSSAIs of the HPLMN subject to Network Slice-Specific Authentication and Authorization and the AMF determines that no S-NSSAI can be provided in the Allowed NSSAI for the UE in the current UE's Tracking Area and if no default S-NSSAI(s) not yet involved in the current UE Registration procedure could be further considered, the AMF may reject the UE Registration and may include in the rejection message the list of Rejected S-NSSAIs, each of them with the appropriate rejection cause value.

The Allowed NSSAI for the Access Type for the UE is included in the N2 message carrying the Registration Accept message. The Allowed NSSAI contains only S-NSSAIs that do not require, based on subscription information, Network Slice-Specific Authentication and Authorization and, based on the UE Context in the AMF, those S-NSSAIs for which Network Slice-Specific Authentication and Authorization previously succeeded, regardless of the Access Type. The Mapping Of Pending NSSAI is the mapping of each S-NSSAI of the Pending NSSAI for the Serving PLMN to the HPLMN S-NSSAIs.

If the UE has indicated its support of the Network Slice-Specific Authentication and Authorization procedure in the UE MM Core Network Capability in the Registration Request, AMF includes in the Pending NSSAI the S-NSSAIs that map to an S-NSSAI of the HPLMN which in the subscription information has indication that it is subject to Network Slice-Specific Authentication and Authorization, as described in clause 4.6.2.4 of 3GPP TS 24.501. In such case, the AMF then may trigger at stage 25 the Network Slice-Specific Authentication and Authorization procedure, specified in clause 4.2.9.2 of 3GPP TS 23.502, except, based on Network policies, for those S-NSSAIs for which Network Slice-Specific Authentication and Authorization have already been initiated on another Access Type for the same S-NSSAI(s). The UE may not attempt re-registration with the S-NSSAIs included in the list of Pending NSSAIs until the Network Slice-Specific Authentication and Authorization procedure has been completed, regardless of the Access Type.

If the UE has not indicated its support of the Network Slice-Specific Authentication and Authorization procedure in the UE 5GMM Core Network Capability in the Registration Request and the Requested NSSAI includes S-NSSAIs which map to HPLMN S-NSSAIs subject to Network Slice-Specific Authentication and Authorization, the AMF may include those S-NSSAIs in the Requested NSSAI in the Rejected S-NSSAIs.

If no S-NSSAI can be provided in the Allowed NSSAI because:

all the S-NSSAI(s) in the Requested NSSAI are to be subject to Network Slice-Specific Authentication and Authorization; or no Requested NSSAI was provided or none of the S-NSSAIs in the Requested NSSAI matches any of the Subscribed S-NSSAIs and all the S-NSSAI(s) marked as default in the Subscribed S-NSSAIs are to be subject to Network Slice-Specific Authentication and Authorization.

The AMF may provide an empty Allowed NSSAI. Upon receiving an empty Allowed NSSAI and a Pending NSSAI, the UE is registered in the PLMN but may wait for the completion of the Network Slice-Specific Authentication and Authorization procedure without attempting to use any service provided by the PLMN on any access, except e.g. emergency services (see 3GPP TS 24.501), until the UE receives an Allowed NSSAI.

The AMF stores the NB-IoT Priority retrieved in Stage 14 and associates it to the 5G-S-TMSI allocated to the UE.

If the Registration Request message received over 3GPP access does not include any Paging Restriction Information, the AMF may delete any stored Paging Restriction Information for this UE and stop restricting paging accordingly.

If the Registration Request message received over 3GPP access includes the Paging Restriction Information, AMF may accept or reject the Paging Restriction Information requested by the UE based on operator policy. If the AMF rejects the Paging Restriction Information, the AMF removes any stored Paging Restriction Information from the UE context and discards the UE requested Paging Restriction Information. If the AMF accepts the Paging Restriction Information from the UE, the AMF stores the Paging Restriction Information from the UE in the UE context and informs the UE about the acceptance/rejection of the requested Paging Restriction Information in the Registration Accept message.

If the Registration Request message received over 3GPP access includes a Release Request indication, then:

the AMF updates the UE context with any received Paging Restriction Information, then enforces it in the network triggered Service Request procedure as described in clause 4.2.3.3 of 3GPP TS 23.502;

the AMF does not establish User Plane resources and triggers the AN release procedure as described in clause 4.2.6 of 3GPP TS 23.502 after the completion of Registration procedure.

The AMF sends a Registration Accept message to the UE indicating that the Registration Request has been accepted. 5G-GUTI is included if the AMF allocates a new 5G-GUTI. Upon receiving a Registration Request message of type "Initial Registration", "mobility registration update", "Disaster Roaming Initial Registration" or "Disaster Roaming Mobility Registration Update" from the UE, the AMF may include a new 5G-GUTI in the Registration Accept message. Upon receiving a Registration Request message of type "periodic registration update" from the UE, the AMF should include a new 5G-GUTI in the Registration Accept message. If the UE is already in RM-REGISTERED state via another access in the same PLMN, the UE may use the 5G-GUTI received in the Registration Accept for both registrations. If no 5G-GUTI is included in the Registration Accept, then the UE uses the 5G-GUTI assigned for the existing registration also for the new registration. If the AMF allocates a new Registration area, it may send the Registration area to the UE via Registration Accept message. For a Disaster Roaming Registration, the AMF allocates the Registration Area limited to the area with Disaster Condition as specified in clause 5.40 of 3GPP TS 23.501. If there is no Registration area included in the Registration Accept message, the UE may consider the old Registration Area as valid. Mobility Restrictions is included if mobility restrictions apply for the UE and Registration Type is not Emergency Registration. The AMF indicates the established PDU Sessions to the UE in the PDU Session status. The UE removes locally any internal resources related to PDU Sessions that are not marked as established in the received PDU Session status. If the AMF invokes the Nsmf_PDUSession_UpdateSMContext procedure for UP activation of PDU Session(s) in stage 18 and receives rejection from the SMF, then the AMF indicates to the UE the PDU Session ID and the cause why the User Plane resources were not activated. When the UE is connected to the two AMFs belonging to different PLMN via 3GPP access and non-3GPP access then the UE removes locally any internal resources related to the PDU Session of the current PLMN that are not marked as established in received PDU Session status. If the PDU Session status information was in the Registration Request, the AMF may indicate the PDU Session status to the UE.

If the RAT Type is NB-IoT and the network is configured to use the Control Plane Relocation Indication procedure then the AMF may include in the Registration Accept message the Truncated 5G-S-TMSI Configuration that the UE using Control Plane CIoT 5GS Optimization uses to create the Truncated 5G-S-TMSI, see clause 5.31.4.3 of 3GPP TS 23.501.

The Allowed NSSAI provided in the Registration Accept is valid in the Registration Area and it applies for all the PLMNs which have their Tracking Areas included in the Registration Area. The Mapping Of Allowed NSSAI is the mapping of each S-NSSAI of the Allowed NSSAI to the HPLMN S-NSSAIs. The Mapping Of Configured NSSAI is the mapping of each S-NSSAI of the Configured NSSAI for the Serving PLMN to the HPLMN S-NSSAIs.

If the UE has indicated its support of the subscription-based restrictions to simultaneous registration of network slices feature in the UE 5GMM Core Network Capability, the AMF includes, if available, the NSSRG Information, defined in clause 5.15.12 of 3GPP TS 23.501.

If the UE has not indicated its support of the subscription-based restrictions to simultaneous registration of network slices feature and the subscription information for the UE includes NSSRG information and the AMF is providing the Configured NSSAI to the UE, the Configured NSSAI may include the S-NSSAIs according to clause 5.15.12 of 3GPP TS 23.501.

If the UE has indicated its support of the NSAG feature in the 5GMM Core Network Capability, the AMF includes, if available, the NSAG Information, defined in clause 5.15.14 of 3GPP TS 23.501.

The AMF may include in the Registration Accept message the LADN Information for the list of LADNs, described in clause 5.6.5 of 3GPP TS 23.501, that are available within the Registration area determined by the AMF for the UE. The AMF may include Operator-defined access category definitions to let the UE determine the applicable Operator-specific access category definitions as described in 3GPP TS 24.501.

If the UE included MICO mode in the Registration Request, then AMF responds in the Registration Accept message whether MICO mode should be used. When MICO mode is allowed for the UE, the AMF may include an Active Time value and/or Strictly Periodic Registration Timer Indication in the Registration Accept message. The AMF determines the Periodic Registration Update timer value, Active Time value and the Strictly Periodic Registration Timer Indication based on local configuration, Expected UE Behavior if available, UE indicated preferences, UE capability, UE subscription information and network policies, or any combination of them so as to enable UE power saving, as described in clause 5.31.7 of 3GPP TS 23.501. The AMF determines to apply the Strictly Periodic Registration Timer Indication to the UE if the UE indicates its capability of the Strictly Periodic Registration Timer Indication in the registration request message, as described in stage 1. If the AMF provides the Periodic Registration Update timer value with the Strictly Periodic Registration Timer Indication to the UE, the UE and the AMF start the Periodic Registration Update timer after this stage, as described in clause 5.31.7.5 of 3GPP TS 23.501.

In the case of registration over 3GPP access, the AMF Sets the IMS Voice over PS session supported Indication as described in clause 5.16.3.2 of 3GPP TS 23.501. In order to set the IMS Voice over PS session supported Indication the AMF may need to perform the UE Capability Match Request procedure in clause 4.2.8a to check the compatibility of the UE and NG-RAN radio capabilities related to IMS Voice over PS. If the AMF hasn't received Voice Support Match Indicator from the NG-RAN on time then, based on implementation, AMF may set IMS Voice over PS session supported Indication and update it at a later stage.

In the case of registration over 3GPP access and the AMF has retrieved or determined according to local configuration a Target NSSAI and a corresponding RFSP Index for the purpose of allowing the NG-RAN to redirect the UE to a cell supporting network slices not available in the current TA as described in clause 5.3.4.3.3 of 3GPP TS 23.501, the AMF provides the Target NSSAI and the corresponding RFSP Index to the NG-RAN.

In the case of registration over non-3GPP access, the AMF Sets the IMS Voice over PS session supported Indication as described in clause 5.16.3.2a of 3GPP TS 23.501.

The Emergency Service Support indicator informs the UE that emergency services are supported, i.e. the UE is allowed to request PDU Session for emergency services. If the AMF received "MPS priority" from the UDM as part of Access and Mobility Subscription data, based on operator policy, "MPS priority" is included in the Registration Accept message to the UE to inform the UE whether configuration of Access Identity 1 is valid within the selected PLMN, as specified in 3GPP TS 24.501. If the AMF received "MCX priority" from the UDM as part of Access and Mobility Subscription data, based on operator policy and UE subscription to MCX Services, "MCX priority" is included in the Registration Accept message to the UE to inform the UE whether configuration of Access Identity 2 is valid within the selected PLMN, as specified in 3GPP TS 24.501. The Accepted DRX parameters are defined in clause 5.4.5 of 3GPP TS 23.501. The AMF includes Accepted DRX parameters for NB-IoT, if the UE included Requested DRX parameters for NB-IoT in the Registration Request message. The AMF Sets the Network support of Interworking without N26 parameter as described in clause 5.17.2.3.1 of 3GPP TS 23.501. If the AMF accepts the use of extended idle mode DRX, the AMF includes the extended idle mode DRX parameters and Paging Time Window as described in 5.31.7.2 of 3GPP TS 23.501.

If the UDM intends to indicate the UE that subscription has changed, the Network Slicing Subscription Change Indication is included. If the AMF includes Network Slicing Subscription Change Indication, then the UE may locally erase all the network slicing configuration for all PLMNs and, if applicable, update the configuration for the current PLMN based on any received information.

The Access Stratum Connection Establishment NSSAI Inclusion Mode, as specified in clause 5.15.9 of 3GPP TS 23.501, is included to instruct the UE on what NSSAI, if any, to include in the Access Stratum connection establishment. The AMF can set the value to modes of operation a,b,c defined in clause 5.15.9 of 3GPP TS 23.501 in the 3GPP Access only if the Inclusion of NSSAI in RRC Connection Establishment Allowed indicates that it is allowed to do so.

For a UE registered in a PLMN, the AMF may provide a List of equivalent PLMNs which is handled as specified in 3GPP TS 24.501. The AMF may not provide a list of equivalent SNPNs to the UE.

For a UE registered in an SNPN and the UE has included support of equivalent SNPNs in stage 1, the AMF may provide a List of equivalent SNPNs which is handled as specified in 3GPP TS 24.501. The AMF may not provide a list of equivalent PLMNs to the UE.

If the UE included support for restriction of use of Enhanced Coverage in stage 1, the AMF sends the Enhanced Coverage Restricted information to the NG-RAN in N2 message. The AMF also sends Enhanced Coverage Restricted information to the UE in the Registration Accept message.

If the UE receives Enhanced Coverage Restricted information in the Registration Accept message, the UE may store this information and may use the value of Enhanced Coverage Restricted information to determine if Enhanced Coverage feature should be used or not.

If the UE and the AMF have negotiated to enable MICO mode and the AMF uses the Extended connected timer, then the AMF provides the Extended Connected time value to NG-RAN (see clause 5.31.7.3 of 3GPP TS 23.501) in this stage. The Extended Connected Time value indicates the minimum time the RAN should keep the UE in RRC-CONNECTED state regardless of inactivity.

The AMF indicates the CIoT 5GS Optimizations it supports and accepts in the Supported Network Behavior information (see clause 5.31.2 of 3GPP TS 23.501) if the UE included Preferred Network Behavior in its Registration Request.

The AMF may steer the UE from 5GC by rejecting the Registration Request. The AMF should take into account the Preferred and Supported Network Behavior (see clause 5.31.2 of 3GPP TS 23.501) and availability of EPC to the UE before steering the UE from 5GC.

If the AMF accepts MICO mode and knows there may be mobile terminated data or signaling pending, the AMF maintains the N2 connection for at least the Extended Connected Time as described in clause 5.31.7.3 of 3GPP TS 23.501 and provides the Extended Connected Time value to the RAN.

The AMF includes Service Gap Time if Service Gap Time is present in the subscription information (stages 14a-c) or the Service Gap Time has been updated by the Subscriber Data Update Notification to AMF procedure (see clause 4.5.1 of 3GPP TS 23.502) and the UE has indicated UE Service Gap Control Capability.

If the UE receives a Service Gap Time in the Registration Accept message, the UE may store this parameter and apply Service Gap Control (see clause 5.31.16 of 3GPP TS 23.501).

If the network supports WUS grouping (see 3GPP TS 23.501), the AMF may send the WUS Assistance Information to the UE. If the UE provided the UE paging probability information in Stage 1, the AMF takes it into account to determine the WUS Assistance Information.

If the UE provided Paging Subgrouping Support Indication in stage 1, a supporting AMF may provide the AMF PEIPS Assistance Information, including the Paging Subgroup ID as defined in 3GPP TS 23.501.

When the UE and the AMF supports RACS as defined in clause 5.4.4.1a of 3GPP TS 23.501 and the AMF needs to configure the UE with a UE Radio Capability ID and the AMF already has the UE radio capabilities other than NB-IoT radio capabilities for the UE, the AMF may provide the UE with the UE Radio Capability ID for the UE radio capabilities the UCMF returns to the AMF in a Nucmf_assign service operation for this UE. Alternatively, when the UE and the AMF support RACS, the AMF may provide the UE with an indication to delete any PLMN-assigned UE Radio Capability ID in this PLMN (see clause 5.4.4.1a of 3GPP TS 23.501).

If the UE is "CAG supported" and the AMF needs to update the CAG information of the UE, the AMF may include the CAG information as part of the Mobility Restrictions in the Registration Accept message.

If the UE has indicated the support of Unavailability Period, the AMF may indicate to the UE whether the corresponding feature is supported by providing the Unavailability Period Supported indication.

If the UE has provided Unavailability Period Duration in stage 1, the AMF may store the received Unavailability Period Duration and consider the UE as unreachable until the UE enters CM-CONNECTED state. The AMF may provide Periodic Registration Update timer based on Unavailability Period Duration indicated by the UE as described in clause 5.4.1.4 of 3GPP TS 23.501.

If the Multi-USIM UE has indicated support for one or more Multi-USIM Specific Capabilities in the UE 5GMM Core Network Capability in stage 1, the AMF may indicate to the Multi-USIM UE whether the corresponding one or more Multi-USIM specific features described in clause 5.38 of 3GPP TS 23.501 are supported, based on network capability and preference by the network (i.e. based on local network policy), by providing one or more of the Connection Release Supported, Paging Cause Indication for Voice Service Supported, Paging Restriction Supported and Reject Paging Request Supported indications. The AMF may only indicate Paging Restriction Supported together with either Connection Release Supported or Reject Paging Request Supported. The UE may only use Multi-USIM specific features that the AMF indicated as being supported.

If the UE and AMF supports Disaster Roaming service, the AMF may include the "list of PLMN(s) to be used in Disaster Condition", Disaster Roaming wait range information and Disaster Return wait range information as specified in 3GPP TS 23.501.

If AMF receives multiple TAIs from the NG-RAN in stage 3 and determines that some, but not all of them are forbidden by subscription or by operator policy, the AMF may include the forbidden TAI(s) in the Registration Accept message.

In the case of Emergency Registration, the AMF may not indicate support for any Multi-USIM specific features to the UE.

If the UE has included support of equivalent SNPNs in stage 1 and the serving SNPN changes, the AMF may include the Registered NID in the Registration Accept message as specified in 3GPP TS 23.501.

If the Registration is for NR satellite access, and if the UE included a Request for authorization for obtaining satellite coverage availability information in the NAS Registration Request at stage 1, and if the UDM has indicated that the UE is subscribed to authorization for obtaining satellite coverage availability information at stage 14b, the AMF may include an Authorization for obtaining satellite coverage availability information in the NAS Registration Accept sent at stage 21. The Authorization that is included may have been provided by the UDM to the AMF as stage 14b. Alternatively, the Authorization that is included may be determined by the AMF (e.g. as described for 820 in FIG. 8A). The Authorization may indicate an external server (e.g. may include a URI, IP address or FQDN for the external server), a user plane transport protocol (e.g. HTTP, HTTPS or SMS) and a temporary identifier for the UE that can be authenticated by the external server. The Authorization may also include the types of satellite coverage data which can be obtained and a time period during which the UE can obtain these from the external server. The Authorization may be as described for the Authorization Data in FIG. 8A.

STAGE 21b: [Optional] The new AMF performs a UE Policy Association Establishment as defined in clause 4.16.11 of 3GPP TS 23.502. For an Emergency Registration, this stage is skipped.

The new AMF sends a Npcf_UEPolicyControl Create Request to PCF. PCF sends a Npcf_UEPolicyControl Create Response to the new AMF.

PCF triggers UE Configuration Update Procedure as defined in clause 4.2.4.3 of 3GPP TS 23.502.

STAGE 22: [Conditional] UE to new AMF: Registration Complete 0.

The UE sends a Registration Complete message to the AMF when it has successfully updated itself after receiving any of the [Configured NSSAI for the Serving PLMN], [Mapping Of Configured NSSAI], [NSSRG Information], [NSAG Information] and a Network Slicing Subscription Change Indication, or CAG information in stage 21.

The UE sends a Registration Complete message to the AMF to acknowledge if a new 5G-GUTI was assigned.

If new 5G-GUTI was assigned, then the UE passes the new 5G-GUTI to its 3GPP access' lower layer when a lower layer (either 3GPP access or non-3GPP access) indicates to the UE's RM layer that the Registration Complete message has been successfully transferred across the radio interface.

NOTE 13: The above is needed because the NG-RAN may use the RRC Inactive state and a part of the 5G-GUTI is used to calculate the Paging Frame (see 3GPP TS 38.304 and 3GPP TS 36.304). It is assumed that the Registration Complete is reliably delivered to the AMF after the 5G-AN has acknowledged its receipt to the UE.

When the List Of PDU Sessions To Be Activated is not included in the Registration Request and the Registration procedure was not initiated in CM-CONNECTED state, the AMF releases the signaling connection with UE, according to clause 4.2.6 of 3GPP TS 23.502.

When the Follow-on request is included in the Registration Request, the AMF should not release the signaling connection after the completion of the Registration procedure.

If the AMF is aware that some signaling is pending in the AMF or between the UE and the 5GC, the AMF should not release the signaling connection immediately after the completion of the Registration procedure.

If the UE has provided Unavailability Period Duration in stage 1, the AMF may release the signaling connection immediately after the completion of the Registration procedure.

If PLMN-assigned UE Radio Capability ID is included in stage 21, the AMF stores the PLMN-assigned UE Radio Capability ID in UE context if receiving Registration Complete message.

If the UE receives PLMN-assigned UE Radio Capability ID deletion indication in stage 21, the UE may delete the PLMN-assigned UE Radio Capability ID(s) for this PLMN.

STAGE 23: [Conditional] AMF to UDM: If the Access and Mobility Subscription data provided by UDM to AMF in 14b includes Steering of Roaming information with an indication that the UDM requests an acknowledgement of the reception of this information from the UE, the AMF provides the UE acknowledgement to UDM using Nudm_SDM_Info. For more details regarding the handling of Steering of Roaming information refer to 3GPP TS 23.122.

STAGE 23a: For Registration over 3GPP Access, if the AMF does not release the signaling connection, the AMF sends the RRC Inactive Assistance Information to the NG-RAN.

For Registration over non-3GPP Access, if the UE is also in CM-CONNECTED state on 3GPP access, the AMF sends the RRC Inactive Assistance Information to the NG-RAN. If the Multi-USIM UE has indicated support for the Paging Cause Indication for Voice Service feature and the network supports the Paging Cause Indication for Voice Service, the AMF may include an indication in the RRC Inactive Assistance Information that the UE supports the Paging Cause Indication for Voice Service to NG-RAN to enable NG-RAN to apply the Paging Cause Indication for Voice Service feature for RAN based paging.

The AMF also uses the Nudm_SDM_Info service operation to provide an acknowledgment to UDM that the UE received CAG information, or the Network Slicing Subscription Change Indication (see stage 21 and stage 22) and acted upon it.

STAGE 24: [Conditional] AMF to UDM: After stage 14a and in parallel to any of the preceding stages, the AMF may send a "Homogeneous Support of IMS Voice over PS Sessions" indication to the UDM using Nudm_UECM_Update:

If the AMF has evaluated the support of IMS Voice over PS Sessions, see clause 5.16.3.2 of 3GPP TS 23.501, and If the AMF determines that it needs to update the Homogeneous Support of IMS Voice over PS Sessions, see clause 5.16.3.3 of 3GPP TS 23.501.

STAGE 25: [Conditional] If the UE indicates its support for Network Slice-Specific Authentication and Authorization procedure in the UE MM Core Network Capability in Registration Request and any S-NSSAI of the HPLMN is subject to Network Slice-Specific Authentication and Authorization, the related procedure is executed at this stage (see clause 4.2.9.1 of 3GPP TS 23.502). Once the Network Slice-Specific Authentication and Authorization procedure is completed for all S-NSSAIs, the AMF may trigger a UE Configuration Update procedure to deliver an Allowed NSSAI containing also the S-NSSAIs for which the Network Slice-Specific Authentication and Authorization was successful and include any rejected NSSAIs with an appropriate rejection cause value.

The AMF stores an indication in the UE context for any S-NSSAI of the HPLMN subject to Network Slice-Specific Authentication and Authorization for which the Network Slice-Specific Authentication and Authorization succeeds.

Once completed the Network Slice-Specific Authentication and Authorization procedure, if the AMF determines that no S-NSSAI can be provided in the Allowed NSSAI for the UE, which is already authenticated and authorized successfully by a PLMN and if no default S-NSSAI(s) could be further considered, the AMF may execute the Network-initiated Deregistration procedure described in clause 4.2.2.3.3 of 3GPP TS 23.502 and may include in the explicit De-Registration Request message the list of Rejected S-NSSAIs, each of them with the appropriate rejection cause value.

STAGE 26: (Not shown in FIG. 13) [Conditional] If the UE has requested authorization for obtaining satellite coverage availability information at stage 1 and if an Authorization for obtaining satellite coverage availability information was included in the NAS Registration Accept received at stage 21, the UE may obtain satellite coverage availability information from an external server indicated by the Authorization for obtaining satellite coverage availability information, e.g. as described for FIG. 8B.

If an Unavailability Period Duration is received from the UE and there is "Loss of Connectivity" monitoring event subscription for the UE, the AMF triggers "Loss of Connectivity" monitoring event report and includes the remaining values of the Unavailability Period Duration as described in clause 4.15 of 3GPP TS 23.502.

The mobility related event notifications towards the NF consumers are triggered at the end of this procedure for cases as described in clause 4.15.4 of 3GPP TS 23.502.

As noted previously, embodiments herein provide techniques in which a UE may indicate UE unavailability due to different types of events that can prevent the UE accessing a wireless network, such as discontinuous satellite coverage (which may be referred to as "satellite discontinuous coverage") or UE power savings combined with discontinuous satellite coverage. UE power savings combined with discontinuous satellite coverage refers to a period of power savings for a UE that includes one or more periods of (expected) no satellite coverage. The UE can then determine a preferred period of unavailability that starts at or before a first period of no satellite coverage and ends after this period and possibly after subsequent periods of no satellite coverage have ended and thus during a period of satellite coverage. The network (e.g., an AMF or MME) then may not need to know the details of the one or more periods of no satellite coverage and can just support a single overall period of UE unavailability. If the UE were to instead indicate unavailability for each separate period of no satellite coverage, the UE power savings could be much less (e.g. due to reporting each separate period of no satellite coverage) and the network (AMF or MME) might need to process a much larger number of separate unavailability reports and associated separate unavailability periods.

It can be noted that, although examples provided below and in the figures may describe the use of an AMF (e.g., in a 5G NR network) embodiments are not so limited. For example, embodiments additionally or alternatively may use an MME (e.g., in a 4G LTE network) instead of an AMF and/or a component having analogous functionality to an AMF or MME.

To support reporting of generalized unavailability periods, also referred to as just "unavailability periods", a UE (e.g. UE 115) may determine a period of impending unavailability based on one or more of: data on satellite coverage availability that indicates one or more upcoming coverage gaps, power savings requirements of the UE, a known or expected software (SW) upgrade to the UE or to a USIM in the UE, patching or reboot of the UE, some other event causing network unavailability or UE unavailability, or some combination of these. The UE may then indicate the period of unavailability to an AMF (e.g. AMF 122) in a Registration Update Request or to an MME in a TAU Request.

According to some embodiments, the UE may also indicate the events or events causing the unavailability. The indication of the event(s) may be useful, for example, for data analytics though may not necessarily affect support by an AMF or MME. The AMF or MME may then set the periodic registration or TAU timer for the UE to a value equal to or slightly larger than the unavailability period provided by the UE. During this unavailability period the AMF or MME may maintain the UE context in a CM-IDLE or ECM-IDLE state, and may consider the UE unreachable. According to some embodiments, functions for High latency Communication (HLCom) may be used by the AMF or MME to buffer incoming data for the UE or functions applicable to Mobile Initiated Connection Only (MICO) mode or Power Saving Mode (PSM) may be used by an AMF or MME, respectively (e.g. for very long periods of unavailability).

When the period of unavailability ends or if the UE becomes available before the unavailability is expected to end (e.g. if the UE obtains satellite access or access using a TN RAT before a satellite coverage gap is expected to end), the UE may trigger a Registration update or TAU and may not provide an indication of an unavailability period. The AMF or MME may then provide the UE with a normal periodic registration or TAU timer (e.g., one that does not reflect an unavailability period). If the UE is now using a different RAT, the context in the previous AMF or MME may be transferred.

If a UE becomes aware that the period of unavailability will change (e.g. where a start time, end time and/or duration may change) and if the unavailability period has not yet started, the UE may trigger a Registration update or TAU and provide details of the new unavailability period to an AMF or MME. The AMF or MME may then provide the UE with a modified periodic registration or TAU timer suitable to the changed unavailability period.

When the period of unavailability ends at the expected time and is due to an event common to many UEs (e.g. discontinuous satellite coverage), the UE, if requested by the MME or AMF, may delay sending of the registration update or TAU by a time delay (e.g. a randomized time delay) indicated by the MME or AMF. In some embodiments the time delay may be small (e.g. 1 minute or less in the case of discontinuous satellite coverage) and may avoid a large number of UEs sending a Registration update or TAU at the same time which might otherwise congest the network.

When unavailability is due to lack of satellite coverage, the procedure may be used for long periods of unavailability to reduce extra signaling. For a short period of no satellite coverage (e.g. 5 minutes or less), the UE may not need not notify the core network (CN) (e.g., AMF in a 5GCN) in order to reduce network load and signaling. The lack of coverage may then be treated by the CN the same as temporary loss of coverage for TN which may lead to some failed paging attempts but not to deregistration of a UE. A serving PLMN (e.g. a serving AMF or MME) may also indicate to a UE (e.g. in a Registration Accept message or an Attach Accept message) a minimum period of lack of satellite coverage, or a minimum unavailability period caused by any event, for which the procedure should be used, and where the procedure should not be used for shorter periods.

FIG. 14 shows a procedure 1400 performed by a UE 115 and AMF 122 to support a generalized UE unavailability period for NR satellite access. A procedure for LTE or NB-IoT satellite access would be similar. A similar procedure to procedure 1400 may be used for EPS with initial Registration replaced by an initial Attach and Registration for unavailability replaced by a TAU. In reference to FIG. 14, the enumerated stages of the procedure 1400 are discussed below.

Stage 1: During an initial Registration procedure, the UE 115 may send a NAS Registration Request message to the AMF 122 that includes an indication of support by UE 115 of "generalized unavailability period" or just "unavailability period". The AMF 122 may then return a NAS Registration Accept message to the UE 115 and may indicate in the Registration Accept whether the AMF 122 also supports "generalized unavailability period" or "unavailability period". The AMF 122 may also indicate in the Registration Accept a minimum period of unavailability for which notification according to stages 2-4 is needed. For periods of unavailability shorter than this, the UE 115 may not notify the AMF 122 (e.g. may not instigate stages 3 to 7).

Stage 2: The UE 115 may determine a period of impending unavailability based on an event resulting in unavailability, e.g.: satellite coverage unavailability, power savings requirements (when combined with satellite unavailability), SW upgrade or reboot of the UE 115, or some other event. The determination of the unavailability may be implementation dependent and may assume the UE 115 has the necessary data to make the determination (e.g. the UE 115 has satellite coverage data in the case of satellite coverage unavailability).

Stage 3: The UE 115 may send a NAS Registration Request message to the AMF 122 sometime before the unavailability starts, indicating the unavailability period and may indicate an event or events causing the unavailability. In some embodiments, the Registration Request can be a mobility Registration Request or a periodic Registration Request. The UE 115 may include in the Registration Request a start time of the unavailability period, an end time of the unavailability period, and/or a duration of the unavailability period. It is noted that an end time of the unavailability period may be implicitly indicated by UE 115 by including the start time and the duration of the unavailability period. If the UE does not include the start time of the unavailability period, the AMF 122 may assume that the unavailability period will start at a current time or immediately after the UE 115 enters an IDLE state.

In some embodiments, at stage 3, and when the unavailability period is due to a satellite coverage gap, the UE 115 may send the NAS Registration Request message to the AMF 122 at a time interval T (e.g. zero to five minutes) before the unavailability period will start. This may avoid overloading the AMF 122 when other UEs in a same local area as UE 115 also send similar Registration Requests to AMF 122 for the same satellite coverage gap. The time interval T may be randomized by the UE 115 so that it is different to other similar time intervals used by other UEs. For example, the AMF 122 may send a maximum time interval Tmax to UE 115 in the Registration Accept at stage 1, and the UE 115 may set the time interval T to a random time interval between zero and the maximum time interval Tmax.

Stage 4: The AMF 122 may respond by sending a NAS Registration Accept message to the UE 115. The AMF 122 may indicate a periodic registration timer in the NAS Registration Accept with a value equal to or slightly greater than a duration of the unavailability period provided by the UE. For an event common to many UEs (e.g. discontinuous satellite coverage), the AMF 122 may indicate a time delay (e.g. fixed or random) to the UE 115 for re-accessing the PLMN. The AMF 122 may also indicate in the Registration Accept whether the UE 115 is required or not required to send a Registration update (as at stage 6) after the unavailability period has ended. If the start time, end time or duration of the unavailability period changes for the UE 115, and if the new unavailability period has not yet started, the UE 115 may instigate a repetition of stages 3 and 4 to notify the AMF 122 of the changed unavailability period.

Stage 5: The AMF 122 may store the information that the UE 115 is in or will later enter an unavailability period in the UE context. After the unavailability period indicated at stage 3 has started, the AMF 122 may consider the UE 115 to be unreachable until either (a) the UE 115 performs a registration update again at stage 6 (e.g. when this is required), or (b) an end time of the unavailability period indicated at stage 3 has occurred. While the AMF 122 considers the UE 115 to be unreachable, all HLCom features may apply if supported by the AMF 115, e.g., extended downlink data buffering for the UE 115, sending of a downlink data buffering status report, and avoidance of paging of the UE 115.

Stage 6: The UE 115 may become available either due to normal termination of the unavailability period or because the UE becomes available earlier. In the case if an unavailability period caused by a satellite coverage gap, the UE may become available earlier, for example, if the UE 115 obtains PLMN access using some NTN or TN RAT before the period of satellite unavailability was expected to end.

Stage 7: After the UE becomes available and if the AMF 122 did not indicate at stage 4 that the UE 115 should not send a Registration update after the unavailability period has ended (e.g. the AMF 122 indicated that the UE 115 is required to send a NAS Registration update Request after the unavailability period has ended), the UE 115 may trigger a Registration update to resume regular service. At this stage, the UE may not include an unavailability period in the Registration Request. Depending on whether the UE 115 has changed PLMN, tracking area, or RAT type and whether the periodic registration timer has expired, the Registration may be an initial Registration (e.g. if the UE 115 has changed PLMN), or a "mobility" or "periodic" Registration. If the UE 115 becomes available due to normal termination of the unavailability period, the UE may delay sending of the Registration update for a time delay (e.g. a randomized time delay) after the end of the unavailability period. The determination of the time delay may be similar to or the same as the determination of the time interval T at stage 3. In some embodiments, if the periodic registration timer did not expire and the UE 115 has UL data to send, the UE may send a NAS Service Request instead.

Stage 8: The AMF 122 may respond by returning a NAS Registration Accept to UE 115. In the Registration Accept, the AMF 122 may include a new periodic registration timer not applicable to an unavailability period (e.g., a "normal" periodic registration timer).

FIG. 15 shows a flowchart illustrating a method 1500 performed by a UE (e.g., a UE 115 as described herein and shown in FIG. 14 and previous figures) for indicating a generalized unavailability period to a wireless network (e.g., to a serving public land mobile network (PLMN), including a 5GCN 110) in accordance with aspects of the present disclosure. The operations of the method 1500 may be implemented by the UE or its components as described herein. For example, the operations of the method 1500 may be performed by components of a UE 1000 as illustrated in FIG. 10 and described above. In some examples, a UE may execute a set of instructions to control the functional elements of the UE to perform the described functions. Additionally, or alternatively, the UE may perform aspects of the described functions using special-purpose hardware.

At block 1502, the functionality of the method 1500 comprises sending a reporting capability to a network entity of the wireless network, where the reporting capability indicates that the UE is capable of reporting generalized unavailability periods to the wireless network for a plurality of different events, and where the generalized unavailability periods comprise periods of time during which the UE does not have wireless communication access to the wireless network. This functionality may correspond, at least in part, to stage 1 in FIG. 14, described above. A structure or means for performing the functionality in block 1502 may include, for example, the wireless transceiver 1002 or satellite transceiver 1003 and one or more processors 1004 with dedicated hardware or implementing executable code or software instructions in memory 1016 and/or medium 1018, such as the PLMN access module 1022, in UE 1000 in FIG. 10.

At block 1504, the functionality comprises, subsequent to sending the reporting capability, determining an upcoming unavailability period for the UE due to one or more of the plurality of events. This functionality may correspond, at least in part, to stage 2 in FIG. 14, described above. A structure or means for performing the functionality in block 1504 may include, for example, the wireless transceiver 1002 or satellite transceiver 1003 and one or more processors 1004 with dedicated hardware or implementing executable code or software instructions in memory 1016 and/or medium 1018, such as the PLMN access module 1022, in UE 1000 in FIG. 10.

At block 1506, the functionality comprises, responsive to determining the upcoming unavailability period, sending an unavailability period report to the network entity of the wireless network, where the unavailability period report is sent prior to the unavailability period and is indicative of the unavailability period. This functionality may correspond, at least in part, to stage 3 in FIG. 14, described above. A structure or means for performing the functionality in block 1504 may include, for example, the wireless transceiver 1002 or satellite transceiver 1003 and one or more processors 1004 with dedicated hardware or implementing executable code or software instructions in memory 1016 and/or medium 1018, such as the Unavailability Reporting module 1026, in UE 1000 in FIG. 10.

In one implementation, the method 1500 may further comprise sending a Registration update or Tracking Area update to the network entity of the wireless network following detection by the UE of one of the following events: ending of the unavailability period, or modification or cancellation of the unavailability period before the unavailability period has started. This functionality may correspond, at least in part, to stage 7 in FIG. 14, described above, which may occur after the UE determines availability (e.g., at stage 6).

In one implementation, the method 1500 may further comprise including, in the unavailability period report, additional information regarding the unavailability period. This may include, for example, at least one of: an indication of the one or more of the plurality of events causing the unavailability period, a start time of the unavailability period, a duration of the unavailability period, an end time of the unavailability period, or some combination of these. The plurality of different events may include at least one of: a satellite coverage unavailability, a power savings event, a software upgrade of the UE, a reboot of the UE, or some combination of these.

Depending on the implementation, the network entity of the wireless network may comprise an AMF (e.g. AMF 122) or an MME. Additionally or alternatively, the unavailability period report may be included in a NAS Registration Request or an NAS Tracking Area Update (TAU) Request. Such embodiments may further comprise receiving a NAS Registration Accept or NAS TAU Accept from the network entity of the wireless network, where the NAS Registration Accept or NAS TAU Accept may include a periodic registration timer or periodic TAU timer equal to or greater than a duration of the unavailability period.

In some implementations, the one or more of the plurality of events includes a satellite coverage unavailability event and the method 1500 may then further comprise sending the unavailability period report to the network entity at block 1506 at a time interval before the unavailability period will start, where the time interval is randomized. Additionally, the UE may receive a maximum time interval from the network entity and determine the time interval to be a random time interval between zero and the maximum time interval.

FIG. 16 shows a flowchart illustrating a method 1600 performed by a network entity (e.g., an entity in a wireless network, such as an AMF 122 or MME) for enabling the indication of a generalized unavailability period of a UE (e.g. a UE 115) to the wireless network in accordance with aspects of the present disclosure. The operations of the method 1600 may be implemented by the network entity or components as described herein. For example, the operations of the method 1600 may be performed by or at components of a network entity 1100 as described with reference to FIG. 11. In some examples, a network entity may execute a set of instructions to control the functional elements of the network entity to perform the described functions. Additionally, or alternatively, the network entity may perform aspects of the described functions using special-purpose hardware. The functionality of FIG. 16 performed by a network entity may, for example, be performed in conjunction with a UE performing the functionality of FIG. 15.

At block 1602, the functionality comprises receiving a reporting capability from the UE, where the reporting capability indicates that the UE is capable of reporting generalized unavailability periods to the wireless network for a plurality of different events, and where the generalized unavailability periods comprise periods of time during which the UE does not have wireless communication access to the wireless network. This functionality may correspond, at least in part, to stage 1 in FIG. 14, described above. A means or structure for receiving a reporting capability from the UE, where the reporting capability indicates that the UE is capable of reporting generalized unavailability periods to the wireless network for a plurality of different events, and where the generalized unavailability periods comprise periods of time during which the UE does not have wireless communication access to the wireless network, may be, e.g., the external interface 1102 and one or more processors 1104 with dedicated hardware or implementing executable code or software instructions in memory 1116 and/or medium 1118, such as the data access module 1122, in network entity 1100 in FIG. 11.

At block 1604, the functionality comprises, subsequent to receiving the reporting capability, receiving an unavailability period report from the UE, where the unavailability period report is received prior to an upcoming unavailability period of the UE and is indicative of the unavailability period. This functionality may correspond, at least in part, to stage 3 in FIG. 14, described above. A means or structure for receiving an unavailability period report from the UE, where the unavailability period report is received prior to an upcoming unavailability period of the UE and is indicative of the unavailability period, may be, e.g., the external interface 1102 and one or more processors 1104 with dedicated hardware or implementing executable code or software instructions in memory 1116 and/or medium 1118, such as the Unavailability Reporting module 1124, in network entity 1100 in FIG. 11.

At block 1606, the functionality comprises, responsive to receiving the unavailability period report, sending at least one message to the UE, where the at least one message indicates a periodic registration timer or periodic TAU timer with a value equal to or greater than a duration of the unavailability period. This functionality may correspond, at least in part, to stage 4 in FIG. 14, described above. A means or structure for sending at least one message to the UE, where the at least one message indicates a periodic registration timer or periodic TAU timer with a value equal to or greater than a duration of the unavailability period, may be, e.g., the external interface 1102 and one or more processors 1104 with dedicated hardware or implementing executable code or software instructions in memory 1116 and/or medium 1118, such as the Unavailability Reporting module 1124, in network entity 1100 in FIG. 11.

In one implementation, the method 1600 may further comprise receiving a Registration update or Tracking Area update from the UE, indicative of one of the following events: ending of the unavailability period, or modification or cancellation of the unavailability period before the unavailability period has started. This functionality may correspond, at least in part, to stage 7 in FIG. 14, described above, which may occur after the UE determines availability (e.g., at stage 6).

In one implementation, the unavailability period report may include additional information regarding the unavailability period. This may include, for example, at least one of: the one or more of the plurality of events causing the unavailability period, a start time of the unavailability period, a duration of the unavailability period, an end time of the unavailability period, or some combination of these. The plurality of different events may include at least one of a satellite coverage unavailability, a power savings event, a software upgrade of the UE, a reboot of the UE, or some combination of these.

Depending on the implementation, the network entity of the wireless network may comprise an AMF (e.g. AMF 122) or an MME. Additionally or alternatively, the unavailability period report may be included in a NAS Registration Request or a NAS Tracking Area Update (TAU) Request. In some implementations, the at least one message may comprise a NAS Registration Accept or NAS TAU Accept.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device," "wireless device," or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, Wi-Fi, or other network, and to communicate with one or more types of nodes, regardless of whether satellite signal reception, assistance data reception, and/or position-related processing occurs at the device, at a server, or at another device or node associated with the network. Any operable combination of the above is also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

In view of this description embodiments may include different combinations of features. Implementation examples are described in the following numbered clauses:

Clause 1: A method performed by a user equipment (UE) for indicating a generalized unavailability period to a wireless network, the method comprising: sending a reporting capability to a network entity of the wireless network, wherein the reporting capability indicates that the UE is capable of reporting generalized unavailability periods to the wireless network for a plurality of different events, wherein the generalized unavailability periods comprise periods of time during which the UE does not have wireless communication access to the wireless network; subsequent to sending the reporting capability, determining an upcoming unavailability period for the UE due to one or more of the plurality of events; and responsive to determining the upcoming unavailability period, sending an unavailability period report to the network entity of the wireless network, wherein the unavailability period report is sent prior to the unavailability period and is indicative of the unavailability period.

Clause 2: The method of clause 1, further comprising sending a Registration update or Tracking Area update to the network entity of the wireless network following detection by the UE of one of the following events: ending of the unavailability period, or modification or cancellation of the unavailability period before the unavailability period has started.

Clause 3: The method of any one of clauses 1-2 further comprising including, in the unavailability period report, an indication of at least one of: the one or more of the plurality of events causing the unavailability period, a start time of the unavailability period, a duration of the unavailability period, an end time of the unavailability period, or some combination of these.

Clause 4: The method of any one of clauses 1-3 wherein the plurality of different events includes at least one of:

a satellite coverage unavailability, a power savings event, a software upgrade of the UE, a reboot of the UE, or some combination of these.

Clause 5: The method of any one of clauses 1-4 wherein the network entity of the wireless network comprises an Access and Mobility Management Function (AMF) or a Mobility Management Entity.

Clause 6: The method of any one of clauses 1-5 wherein the unavailability period report is included in a Non Access Stratum (NAS) Registration Request or a NAS Tracking Area Update (TAU) Request.

Clause 7: The method of clause 6 further comprising receiving a NAS Registration Accept or NAS TAU Accept from the network entity of the wireless network, wherein the NAS Registration Accept or NAS TAU Accept includes a periodic registration timer or periodic TAU timer equal to or greater than a duration of the unavailability period.

Clause 8: The method of any one of clauses 1-7 wherein the one or more of the plurality of events includes a satellite coverage unavailability event and further comprising sending the unavailability period report to the network entity at a time interval before the unavailability period will start, wherein the time interval is randomized.

Clause 9: The method of clause 8 further comprising receiving a maximum time interval from the network entity; and determining the time interval to be a random time interval between zero and the maximum time interval.

Clause 10: A method performed by a network entity of a wireless network for enabling an indication of a generalized unavailability period of a user equipment (UE) to the wireless network, the method comprising: receiving a reporting capability from the UE, wherein the reporting capability indicates that the UE is capable of reporting generalized unavailability periods to the wireless network for a plurality of different events, wherein the generalized unavailability periods comprise periods of time during which the UE does not have wireless communication access to the wireless network; subsequent to receiving the reporting capability, receiving an unavailability period report from the UE, wherein the unavailability period report is received prior to an upcoming unavailability period of the UE and is indicative of the unavailability period; and responsive to receiving the unavailability period report, sending at least one message to the UE, wherein the at least one message indicates a periodic registration timer or periodic Tracking Area Update (TAU) timer with a value equal to or greater than a duration of the unavailability period.

Clause 11: The method of clause 10, further comprising receiving a Registration update or Tracking Area update from the UE, indicative of one of the following events: ending of the unavailability period, or modification or cancellation of the unavailability period before the unavailability period has started Clause 12: The method of any one of clauses 10-11 wherein the unavailability period report includes an indication of at least one of: the one or more of the plurality of events causing the unavailability period, a start time of the unavailability period, a duration of the unavailability period, an end time of the unavailability period, or some combination of these.

Clause 13: The method of any one of clauses 10-12 wherein the plurality of different events includes at least one of: a satellite coverage unavailability, a power savings event, a software upgrade of the UE, a reboot of the UE, or some combination of these.

Clause 14: The method of any one of clauses 10-13 wherein the network entity of the wireless network comprises an Access and Mobility Management Function (AMF) or a Mobility Management Entity.

Clause 15: The method of any one of clauses 10-14 wherein the unavailability period report is included in a Non Access Stratum (NAS) Registration Request or a NAS TAU Request.

Clause 16: The method of clause 15 wherein the at least one message comprises a NAS Registration Accept or NAS TAU Accept.

Clause 17: A user equipment (UE) capable of indicating a generalized unavailability period to a wireless network, the UE comprising: one or more transceivers; one or more memories; and one or more processors communicatively coupled with the one or more transceivers and the one or more memories, wherein the one or more processors are configured to: send a reporting capability via the one or more transceivers to a network entity of the wireless network, wherein the reporting capability indicates that the UE is capable of reporting generalized unavailability periods to the wireless network for a plurality of different events, wherein the generalized unavailability periods comprise periods of time during which the UE does not have wireless communication access to the wireless network; subsequent to sending the reporting capability, determine an upcoming unavailability period for the UE due to one or more of the plurality of events; and responsive to determining the upcoming unavailability period, send an unavailability period report via the one or more transceivers to the network entity of the wireless network, wherein the unavailability period report is sent prior to the unavailability period and is indicative of the unavailability period.

Clause 18: The UE of clause 17, wherein the one or more processors are further configured to send a Registration update or Tracking Area update to the network entity of the wireless network following detection by the UE of one of the following events: ending of the unavailability period, or modification or cancellation of the unavailability period before the unavailability period has started.

Clause 19: The UE of any one of clauses 17-18 wherein the one or more processors are further configured to include, in the unavailability period report, an indication of at least one of: the one or more of the plurality of events causing the unavailability period, a start time of the unavailability period, a duration of the unavailability period, an end time of the unavailability period, or some combination of these.

Clause 20: The UE of any one of clauses 17-19 wherein the plurality of different events includes at least one of: a satellite coverage unavailability, a power savings event, a software upgrade of the UE, a reboot of the UE, or some combination of these.

Clause 21: The UE of any one of clauses 17-20 wherein the one or more processors are further configured to include the unavailability period report in a Non Access Stratum (NAS) Registration Request or a NAS Tracking Area Update (TAU) Request.

Clause 22: The UE of clause 21 wherein the one or more processors are further configured to receive a NAS Registration Accept or NAS TAU Accept from the network entity of the wireless network, wherein the NAS Registration Accept or NAS TAU Accept includes a periodic registration timer or periodic TAU timer equal to or greater than a duration of the unavailability period.

Clause 23: The UE of any one of clauses 17-22 wherein the one or more of the plurality of events includes a satellite coverage unavailability event and further comprising sending the unavailability period report to the network entity at a time interval before the unavailability period will start, wherein the time interval is randomized.

Clause 24: The UE of clause 23 wherein the one or more processors are further configured to: receive a maximum time interval from the network entity; and determine the time interval to be a random time interval between zero and the maximum time interval.

Clause 25: A network entity for a wireless network for enabling an indication of a generalized unavailability period of a user equipment (UE) to the wireless network, the network entity comprising: one or more transceivers; one or more memories; and one or more processors communicatively coupled with the one or more transceivers and the one or more memories, wherein the one or more processors are configured to: receive a reporting capability via the one or more transceivers from the UE, wherein the reporting capability indicates that the UE is capable of reporting generalized unavailability periods to the wireless network for a plurality of different events, wherein the generalized unavailability periods comprise periods of time during which the UE does not have wireless communication access to the wireless network; subsequent to receiving the reporting capability, receive an unavailability period report from the UE, wherein the unavailability period report is received prior to an upcoming unavailability period of the UE and is indicative of the unavailability period; and responsive to receiving the unavailability period report, send at least one message via the one or more transceivers to the UE, wherein the at least one message indicates a periodic registration timer or periodic Tracking Area Update (TAU) timer with a value equal to or greater than a duration of the unavailability period.

Clause 26: The network entity of clause 25, wherein the one or more processors are further configured to receive a Registration update or Tracking Area update from the UE, indicative of one of the following events: ending of the unavailability period, or modification or cancellation of the unavailability period before the unavailability period has started Clause 27: The network entity of any one of clauses 25-26 wherein the unavailability period report includes an indication of at least one of: the one or more of the plurality of events causing the unavailability period, a start time of the unavailability period, a duration of the unavailability period, an end time of the unavailability period, or some combination of these.

Clause 28: The network entity of any one of clauses 25-27 wherein the plurality of different events includes at least one of: a satellite coverage unavailability, a power savings event, a software upgrade of the UE, a reboot of the UE, or some combination of these.

Clause 29: The network entity of any one of clauses 25-28 wherein the network entity of the wireless network comprises an Access and Mobility Management Function (AMF) or a Mobility Management Entity.

Clause 30: The network entity of any one of clauses 25-29 wherein the unavailability period report is included in a Non Access Stratum (NAS) Registration Request or a NAS TAU Request.

An apparatus having means for performing the method of any one of clauses 1-16.

A non-transitory computer-readable medium storing instructions, the instructions comprising code for performing the method of any one of clauses 1-16.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method performed by a user equipment (UE) for indicating a generalized unavailability period to a wireless network, the method comprising:

sending a reporting capability to a network entity of the wireless network, wherein the reporting capability indicates that the UE is capable of reporting generalized unavailability periods to the wireless network for a plurality of different events, wherein the generalized unavailability periods comprise periods of time during which the UE does not have wireless communication access to the wireless network;

subsequent to sending the reporting capability, determining an upcoming unavailability period for the UE due to one or more of the plurality of events;

responsive to determining the upcoming unavailability period, sending an unavailability period report to the network entity of the wireless network, wherein the unavailability period report is sent prior to the upcoming unavailability period and is indicative of the upcoming unavailability period, wherein the unavailability period report is included in a Non Access Stratum (NAS) Registration Request or a NAS Tracking Area Update (TAU), and receiving a NAS Registration Accept or NAS TAU Accept from the network entity of the wireless network, wherein the NAS Registration Accept or NAS TAU Accept includes a periodic registration timer or periodic TAU timer equal to or greater than a duration of the upcoming unavailability period.

2. The method of claim 1, further comprising sending a Registration update or Tracking Area update to the network entity of the wireless network following detection by the UE of one of the following events:

ending of the upcoming unavailability period, or modification or cancellation of the upcoming unavailability period before the upcoming unavailability period has started.

3. The method of claim 1, further comprising including, in the unavailability period report, an indication of at least one of:

the one or more of the plurality of events causing the upcoming unavailability period, a start time of the upcoming unavailability period, a duration of the upcoming unavailability period, an end time of the upcoming unavailability period, or some combination of these.

4. The method of claim 1, wherein the plurality of different events includes at least one of:

a satellite coverage unavailability, a power savings event, a software upgrade of the UE, a reboot of the UE, or some combination of these.

5. The method of claim 1, wherein the network entity of the wireless network comprises an Access and Mobility Management Function (AMF) or a Mobility Management Entity.

6. The method of claim 1, wherein the one or more of the plurality of events includes a satellite coverage unavailability event and further comprising sending the unavailability period report to the network entity at a time interval before the upcoming unavailability period will start, wherein the time interval is randomized.

7. The method of claim 6, further comprising:

receiving a maximum time interval from the network entity; and determining the time interval to be a random time interval between zero and the maximum time interval.

8. A method performed by a network entity of a wireless network for enabling an indication of a generalized unavailability period of a user equipment (UE) to the wireless network, the method comprising:

receiving a reporting capability from the UE, wherein the reporting capability indicates that the UE is capable of reporting generalized unavailability periods to the wireless network for a plurality of different events, wherein the generalized unavailability periods comprise periods of time during which the UE does not have wireless communication access to the wireless network;

subsequent to receiving the reporting capability, receiving an unavailability period report from the UE, wherein the unavailability period report is received prior to an upcoming unavailability period of the UE and is indicative of the unavailability period; and responsive to receiving the unavailability period report, sending at least one message to the UE, wherein the at least one message indicates a periodic registration timer or periodic Tracking Area Update (TAU) timer with a value equal to or greater than a duration of the unavailability period.

9. The method of claim 8, further comprising receiving a Registration update or Tracking Area update from the UE, indicative of one of the following events:

ending of the unavailability period, or modification or cancellation of the unavailability period before the unavailability period has started.

10. The method of claim 8, wherein the unavailability period report includes an indication of at least one of:

the one or more of the plurality of events causing the unavailability period, a start time of the unavailability period, a duration of the unavailability period, an end time of the unavailability period, or some combination of these.

11. The method of claim 8, wherein the plurality of different events includes at least one of:

a satellite coverage unavailability, a power savings event, a software upgrade of the UE, a reboot of the UE, or some combination of these.

12. The method of claim 8, wherein the network entity of the wireless network comprises an Access and Mobility Management Function (AMF) or a Mobility Management Entity.

13. The method of claim 8, wherein the unavailability period report is included in a Non Access Stratum (NAS) Registration Request or a NAS TAU Request.

14. The method of claim 13, wherein the at least one message comprises a NAS Registration Accept or NAS TAU Accept.

15. A user equipment (UE) capable of indicating a generalized unavailability period to a wireless network, the UE comprising:

one or more transceivers;

one or more memories; and one or more processors communicatively coupled with the one or more transceivers and the one or more memories, wherein the one or more processors are configured to:

send a reporting capability via the one or more transceivers to a network entity of the wireless network, wherein the reporting capability indicates that the UE is capable of reporting generalized unavailability periods to the wireless network for a plurality of different events, wherein the generalized unavailability periods comprise periods of time during which the UE does not have wireless communication access to the wireless network;

subsequent to sending the reporting capability, determine an upcoming unavailability period for the UE due to one or more of the plurality of events;

responsive to determining the upcoming unavailability period, send an unavailability period report via the one or more transceivers to the network entity of the wireless network, wherein the unavailability period report is sent prior to the upcoming unavailability period and is indicative of the unavailability upcoming period, wherein the unavailability period report is included in a Non Access Stratum (NAS) Registration Request or a NAS Tracking Area Update (TAU), and receiving a NAS Registration Accept or NAS TAU Accept from the network entity of the wireless network, wherein the NAS Registration Accept or NAS TAU Accept includes a periodic registration timer or periodic TAU timer equal to or greater than a duration of the upcoming unavailability period.

16. The UE of claim 15, wherein the one or more processors are further configured to send a Registration update or Tracking Area update to the network entity of the wireless network following detection by the UE of one of the following events:

ending of the upcoming unavailability period, or modification or cancellation of the upcoming unavailability period before the upcoming unavailability period has started.

17. The UE of claim 15, wherein the one or more processors are further configured to include, in the unavailability period report, an indication of at least one of:

the one or more of the plurality of events causing the upcoming unavailability period, a start time of the upcoming unavailability period, a duration of the upcoming unavailability period, an end time of the upcoming unavailability period, or some combination of these.

18. The UE of claim 15, wherein the plurality of different events includes at least one of:

a satellite coverage unavailability, a power savings event, a software upgrade of the UE, a reboot of the UE, or some combination of these.

19. The UE of claim 15, wherein the one or more of the plurality of events includes a satellite coverage unavailability event and further comprising sending the unavailability period report to the network entity at a time interval before the upcoming unavailability period will start, wherein the time interval is randomized.

20. The UE of claim 19, wherein the one or more processors are further configured to:

receive a maximum time interval from the network entity; and determine the time interval to be a random time interval between zero and the maximum time interval.

21. A network entity for a wireless network for enabling an indication of a generalized unavailability period of a user equipment (UE) to the wireless network, the network entity comprising:

one or more transceivers;

one or more memories; and one or more processors communicatively coupled with the one or more transceivers and the one or more memories, wherein the one or more processors are configured to:

receive a reporting capability via the one or more transceivers from the UE, wherein the reporting capability indicates that the UE is capable of reporting generalized unavailability periods to the wireless network for a plurality of different events, wherein the generalized unavailability periods comprise periods of time during which the UE does not have wireless communication access to the wireless network;

subsequent to receiving the reporting capability, receive an unavailability period report from the UE, wherein the unavailability period report is received prior to an upcoming unavailability period of the UE and is indicative of the unavailability period; and responsive to receiving the unavailability period report, send at least one message via the one or more transceivers to the UE, wherein the at least one message indicates a periodic registration timer or periodic Tracking Area Update (TAU) timer with a value equal to or greater than a duration of the unavailability period.

22. The network entity of claim 21, wherein the one or more processors are further configured to receive a Registration update or Tracking Area update from the UE, indicative of one of the following events:

ending of the unavailability period, or modification or cancellation of the unavailability period before the unavailability period has started.

23. The network entity of claim 21, wherein the unavailability period report includes an indication of at least one of:

the one or more of the plurality of events causing the unavailability period, a start time of the unavailability period, a duration of the unavailability period, an end time of the unavailability period, or some combination of these.

24. The network entity of claim 21, wherein the plurality of different events includes at least one of:

a satellite coverage unavailability, a power savings event, a software upgrade of the UE, a reboot of the UE, or some combination of these.

25. The network entity of claim 21, wherein the network entity of the wireless network comprises an Access and Mobility Management Function (AMF) or a Mobility Management Entity.

26. The network entity of claim 21, wherein the unavailability period report is included in a Non Access Stratum (NAS) Registration Request or a NAS TAU Request.

\* \* \* \* \*